United States Patent
Park et al.

(10) Patent No.: US 11,962,542 B2
(45) Date of Patent: Apr. 16, 2024

(54) METHOD AND APPARATUS FOR RECEIVING PPDU THROUGH MULTIPLE RU IN WIRELESS LAN SYSTEM

(71) Applicant: LG ELECTRONICS INC., Seoul (KR)

(72) Inventors: Eunsung Park, Seoul (KR); Jinyoung Chun, Seoul (KR); Jinsoo Choi, Seoul (KR); Dongguk Lim, Seoul (KR); Jinmin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/214,850

(22) Filed: Jun. 27, 2023

(65) Prior Publication Data

US 2023/0344608 A1 Oct. 26, 2023

Related U.S. Application Data

(63) Continuation of application No. 17/779,017, filed as application No. PCT/KR2020/016456 on Nov. 20, 2020.

(30) Foreign Application Priority Data

| Nov. 21, 2019 | (KR) | 10-2019-0150806 |
| Dec. 2, 2019 | (KR) | 10-2019-0158536 |
| Dec. 13, 2019 | (KR) | 10-2019-0167215 |
| Jan. 28, 2020 | (KR) | 10-2020-0010102 |

(51) Int. Cl.
  *H04L 5/00* (2006.01)
  *H04L 1/00* (2006.01)
  *H04W 84/12* (2009.01)

(52) U.S. Cl.
  CPC .......... *H04L 5/0092* (2013.01); *H04L 1/0068* (2013.01); *H04L 5/0094* (2013.01); *H04W 84/12* (2013.01)

(58) Field of Classification Search
  CPC ... H04L 5/0092; H04L 1/0068; H04L 5/0094; H04W 84/12
  See application file for complete search history.

(56) References Cited

U.S. PATENT DOCUMENTS

| 2021/0144696 A1* | 5/2021 | Cariou | H04L 27/2602 |
| 2021/0281384 A1* | 9/2021 | Hu | H04L 5/0094 |
| 2022/0416943 A1* | 12/2022 | Jang | H04L 5/0092 |

(Continued)

*Primary Examiner* — Pankaj Kumar
*Assistant Examiner* — Kenneth P Hunt
(74) *Attorney, Agent, or Firm* — LEE, HONG, DEGERMAN, KANG & WAIMEY

(57) ABSTRACT

Proposed are a method and apparatus for receiving a PPDU in a wireless LAN system. Specifically, a reception STA receives a PPDU from a transmission STA through a broadband and decodes the PPDU. The PPDU includes a control field and a data field. When the broadband is a 320/160+160 MHz band including first to fourth 80 MHz sub-channels, the first 80 MHz sub-channel includes a first 996 RU, the second 80 MHz sub-channel includes a second 996 RU, the third 80 MHz sub-channel includes a third 996 RU, and the fourth 80 MHz sub-channel includes a first 484 RU. The data field is received through a first multiple RU in which the first to third 996 RUs and the first 484 RU are aggregated.

11 Claims, 35 Drawing Sheets

(56) References Cited

U.S. PATENT DOCUMENTS

| | | | |
|---|---|---|---|
| 2023/0109874 A1* | 4/2023 | Gan | H04W 72/0446 370/329 |
| 2023/0137534 A1* | 5/2023 | Yu | H04L 1/1642 370/329 |
| 2023/0209525 A1* | 6/2023 | Hu | H04W 72/23 370/329 |
| 2023/0224715 A1* | 7/2023 | Huang | H04L 5/0037 370/329 |

* cited by examiner

FIG. 1
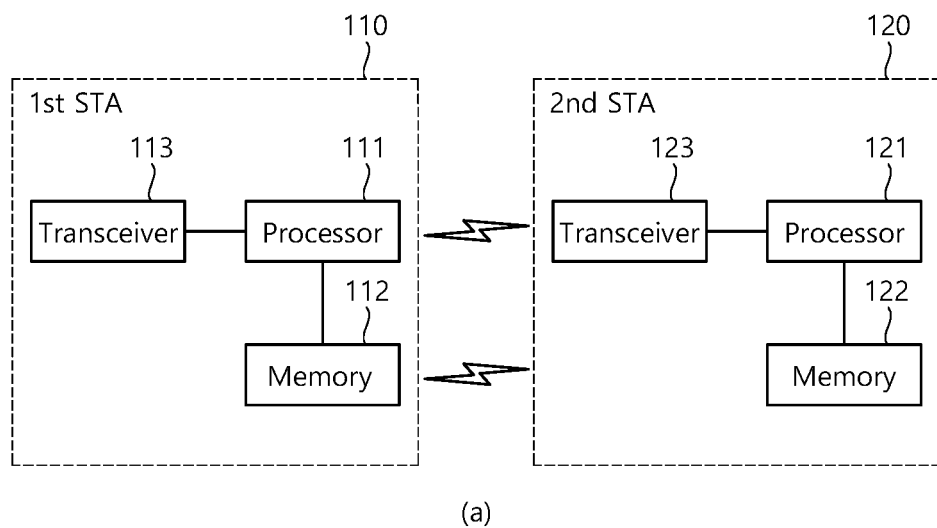
(a)
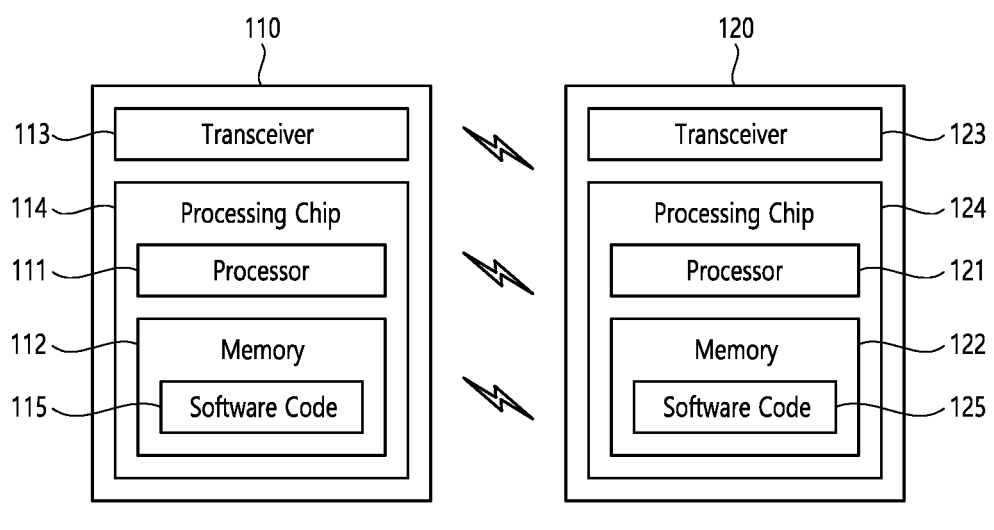
(b)

FIG. 2
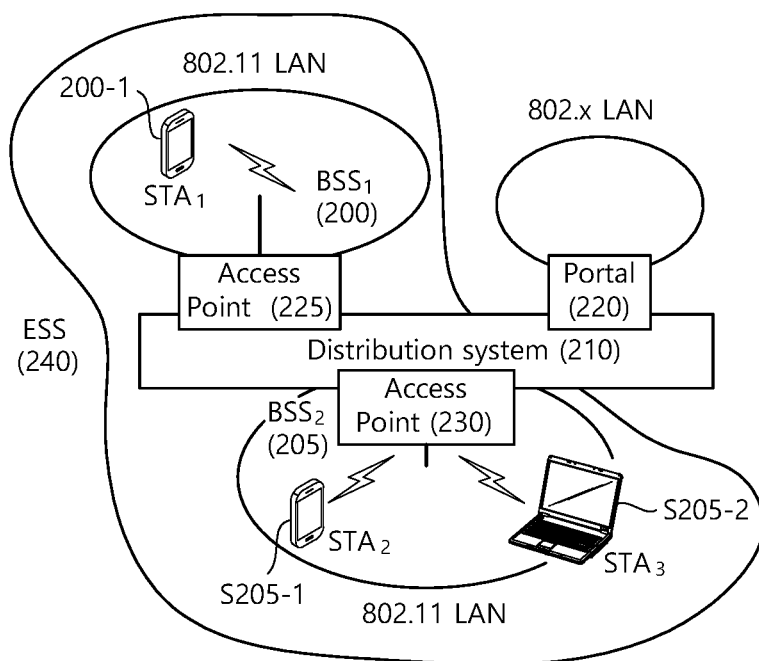
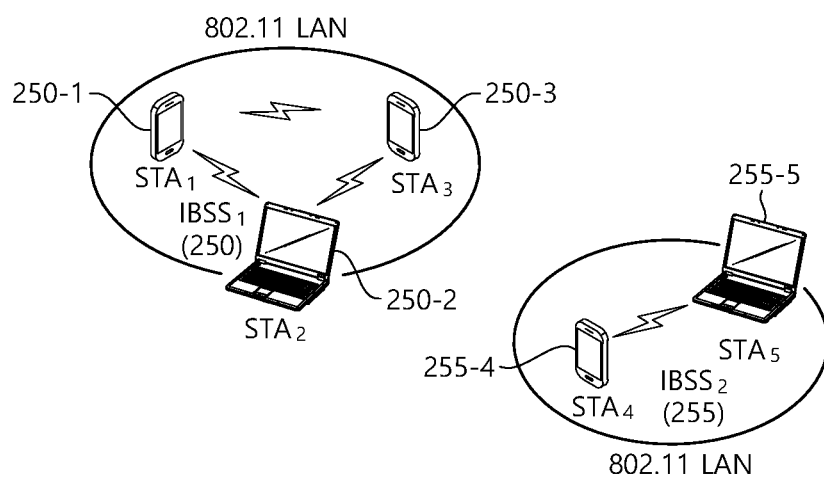

FIG. 22

| Primary 20 (P20) | Secondary 20 (S20) | Lower 20 (L20) | Higher 20 (H20) |

Primary 40 | Secondary 40

FIG. 27

| Primary 80 (P80) | Secondary 80 (S80) | Lower 80 (L80) |
|---|---|---|
| Secondary 80 (S80) | Primary 80 (P80) | Lower 80 (L80) |

Case 1

| Higher 80 (H80) | Primary 80 (P80) | Secondary 80 (S80) |
|---|---|---|
| Higher 80 (H80) | Secondary 80 (S80) | Primary 80 (P80) |

Case 2

| Primary 80 (P80) | Lower 80 (L80) | Higher 80 (H80) |
|---|---|---|
| Lower 80 (L80) | Higher 80 (H80) | Primary 80 (P80) |

Case 3

FIG. 28

| | Case 1 | Case 2 | Case 3 |
|---|---|---|---|
| | Lower 80 (L80) | Secondary 80 (S80) | Higher 80 (H80) |
| | Lower 80 (L80) | Primary 80 (P80) | Primary 80 (P80) |
| Secondary 80 (S80) | Primary 80 (P80) | | |
| Primary 80 (P80) | Secondary 80 (S80) | | |
| | Higher 80 (H80) | Secondary 80 (S80) | Higher 80 (H80) |
| | Higher 80 (H80) | Lower 80 (L80) | |
| | Primary 80 (P80) | | |
| | Lower 80 (L80) | | |

FIG. 30

| Legacy Preamble | RL-SIG | Universal-SIG | EHT-SIG | EHT-STF | EHT-LTF | Data |

FIG. 31

| Version independent field | Version dependent field |
|---|---|

US 11,962,542 B2

METHOD AND APPARATUS FOR RECEIVING PPDU THROUGH MULTIPLE RU IN WIRELESS LAN SYSTEM

CROSS-REFERENCE TO RELATED APPLICATIONS

This application is a continuation of U.S. patent application Ser. No. 17/779,017, filed on May 23, 2022, which is the National Stage filing under 35 U.S.C. 371 of International Application No. PCT/KR2020/016456, filed on Nov. 20, 2020, which claims the benefit of earlier filing date and right of priority to Korean Application Nos. 10-2019-0150806, filed on Nov. 21, 2019, 10-2019-0158536, filed on Dec. 2, 2019, 10-2019-0167215, filed on Dec. 13, 2019, and 10-2020-0010102, filed on Jan. 28, 2020, the contents of which are all incorporated by reference herein in their entirety.

BACKGROUND

Technical Field

The present disclosure relates to a technique for receiving a PPDU through multiple RUs in a WLAN system, and more particularly, to a method and apparatus for transmitting and receiving the PPDU in a non-OFDMA scheme through the multiple RUs aggregated into a combination of large-RUs.

Related Art

A wireless local area network (WLAN) has been enhanced in various ways. For example, the IEEE 802.11ax standard has proposed an enhanced communication environment by using orthogonal frequency division multiple access (OFDMA) and downlink multi-user multiple input multiple output (DL MU MIMO) schemes.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be referred to as the IEEE 802.11be standard.

An increased number of spatial streams may be used in the new wireless LAN standard. In this case, in order to properly use the increased number of spatial streams, a signaling technique in the WLAN system may need to be improved.

SUMMARY

Technical Objectives

The present disclosure proposes a method and apparatus for receiving a PPDU through multiple RUs in a WLAN system.

Technical Solutions

An example of the present specification proposes a method for receiving a PPDU through multiple RUs.

This embodiment may be performed in a network environment in which a next-generation wireless LAN system (e.g., IEEE 802.11be or EHT wireless LAN system) is supported. The next-generation wireless LAN system is a wireless LAN system improved from the 802.11ax system, and may satisfy backward compatibility with the 802.11ax system.

This embodiment proposes a method and apparatus for transmitting and receiving PPDU based on multiple RUs configured by a combination between large-RUs. In this case, the large-RU means a resource unit having more than 242 tones. In particular, this embodiment proposes a method of configuring multiple RUs used to transmit a PPDU in a non-OFDMA scheme.

A receiving station (STA) receives a Physical Protocol Data Unit (PPDU) through a broadband from a transmitting STA.

The receiving STA decode the PPDU.

The PPDU includes a control field and a data field.

When the broadband is a 320/160+160 MHz band including first to fourth 80 MHz subchannels, the first 80 MHz subchannel includes a first 996 resource unit (RU), and the second 80 MHz subchannel includes a second 996 RU, the third 80 MHz subchannel includes a third 996 RU, and the fourth 80 MHz subchannel includes a first 484 RU.

The data field is received through first multiple RUs in which the first to third 996RUs and the first 484RU are aggregated. That is, the data field may be received through multiple RUs in which three 996 RUs and one 484 RU are aggregated. As described above, the broadband may include four 80 MHz subchannels. The three 996 RUs and the one 484 RU may be allocated to each of the four 80 MHz subchannels, respectively. In this case, the first to third 996RUs may be RUs consisting of 996 tones, and the first 484 RU may be an RU consisting of 484 tones.

Technical Effects

According to the embodiment proposed in this specification, there is a new effect of increasing transmission efficiency and throughput by supporting preamble puncturing and aggregation of large-RUs of various sizes in Non-OFDMA.

BRIEF DESCRIPTION OF THE DRAWINGS

FIG. 1 shows an example of a transmitting apparatus and/or receiving apparatus of the present specification.

FIG. 2 is a conceptual view illustrating the structure of a wireless local area network (WLAN).

FIG. 22 shows a channel structure of 80 MHz.

FIG. 27 is an example of contiguous 240 MHz derived from contiguous 320 MHz.

FIG. 28 is an example of non-contiguous 160+80 MHz derived from non-contiguous 160+160 MHz.

FIG. 30 shows an example of an EHT PPDU format.

FIG. 31 shows an example of a U-SIG format.

DETAILED DESCRIPTION

Figure 3:
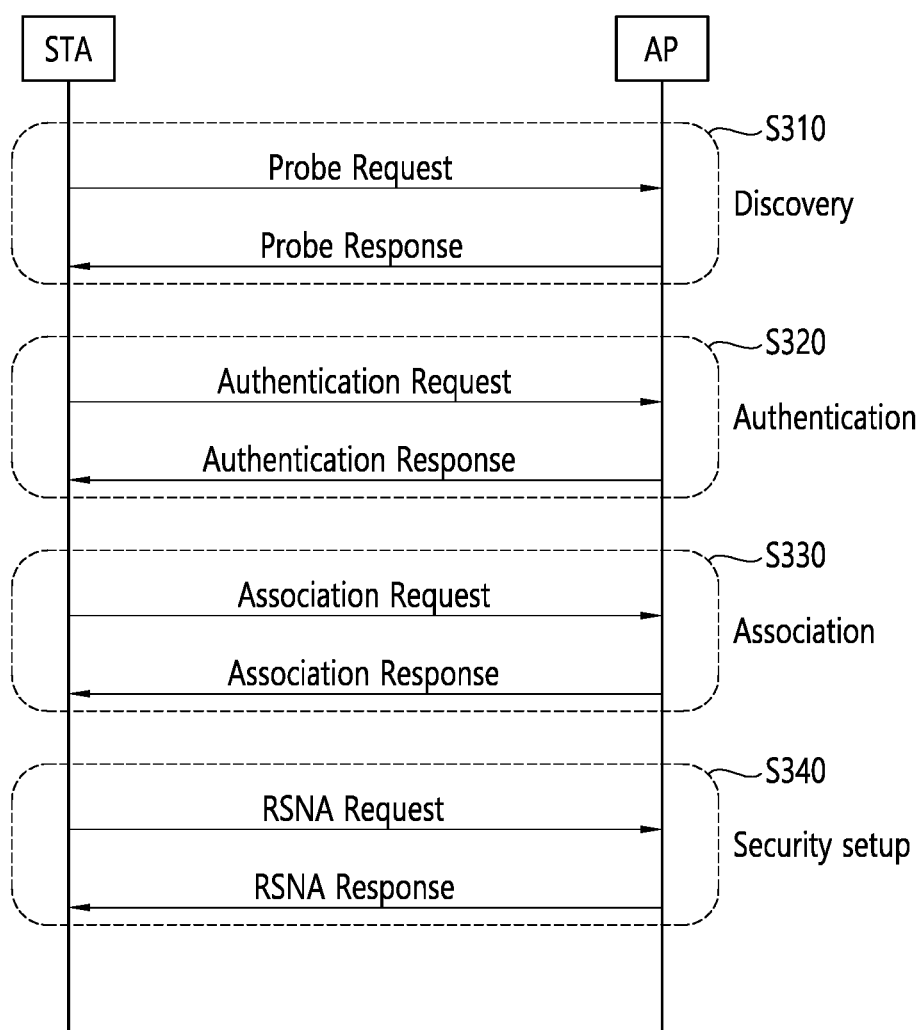
FIG. 3 illustrates a general link setup process.

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may denote that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a $3^{rd}$ generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (S SID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information related to a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information related to an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information related to various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information related to various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

Figure 4:
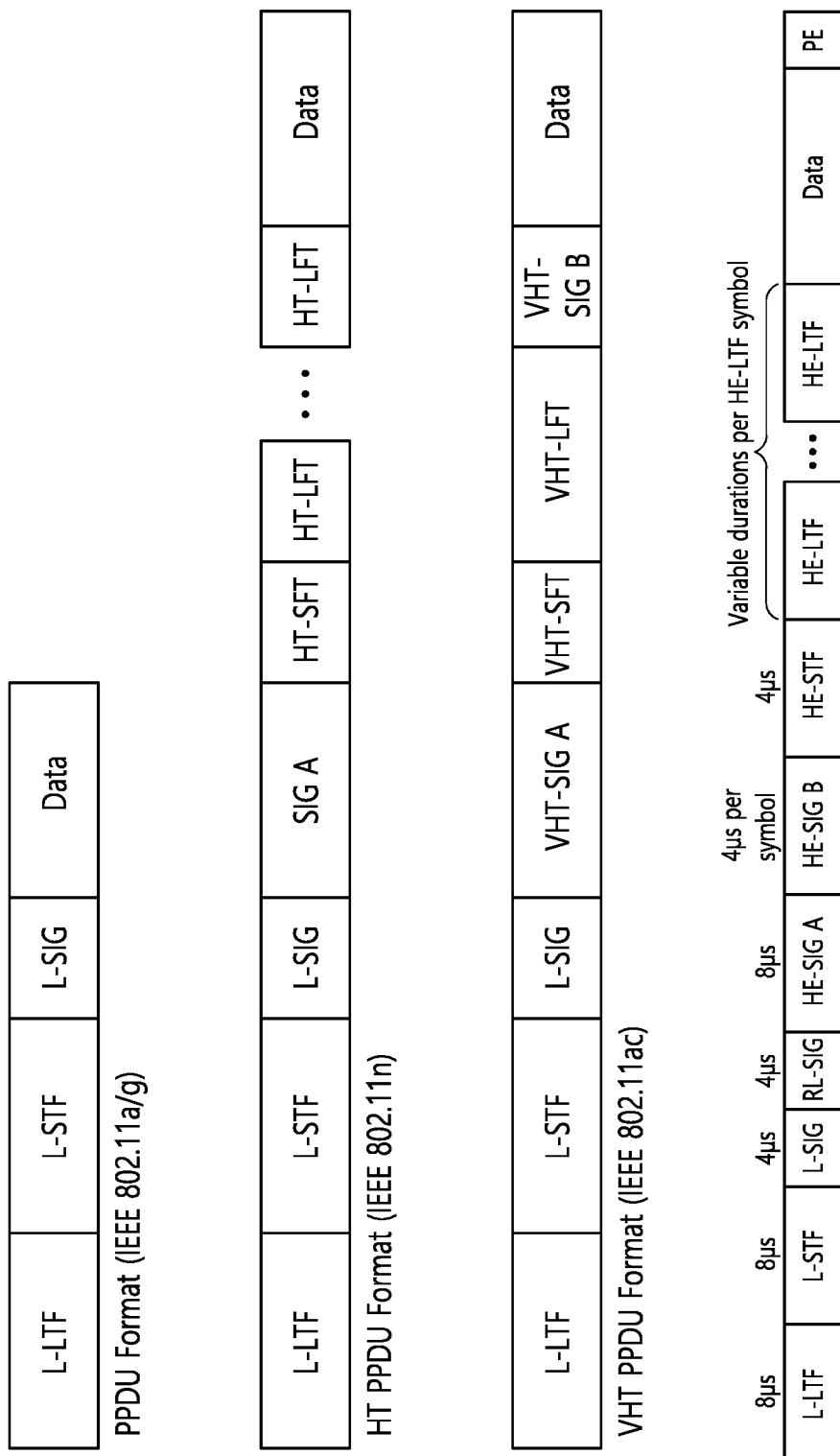
FIG. 4 illustrates an example of a PPDU used in an IEEE standard.

FIG. 4 illustrates an example of a PPDU used in an IEEE standard.

As illustrated, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 μs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 5:
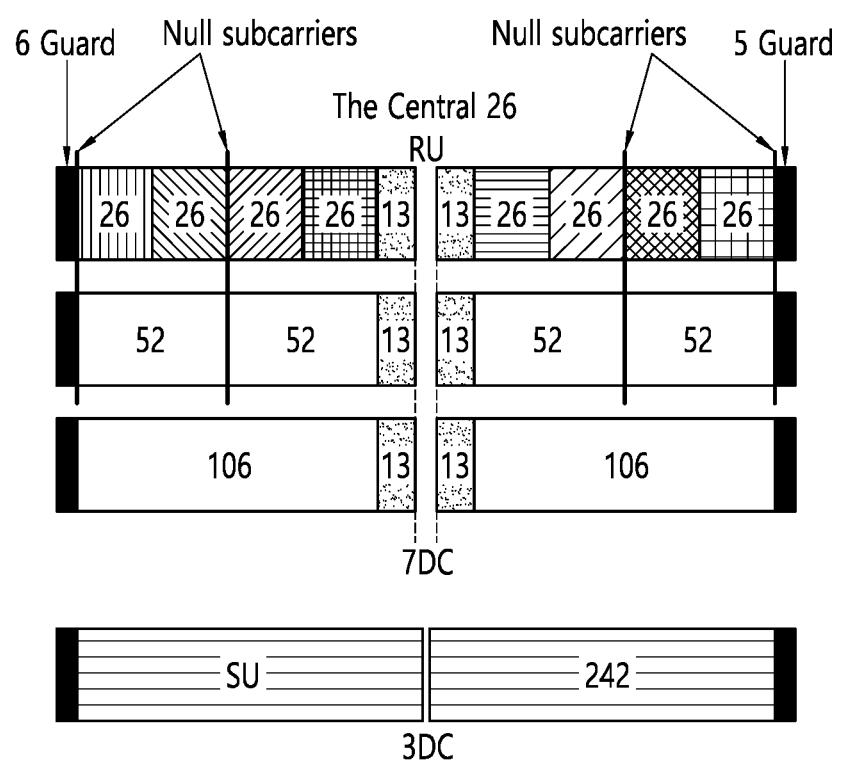
FIG. 5 illustrates a layout of resource units (RUs) used in a band of 20 MHz.

FIG. 5 illustrates a layout of resource units (RUs) used in a band of 20 MHz.

As illustrated in FIG. 5, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 5, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 5 may be used not only for a multiple users (MUs) but also for a single user (SU), in which case one 242-unit may be used and three DC tones may be inserted as illustrated in the lowermost part of FIG. 5.

Although FIG. 5 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 6:
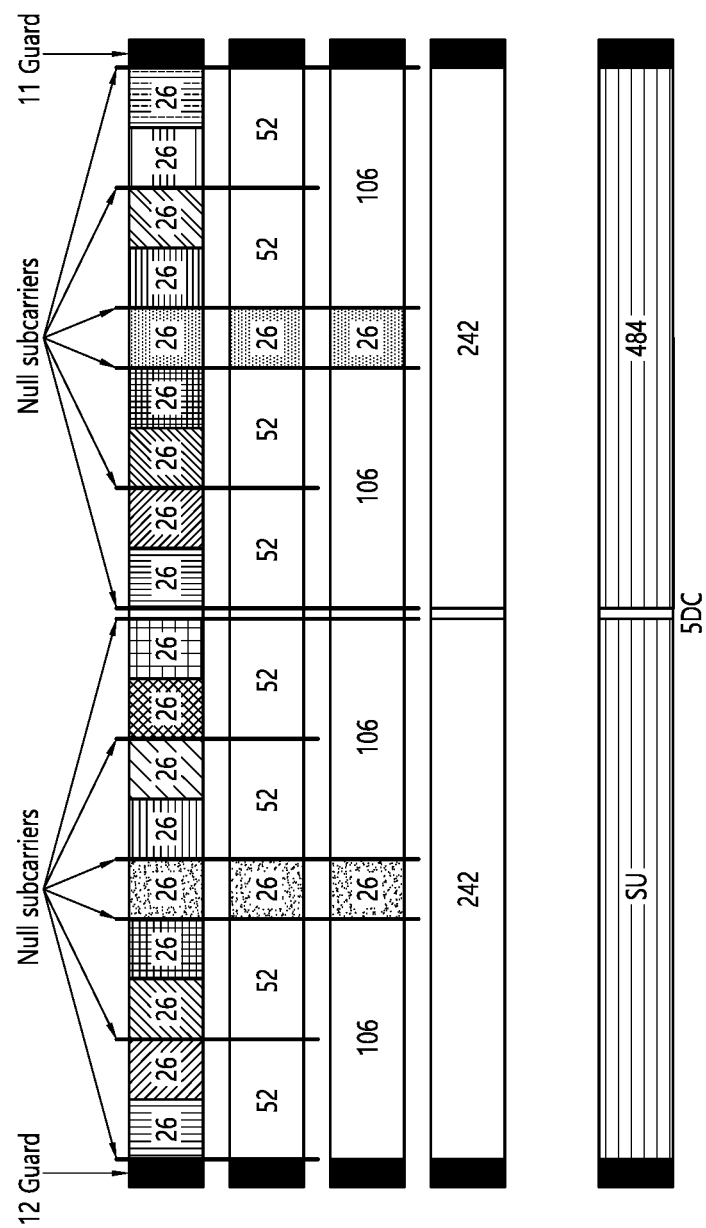
FIG. 6 illustrates a layout of RUs used in a band of 40 MHz.

FIG. 6 illustrates a layout of RUs used in a band of 40 MHz.

Similarly to FIG. 5 in which RUs having various sizes are used, a 26-RU, a 52-RU, a 106-RU, a 242-RU, a 484-RU, and the like may be used in an example of FIG. 6. Further, five DC tones may be inserted in a center frequency, 12 tones may be used for a guard band in the leftmost band of the 40 MHz band, and 11 tones may be used for a guard band in the rightmost band of the 40 MHz band.

As illustrated in FIG. 6, when the layout of the RUs is used for a single user, a 484-RU may be used. The specific number of RUs may be changed similarly to FIG. 5.

Figure 7:
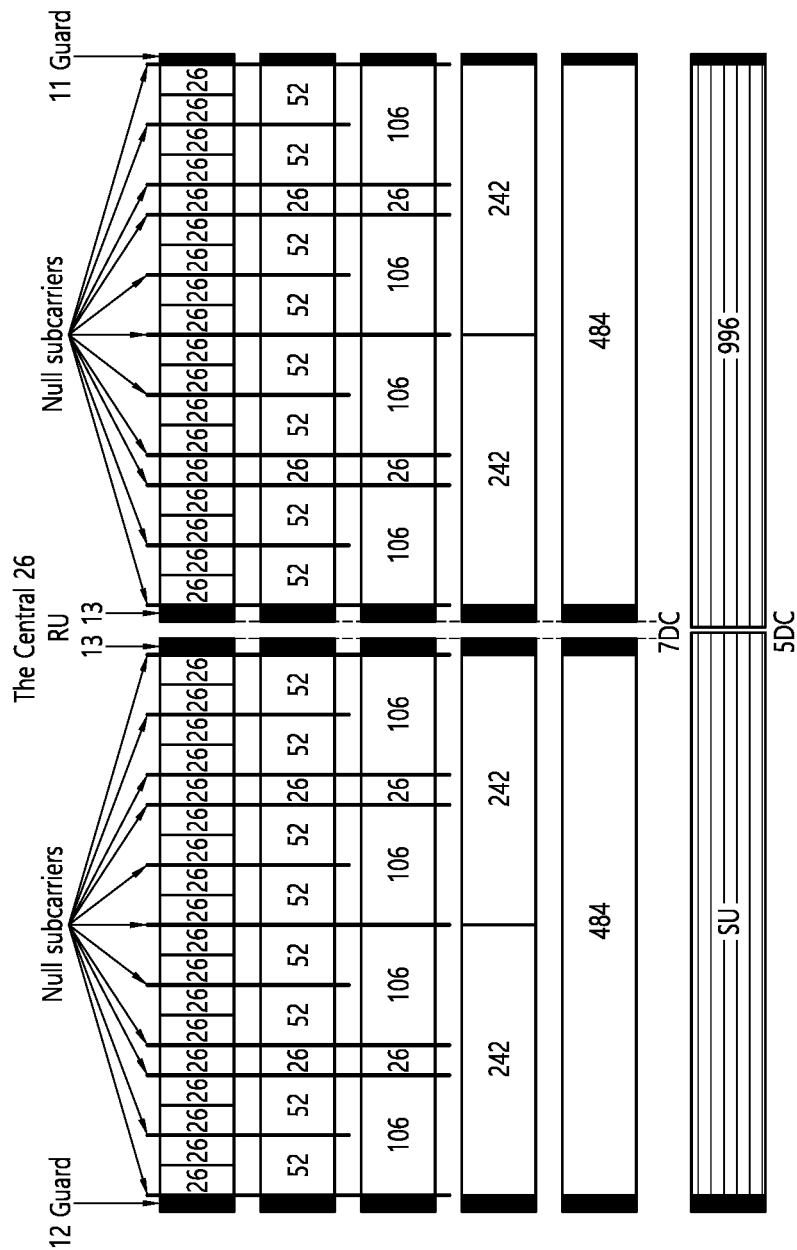
FIG. 7 illustrates a layout of RUs used in a band of 80 MHz.

FIG. 7 illustrates a layout of RUs used in a band of 80 MHz.

Similarly to FIG. 5 and FIG. 6 in which RUs having various sizes are used, a 26-RU, a 52-RU, a 106-RU, a 242-RU, a 484-RU, a 996-RU, and the like may be used in an example of FIG. 7. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated in FIG. 7, when the layout of the RUs is used for a single user, a 996-RU may be used, in which case five DC tones may be inserted.

The RU described in the present specification may be used in uplink (UL) communication and downlink (DL) communication. For example, when UL-MU communication which is solicited by a trigger frame is performed, a transmitting STA (e.g., an AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU. etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 8:
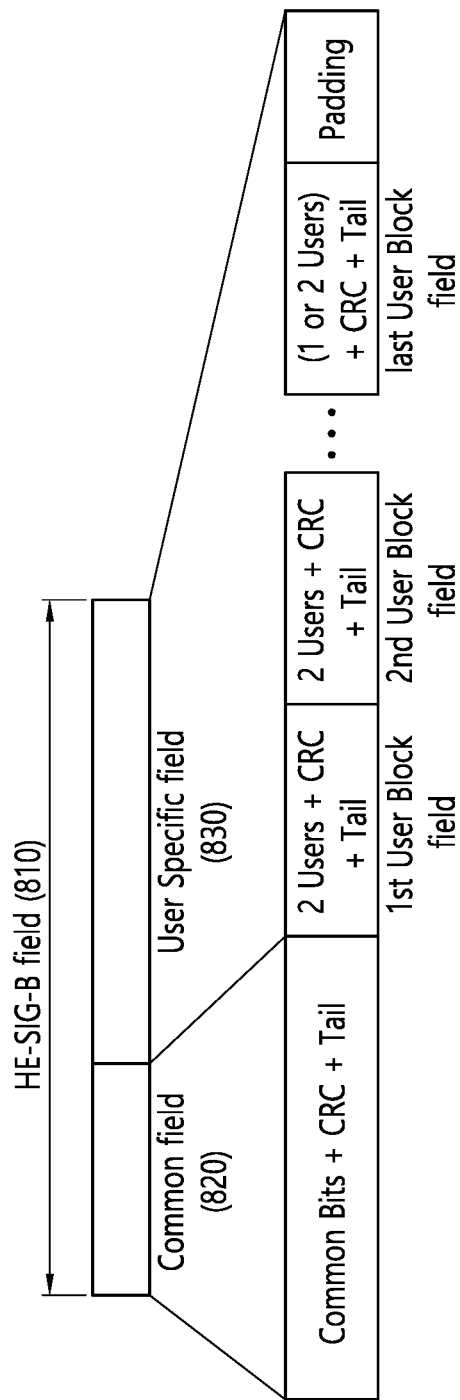
FIG. 8 illustrates a structure of an HE-SIG-B field.

FIG. 8 illustrates a structure of an HE-SIG-B field.

As illustrated, an HE-SIG-B field 810 includes a common field 820 and a user-specific field 830. The common field 820 may include information commonly applied to all users (i.e., user STAs) which receive SIG-B. The user-specific field 830 may be called a user-specific control field. When the SIG-B is transferred to a plurality of users, the user-specific field 830 may be applied only any one of the plurality of users.

As illustrated in FIG. 8, the common field 820 and the user-specific field 830 may be separately encoded.

The common field 820 may include RU allocation information of N*8 bits. For example, the RU allocation information may include information related to a location of an RU. For example, when a 20 MHz channel is used as shown in FIG. 5, the RU allocation information may include information related to a specific frequency band to which a specific RU (26-RU/52-RU/106-RU) is arranged.

An example of a case in which the RU allocation information consists of 8 bits is as follows.

TABLE 1

| 8 bits indices (B7 B6 B5 B4 B3 B2 B1 B0) | #1 | #2 | #3 | #4 | #5 | #6 | #7 | #8 | #9 | Number of entries |
| --- | --- | --- | --- | --- | --- | --- | --- | --- | --- | --- |
| 00000000 | 26 | 26 | 26 | 26 | 26 | 26 | 26 | 26 | 26 | 1 |
| 00000001 | 26 | 26 | 26 | 26 | 26 | 26 | 26 | 50 | | 1 |
| 00000010 | 26 | 26 | 26 | 26 | 26 | 53 | | 26 | 26 | 1 |
| 00000011 | 26 | 26 | 26 | 26 | 26 | 52 | | 52 | | 1 |
| 00000100 | 26 | 26 | 52 | | 26 | 26 | 26 | 26 | 26 | 1 |
| 00000101 | 26 | 26 | 52 | | 26 | 26 | 26 | 52 | | 1 |
| 00000110 | 26 | 26 | 52 | | 26 | 50 | | 26 | 26 | 1 |
| 00000111 | 26 | 26 | 52 | | 26 | 52 | | 52 | | 1 |
| 00001000 | 52 | | 26 | 26 | 26 | 26 | 26 | 26 | 26 | 1 |

As shown the example of FIG. 5, up to nine 26-RUs may be allocated to the 20 MHz channel. When the RU allocation information of the common field 820 is set to "00000000" as shown in Table 1, the nine 26-RUs may be allocated to a corresponding channel (i.e., 20 MHz). In addition, when the RU allocation information of the common field 820 is set to "00000001" as shown in Table 1, seven 26-RUs and one 52-RU are arranged in a corresponding channel. That is, in the example of FIG. 5, the 52-RU may be allocated to the rightmost side, and the seven 26-RUs may be allocated to the left thereof.

The example of Table 1 shows only some of RU locations capable of displaying the RU allocation information.

For example, the RU allocation information may include an example of Table 2 below.

TABLE 2

| 8 bits indices (B7 B6 B5 B4 B3 B2 B1 B0) | #1 | #2 | #3 | #4 | #5 | #6 | #7 | #8 | #9 | Number of entries |
| --- | --- | --- | --- | --- | --- | --- | --- | --- | --- | --- |
| 01000$y_2y_1y_0$ | | 106 | | | 26 | 26 | 26 | 26 | 26 | 8 |
| 01001$y_2y_1y_0$ | | 106 | | | 26 | 26 | 26 | 52 | | 8 |

"01000y2y1y0" relates to an example in which a 106-RU is allocated to the leftmost side of the 20 MHz channel, and five 26-RUs are allocated to the right side thereof. In this case, a plurality of STAs (e.g., user-STAs) may be allocated to the 106-RU, based on an MU-MIMO scheme. Specifically, up to 8 STAs (e.g., user-STAs) may be allocated to the 106-RU, and the number of STAs (e.g., user-STAs) allocated to the 106-RU is determined based on 3-bit information ($y_2y_1y_0$). For example, when the 3-bit information ($y_2y_1y_0$) is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 8, the user-specific field 830 may include a plurality of user fields. As described above, the number of STAs (e.g., user STAs) allocated to a specific channel may be determined based on the RU allocation information of the common field 820. For example, when the RU allocation information of the common field 820 is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "01000y2y1y0", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 9.

Figure 9:
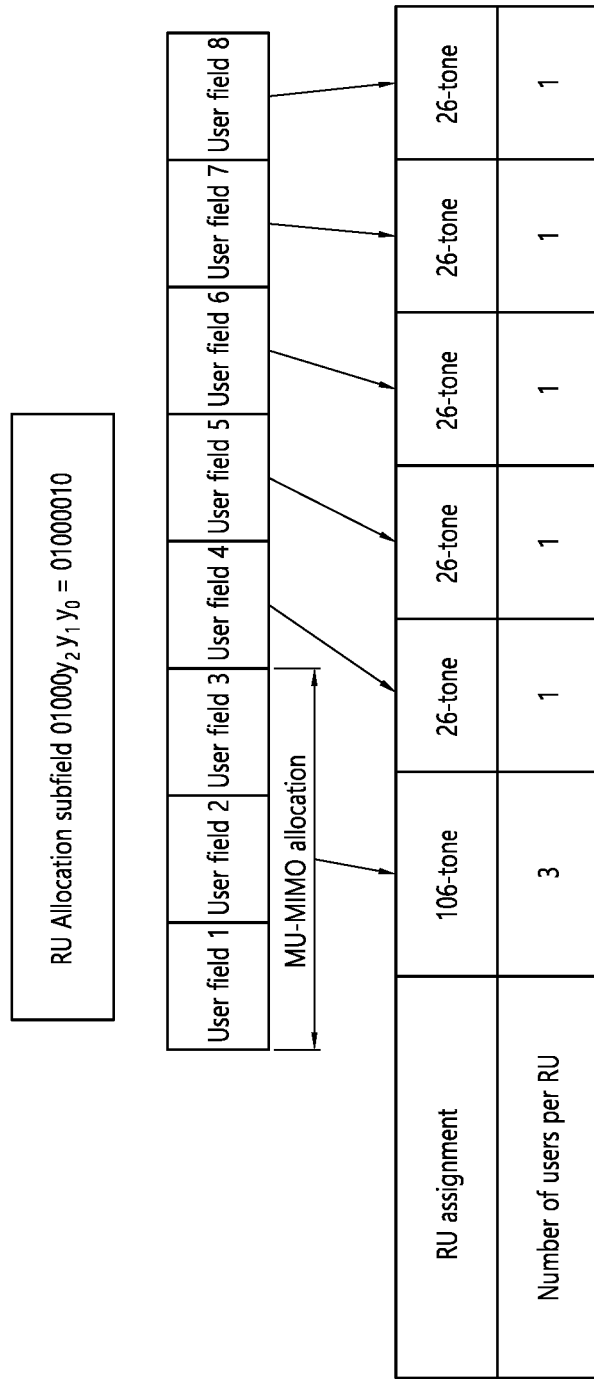
FIG. 9 illustrates an example in which a plurality of user STAs are allocated to the same RU through an MU-MIMO scheme.

FIG. 9 illustrates an example in which a plurality of user STAs are allocated to the same RU through an MU-MIMO scheme.

For example, when RU allocation is set to "01000010" as shown in FIG. 9, a 106-RU may be allocated to the leftmost side of a specific channel, and five 26-RUs may be allocated to the right side thereof. In addition, three user STAs may be allocated to the 106-RU through the MU-MIMO scheme. As a result, since eight user STAs are allocated, the user-specific field 830 of HE-SIG-B may include eight user fields.

The eight user fields may be expressed in the order shown in FIG. 9. In addition, as shown in FIG. 8, two user fields may be implemented with one user block field.

The user fields shown in FIG. 8 and FIG. 9 may be configured based on two formats. That is, a user field related to an MU-MIMO scheme may be configured in a first format, and a user field related to a non-MIMO scheme may be configured in a second format. Referring to the example of FIG. 9, a user field 1 to a user field 3 may be based on the first format, and a user field 4 to a user field 8 may be based on the second format. The first format or the second format may include bit information of the same length (e.g., 21 bits).

Each user field may have the same size (e.g., 21 bits). For example, the user field of the first format (the first of the MU-MIMO scheme) may be configured as follows.

For example, a first bit (i.e., B0-B10) in the user field (i.e., 21 bits) may include identification information (e.g., STA-ID, partial AID, etc.) of a user STA to which a corresponding user field is allocated. In addition, a second bit (i.e., B11-B14) in the user field (i.e., 21 bits) may include information related to a spatial configuration. Specifically, an example of the second bit (i.e., B11-B14) may be as shown in Table 3 and Table 4 below.

TABLE 3

| $N_{user}$ | B3...B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 2 | 0000-0011 | 1-4 | 1 | | | | | | | 2-5 | 10 |
|   | 0100-0110 | 2-4 | 2 | | | | | | | 4-6 | |
|   | 0111-1000 | 3-4 | 3 | | | | | | | 6-7 | |
|   | 1001 | 4 | 4 | | | | | | | 8 | |
| 3 | 0000-0011 | 1-4 | 1 | 1 | | | | | | 3-6 | 13 |
|   | 0100-0110 | 2-4 | 2 | 1 | | | | | | 5-7 | |
|   | 0111-1000 | 3-4 | 3 | 1 | | | | | | 7-8 | |
|   | 1001-1011 | 2-4 | 2 | 2 | | | | | | 6-8 | |
|   | 1100 | 3 | 3 | 2 | | | | | | 8 | |
| 4 | 0000-0011 | 1-4 | 1 | 1 | 1 | | | | | 4-7 | 11 |
|   | 0100-0110 | 2-4 | 2 | 1 | 1 | | | | | 6-8 | |
|   | 0111 | 3 | 3 | 1 | 1 | | | | | 8 | |
|   | 1000-1001 | 2-3 | 2 | 2 | 1 | | | | | 7-8 | |
|   | 1010 | 2 | 2 | 2 | 2 | | | | | 8 | |

TABLE 4

| $N_{user}$ | B3...B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 5 | 0000-0011 | 1-4 | 1 | 1 | 1 | 1 | | | | 5-8 | 7 |
|   | 0100-0101 | 2-3 | 2 | 1 | 1 | 1 | | | | 7-8 | |
|   | 0110 | 2 | 2 | 2 | 1 | 1 | | | | 8 | |
| 6 | 0000-0010 | 1-3 | 1 | 1 | 1 | 1 | 1 | | | 6-8 | 4 |
|   | 0011 | 2 | 2 | 1 | 1 | 1 | 1 | | | 8 | |
| 7 | 0000-0001 | 1-2 | 1 | 1 | 1 | 1 | 1 | 1 | | 7-8 | 2 |
| 8 | 0000 | 1 | 1 | 1 | 1 | 1 | 1 | 1 | 1 | 8 | 1 |

As shown in Table 3 and/or Table 4, the second bit (e.g., B11-B14) may include information related to the number of spatial streams allocated to the plurality of user STAs which are allocated based on the MU-MIMO scheme. For example, when three user STAs are allocated to the 106-RU based on the MU-MIMO scheme as shown in FIG. 9, N user is set to "3". Therefore, values of N_STS[1], N_STS[2], and N_STS [3] may be determined as shown in Table 3. For example, when a value of the second bit (B11-B14) is "0011", it may be set to N_STS[1]=4, N_STS[2]=1, N_STS[3]=1. That is, in the example of FIG. 9, four spatial streams may be allocated to the user field 1, one spatial stream may be allocated to the user field 1, and one spatial stream may be allocated to the user field 3.

As shown in the example of Table 3 and/or Table 4, information (i.e., the second bit, B11-B14) related to the number of spatial streams for the user STA may consist of 4 bits. In addition, the information (i.e., the second bit, B11-B14) on the number of spatial streams for the user STA may support up to eight spatial streams. In addition, the information (i.e., the second bit, B11-B14) on the number of spatial streams for the user STA may support up to four spatial streams for one user STA.

In addition, a third bit (i.e., B15-18) in the user field (i.e., 21 bits) may include modulation and coding scheme (MCS) information. The MCS information may be applied to a data field in a PPDU including corresponding SIG-B.

An MCS, MCS information, an MCS index, an MCS field, or the like used in the present specification may be indicated by an index value. For example, the MCS information may be indicated by an index 0 to an index 11. The MCS information may include information related to a constellation modulation type (e.g., BPSK, QPSK, 16-QAM, 64-QAM, 256-QAM, 1024-QAM, etc.) and information related to a coding rate (e.g., 1/2, 2/3, 3/4, 5/6e, etc.). Information related to a channel coding type (e.g., LCC or LDPC) may be excluded in the MCS information.

In addition, a fourth bit (i.e., B19) in the user field (i.e., 21 bits) may be a reserved field.

In addition, a fifth bit (i.e., B20) in the user field (i.e., 21 bits) may include information related to a coding type (e.g., BCC or LDPC). That is, the fifth bit (i.e., B20) may include information related to a type (e.g., BCC or LDPC) of channel coding applied to the data field in the PPDU including the corresponding SIG-B.

The aforementioned example relates to the user field of the first format (the format of the MU-MIMO scheme). An example of the user field of the second format (the format of the non-MU-MIMO scheme) is as follows.

A first bit (e.g., B0-B10) in the user field of the second format may include identification information of a user STA. In addition, a second bit (e.g., B11-B13) in the user field of the second format may include information related to the number of spatial streams applied to a corresponding RU. In addition, a third bit (e.g., B14) in the user field of the second format may include information related to whether a beamforming steering matrix is applied. A fourth bit (e.g., B15-B18) in the user field of the second format may include modulation and coding scheme (MCS) information. In addition, a fifth bit (e.g., B19) in the user field of the second format may include information related to whether dual carrier modulation (DCM) is applied. In addition, a sixth bit (i.e., B20) in the user field of the second format may include information related to a coding type (e.g., BCC or LDPC).

Figure 10:
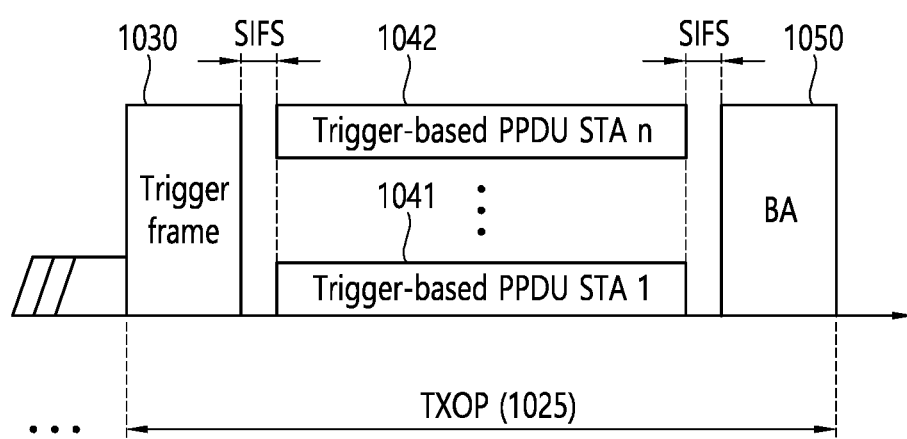
FIG. 10 illustrates an operation based on UL-MU.

FIG. 10 illustrates an operation based on UL-MU. As illustrated, a transmitting STA (e.g., an AP) may perform channel access through contending (e.g., a backoff operation), and may transmit a trigger frame 1030. That is, the transmitting STA may transmit a PPDU including the trigger frame 1030. Upon receiving the PPDU including the trigger frame, a trigger-based (TB) PPDU is transmitted after a delay corresponding to SIFS.

TB PPDUs 1041 and 1042 may be transmitted at the same time period, and may be transmitted from a plurality of STAs (e.g., user STAs) having AIDs indicated in the trigger frame 1030. An ACK frame 1050 for the TB PPDU may be implemented in various forms.

A specific feature of the trigger frame is described with reference to FIG. 11 to FIG. 13. Even if UL-MU communication is used, an orthogonal frequency division multiple access (OFDMA) scheme or an MU MIMO scheme may be used, and the OFDMA and MU-MIMO schemes may be simultaneously used.

Figure 11:
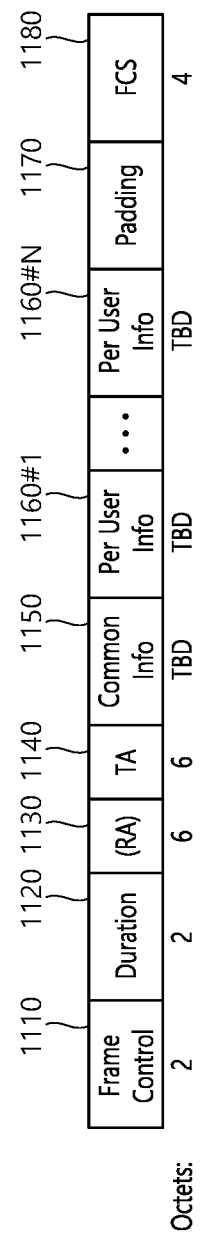
FIG. 11 illustrates an example of a trigger frame.

FIG. 11 illustrates an example of a trigger frame. The trigger frame of FIG. 11 allocates a resource for uplink multiple-user (MU) transmission, and may be transmitted, for example, from an AP. The trigger frame may be configured of a MAC frame, and may be included in a PPDU.

Each field shown in FIG. 11 may be partially omitted, and another field may be added. In addition, a length of each field may be changed to be different from that shown in the figure.

A frame control field 1110 of FIG. 11 may include information related to a MAC protocol version and extra additional control information. A duration field 1120 may include time information for NAV configuration or information related to an identifier (e.g., AID) of a STA.

In addition, an RA field 1130 may include address information of a receiving STA of a corresponding trigger frame, and may be optionally omitted. A TA field 1140 may include address information of a STA (e.g., an AP) which transmits the corresponding trigger frame. A common information field 1150 includes common control information applied to the receiving STA which receives the corresponding trigger frame. For example, a field indicating a length of an L-SIG field of an uplink PPDU transmitted in response to the corresponding trigger frame or information for controlling content of a SIG-A field (i.e., HE-SIG-A field) of the uplink PPDU transmitted in response to the corresponding trigger frame may be included. In addition, as common control information, information related to a length of a CP of the uplink PPDU transmitted in response to the corresponding trigger frame or information related to a length of an LTF field may be included.

In addition, per user information fields 1160 #1 to 1160 #N corresponding to the number of receiving STAs which receive the trigger frame of FIG. 11 are preferably included. The per user information field may also be called an "allocation field".

In addition, the trigger frame of FIG. 11 may include a padding field 1170 and a frame check sequence field 1180.

Each of the per user information fields 1160 #1 to 1160 #N shown in FIG. 11 may include a plurality of subfields.

Figure 12:
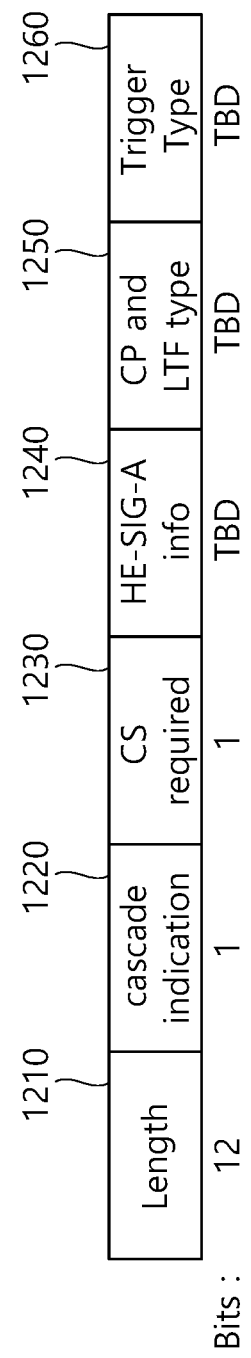
FIG. 12 illustrates an example of a common information field of a trigger frame.

FIG. 12 illustrates an example of a common information field of a trigger frame. A subfield of FIG. 12 may be partially omitted, and an extra subfield may be added. In addition, a length of each subfield illustrated may be changed.

A length field 1210 illustrated has the same value as a length field of an L-SIG field of an uplink PPDU transmitted in response to a corresponding trigger frame, and a length field of the L-SIG field of the uplink PPDU indicates a length of the uplink PPDU. As a result, the length field 1210 of the trigger frame may be used to indicate the length of the corresponding uplink PPDU.

In addition, a cascade identifier field 1220 indicates whether a cascade operation is performed. The cascade operation implies that downlink MU transmission and uplink MU transmission are performed together in the same TXOP. That is, it implies that downlink MU transmission is performed and thereafter uplink MU transmission is performed after a pre-set time (e.g., SIFS). During the cascade operation, only one transmitting device (e.g., AP) may perform downlink communication, and a plurality of transmitting devices (e.g., non-APs) may perform uplink communication.

A CS request field 1230 indicates whether a wireless medium state or a NAV or the like is necessarily considered in a situation where a receiving device which has received a corresponding trigger frame transmits a corresponding uplink PPDU.

An HE-SIG-A information field 1240 may include information for controlling content of a SIG-A field (i.e., HE-SIG-A field) of the uplink PPDU in response to the corresponding trigger frame.

A CP and LTF type field 1250 may include information related to a CP length and LTF length of the uplink PPDU transmitted in response to the corresponding trigger frame. A trigger type field 1260 may indicate a purpose of using the corresponding trigger frame, for example, typical triggering, triggering for beamforming, a request for block ACK/NACK, or the like.

It may be assumed that the trigger type field 1260 of the trigger frame in the present specification indicates a trigger frame of a basic type for typical triggering. For example, the trigger frame of the basic type may be referred to as a basic trigger frame.

Figure 13:
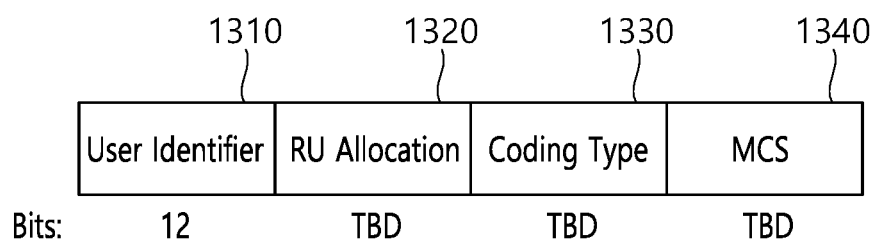
FIG. 13 illustrates an example of a subfield included in a per user information field.

FIG. 13 illustrates an example of a subfield included in a per user information field. A user information field 1300 of FIG. 13 may be understood as any one of the per user information fields 1160 #1 to 1160 #N mentioned above with reference to FIG. 11. A subfield included in the user information field 1300 of FIG. 13 may be partially omitted, and an extra subfield may be added. In addition, a length of each subfield illustrated may be changed.

A user identifier field 1310 of FIG. 13 indicates an identifier of a STA (i.e., receiving STA) corresponding to per user information. An example of the identifier may be the entirety or part of an association identifier (AID) value of the receiving STA.

In addition, an RU allocation field 1320 may be included. That is, when the receiving STA identified through the user identifier field 1310 transmits a TB PPDU in response to the trigger frame, the TB PPDU is transmitted through an RU indicated by the RU allocation field 1320. In this case, the RU indicated by the RU allocation field 1320 may be an RU shown in FIG. 5, FIG. 6, and FIG. 7.

The subfield of FIG. 13 may include a coding type field 1330. The coding type field 1330 may indicate a coding type of the TB PPDU. For example, when BCC coding is applied to the TB PPDU, the coding type field 1330 may be set to '1', and when LDPC coding is applied, the coding type field 1330 may be set to '0'.

In addition, the subfield of FIG. 13 may include an MCS field 1340. The MCS field 1340 may indicate an MCS scheme applied to the TB PPDU. For example, when BCC coding is applied to the TB PPDU, the coding type field 1330 may be set to '1', and when LDPC coding is applied, the coding type field 1330 may be set to '0'.

Hereinafter, a UL OFDMA-based random access (UORA) scheme will be described.

Figure 14:
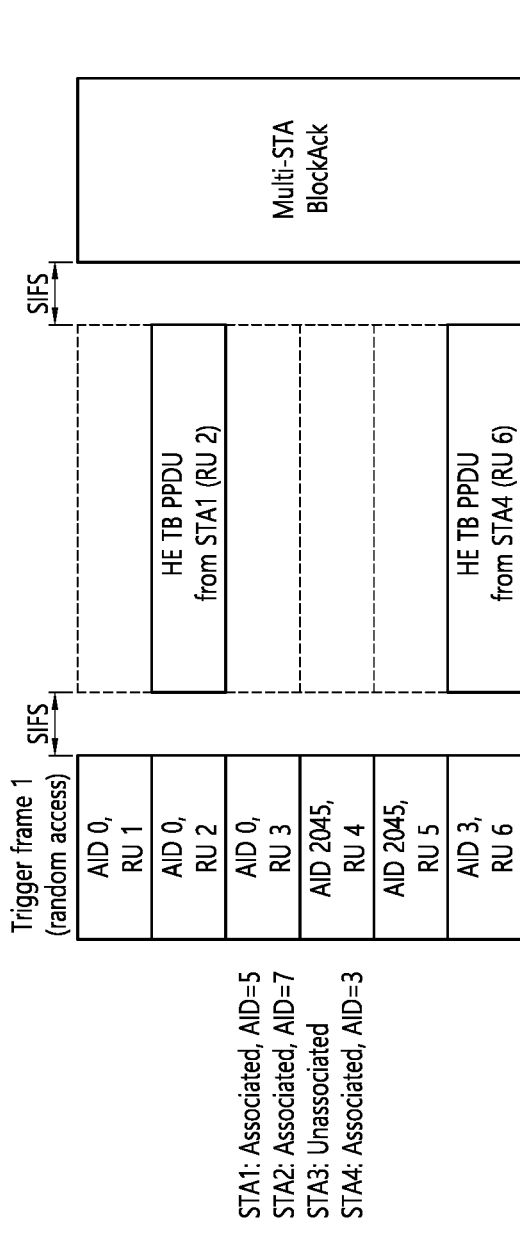
FIG. 14 describes a technical feature of the UORA scheme.

FIG. 14 describes a technical feature of the UORA scheme.

A transmitting STA (e.g., an AP) may allocate six RU resources through a trigger frame as shown in FIG. 14. Specifically, the AP may allocate a 1st RU resource (AID 0, RU 1), a 2nd RU resource (AID 0, RU 2), a 3rd RU resource (AID 0, RU 3), a 4th RU resource (AID 2045, RU 4), a 5th RU resource (AID 2045, RU 5), and a 6th RU resource (AID 3, RU 6). Information related to the AID 0, AID 3, or AID 2045 may be included, for example, in the user identifier field 1310 of FIG. 13. Information related to the RU 1 to RU 6 may be included, for example, in the RU allocation field 1320 of FIG. 13. AID=0 may imply a UORA resource for an associated STA, and AID=2045 may imply a UORA resource for an un-associated STA. Accordingly, the 1st to 3rd RU resources of FIG. 14 may be used as a UORA resource for the associated STA, the 4th and 5th RU resources of FIG. 14 may be used as a UORA resource for the un-associated STA, and the 6th RU resource of FIG. 14 may be used as a typical resource for UL MU.

In the example of FIG. 14, an OFDMA random access backoff (OBO) of a STA1 is decreased to 0, and the STA1 randomly selects the 2nd RU resource (AID 0, RU 2). In addition, since an OBO counter of a STA2/3 is greater than 0, an uplink resource is not allocated to the STA2/3. In addition, regarding a STA4 in FIG. 14, since an AID (e.g., AID=3) of the STA4 is included in a trigger frame, a resource of the RU 6 is allocated without backoff.

Specifically, since the STA1 of FIG. 14 is an associated STA, the total number of eligible RA RUs for the STA1 is 3 (RU 1, RU 2, and RU 3), and thus the STA1 decreases an OBO counter by 3 so that the OBO counter becomes 0. In addition, since the STA2 of FIG. 14 is an associated STA, the total number of eligible RA RUs for the STA2 is 3 (RU 1, RU 2, and RU 3), and thus the STA2 decreases the OBO counter by 3 but the OBO counter is greater than 0. In addition, since the STA3 of FIG. 14 is an un-associated STA, the total number of eligible RA RUs for the STA3 is 2 (RU 4, RU 5), and thus the STA3 decreases the OBO counter by 2 but the OBO counter is greater than 0.

Figure 15:
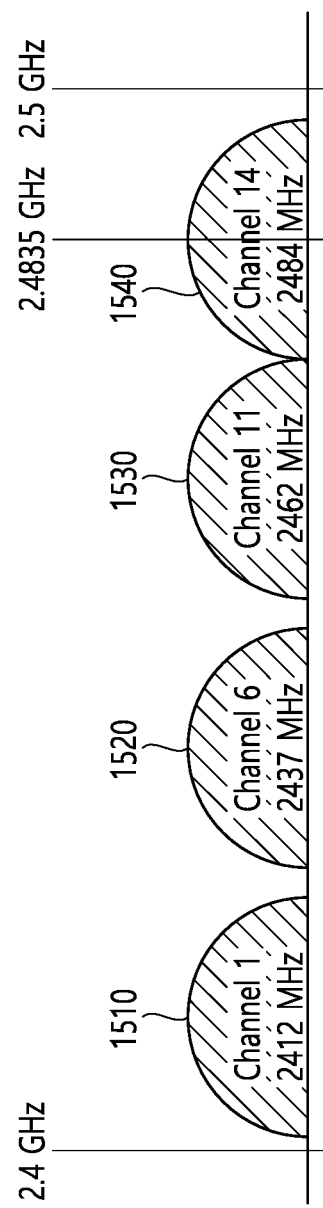
FIG. 15 illustrates an example of a channel used/supported/defined within a 2.4 GHz band.

FIG. 15 illustrates an example of a channel used/supported/defined within a 2.4 GHz band.

The 2.4 GHz band may be called in other terms such as a first band. In addition, the 2.4 GHz band may imply a frequency domain in which channels of which a center frequency is close to 2.4 GHz (e.g., channels of which a center frequency is located within 2.4 to 2.5 GHz) are used/supported/defined.

A plurality of 20 MHz channels may be included in the 2.4 GHz band. 20 MHz within the 2.4 GHz may have a plurality of channel indices (e.g., an index 1 to an index 14). For example, a center frequency of a 20 MHz channel to which a channel index 1 is allocated may be 2.412 GHz, a center frequency of a 20 MHz channel to which a channel index 2 is allocated may be 2.417 GHz, and a center frequency of a 20 MHz channel to which a channel index N is allocated may be (2.407+0.005*N) GHz. The channel index may be called in various terms such as a channel number or the like. Specific numerical values of the channel index and center frequency may be changed.

FIG. 15 exemplifies 4 channels within a 2.4 GHz band. Each of 1st to 4th frequency domains 1510 to 1540 shown herein may include one channel. For example, the 1st frequency domain 1510 may include a channel 1 (a 20 MHz channel having an index 1). In this case, a center frequency of the channel 1 may be set to 2412 MHz. The 2nd frequency domain 1520 may include a channel 6. In this case, a center frequency of the channel 6 may be set to 2437 MHz. The 3rd frequency domain 1530 may include a channel 11. In this case, a center frequency of the channel 11 may be set to 2462 MHz. The 4th frequency domain 1540 may include a channel 14. In this case, a center frequency of the channel 14 may be set to 2484 MHz.

Figure 16:
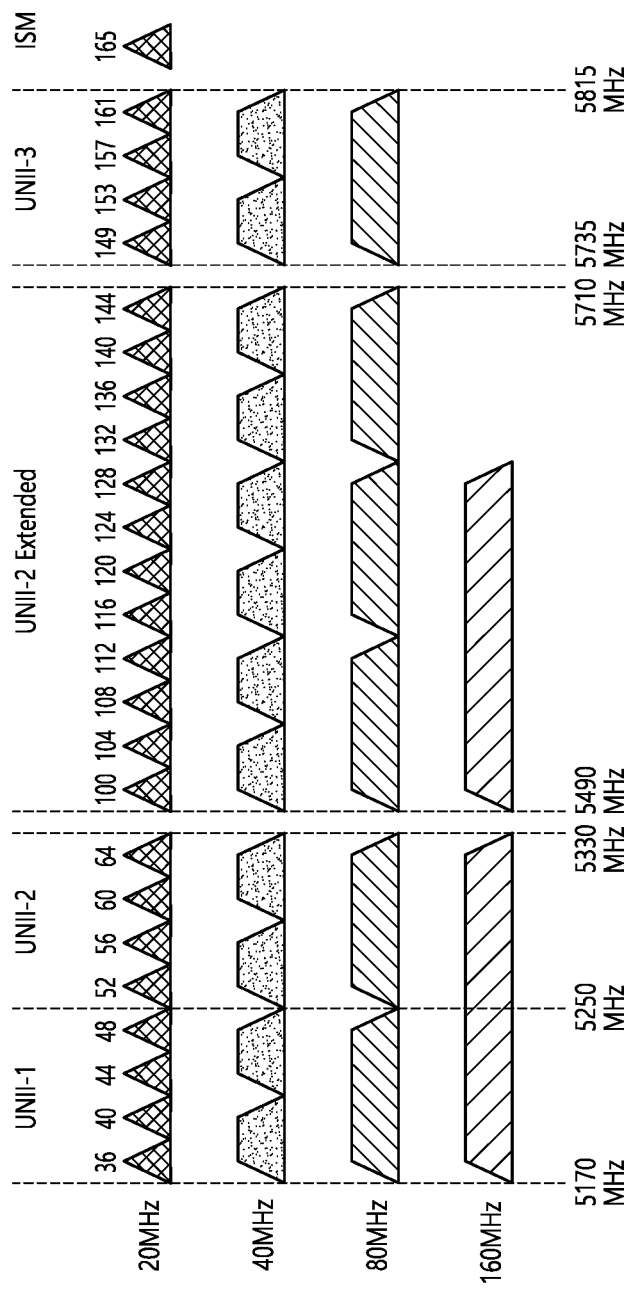
FIG. 16 illustrates an example of a channel used/supported/defined within a 5 GHz band.

FIG. 16 illustrates an example of a channel used/supported/defined within a 5 GHz band.

The 5 GHz band may be called in other terms such as a second band or the like. The 5 GHz band may imply a frequency domain in which channels of which a center frequency is greater than or equal to 5 GHz and less than 6 GHz (or less than 5.9 GHz) are used/supported/defined. Alternatively, the 5 GHz band may include a plurality of channels between 4.5 GHz and 5.5 GHz. A specific numerical value shown in FIG. 16 may be changed.

A plurality of channels within the 5 GHz band include an unlicensed national information infrastructure (UNII)-1, a UNII-2, a UNII-3, and an ISM. The UNII-1 may be called UNII Low. The UNII-2 may include a frequency domain called UNII Mid and UNII-2Extended. The UNII-3 may be called UNII-Upper.

A plurality of channels may be configured within the 5 GHz band, and a bandwidth of each channel may be variously set to, for example, 20 MHz, 40 MHz, 80 MHz, 160 MHz, or the like. For example, 5170 MHz to 5330 MHz frequency domains/ranges within the UNII-1 and UNII-2 may be divided into eight 20 MHz channels. The 5170 MHz to 5330 MHz frequency domains/ranges may be divided into four channels through a 40 MHz frequency domain. The 5170 MHz to 5330 MHz frequency domains/ranges may be divided into two channels through an 80 MHz frequency domain. Alternatively, the 5170 MHz to 5330 MHz frequency domains/ranges may be divided into one channel through a 160 MHz frequency domain.

Figure 17:
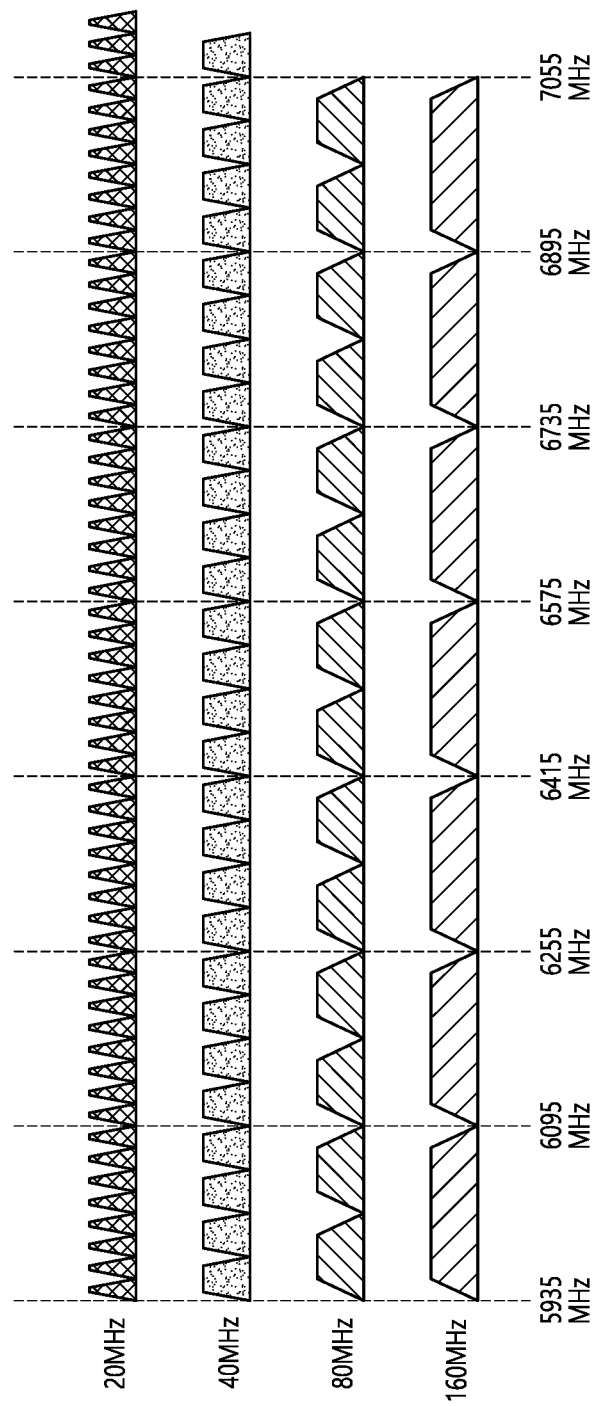
FIG. 17 illustrates an example of a channel used/supported/defined within a 6 GHz band.

FIG. 17 illustrates an example of a channel used/supported/defined within a 6 GHz band.

The 6 GHz band may be called in other terms such as a third band or the like. The 6 GHz band may imply a frequency domain in which channels of which a center frequency is greater than or equal to 5.9 GHz are used/supported/defined. A specific numerical value shown in FIG. 17 may be changed.

For example, the 20 MHz channel of FIG. 17 may be defined starting from 5.940 GHz. Specifically, among 20 MHz channels of FIG. 17, the leftmost channel may have an index 1 (or a channel index, a channel number, etc.), and 5.945 GHz may be assigned as a center frequency. That is, a center frequency of a channel of an index N may be determined as (5.940+0.005*N) GHz.

Accordingly, an index (or channel number) of the 2 MHz channel of FIG. 17 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, 233. In addition, according to the aforementioned (5.940+0.005*N) GHz rule, an index of the 40 MHz channel of FIG. 17 may be 3, 11, 19, 27, 35, 43, 51, 59, 67, 75, 83, 91, 99, 107, 115, 123, 131, 139, 147, 155, 163, 171, 179, 187, 195, 203, 211, 219, 227.

Although 20, 40, 80, and 160 MHz channels are illustrated in the example of FIG. 17, a 240 MHz channel or a 320 MHz channel may be additionally added.

Hereinafter, a PPDU transmitted/received in a STA of the present specification will be described.

Figure 18:
FIG. 18 illustrates an example of a PPDU used in the present specification.

FIG. 18 illustrates an example of a PPDU used in the present specification.

The PPDU of FIG. 18 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

The PPDU of FIG. 18 may indicate the entirety or part of a PPDU type used in the EHT system. For example, the example of FIG. 18 may be used for both of a single-user (SU) mode and a multi-user (MU) mode. In other words, the PPDU of FIG. 18 may be a PPDU for one receiving STA or a plurality of receiving STAs. When the PPDU of FIG. 18 is used for a trigger-based (TB) mode, the EHT-SIG of FIG. 18 may be omitted. In other words, an STA which has received a trigger frame for uplink-MU (UL-MU) may transmit the PPDU in which the EHT-SIG is omitted in the example of FIG. 18.

In FIG. 18, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 18 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 kHz.

In the PPDU of FIG. 18, the L-LTE and the L-STF may be the same as those in the conventional fields.

The L-SIG field of FIG. 18 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to a length or time duration of a PPDU. For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a 1/2 coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier{subcarrier index −21, −7, +7, +21} and a DC subcarrier {subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index{−28, −27, +27, +28}. The aforementioned signal may be used for channel estimation on a frequency domain corresponding to {−28, −27, +27, +28}.

The transmitting STA may generate an RL-SIG generated in the same manner as the L-SIG. BPSK modulation may be applied to the RL-SIG. The receiving STA may know that the RX PPDU is the HE PPDU or the EHT PPDU, based on the presence of the RL-SIG.

A universal SIG (U-SIG) may be inserted after the RL-SIG of FIG. 18. The U-SIB may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 μs. Each symbol of the U-SIG may be used to transmit the 26-bit information. For example, each symbol of the U-SIG may be transmitted/received based on 52 data tomes and 4 pilot tones.

Through the U-SIG (or U-SIG field), for example, A-bit information (e.g., 52 un-coded bits) may be transmitted. A first symbol of the U-SIG may transmit first X-bit information (e.g., 26 un-coded bits) of the A-bit information, and a second symbol of the U-SIB may transmit the remaining Y-bit information (e.g. 26 un-coded bits) of the A-bit information. For example, the transmitting STA may obtain 26 un-coded bits included in each U-SIG symbol. The transmitting STA may perform convolutional encoding (i.e., BCC encoding) based on a rate of R=1/2 to generate 52-coded bits, and may perform interleaving on the 52-coded bits. The transmitting STA may perform BPSK modulation on the interleaved 52-coded bits to generate 52 BPSK symbols to be allocated to each U-SIG symbol. One U-SIG symbol may be transmitted based on 65 tones (subcarriers) from a subcarrier index −28 to a subcarrier index +28, except for a DC index 0. The 52 BPSK symbols generated by the transmitting STA may be transmitted based on the remaining tones (subcarriers) except for pilot tones, i.e., tones −21, −7, +7, +21.

For example, the A-bit information (e.g., 52 un-coded bits) generated by the U-SIG may include a CRC field (e.g., a field having a length of 4 bits) and a tail field (e.g., a field having a length of 6 bits). The CRC field and the tail field may be transmitted through the second symbol of the U-SIG. The CRC field may be generated based on 26 bits allocated to the first symbol of the U-SIG and the remaining 16 bits except for the CRC/tail fields in the second symbol, and may be generated based on the conventional CRC calculation algorithm. In addition, the tail field may be used to terminate trellis of a convolutional decoder, and may be set to, for example, "000000".

The A-bit information (e.g., 52 un-coded bits) transmitted by the U-SIG (or U-SIG field) may be divided into version-independent bits and version-dependent bits. For example, the version-independent bits may have a fixed or variable size. For example, the version-independent bits may be allocated only to the first symbol of the U-SIG, or the version-independent bits may be allocated to both of the first and second symbols of the U-SIG. For example, the version-independent bits and the version-dependent bits may be called in various terms such as a first control bit, a second control bit, or the like.

For example, the version-independent bits of the U-SIG may include a PHY version identifier of 3 bits. For example, the PHY version identifier of 3 bits may include information related to a PHY version of a TX/RX PPDU. For example, a first value of the PHY version identifier of 3 bits may indicate that the TX/RX PPDU is an EHT PPDU. In other words, when the transmitting STA transmits the EHT PPDU, the PHY version identifier of 3 bits may be set to a first value. In other words, the receiving STA may determine that the RX PPDU is the EHT PPDU, based on the PHY version identifier having the first value.

For example, the version-independent bits of the U-SIG may include a UL/DL flag field of 1 bit. A first value of the UL/DL flag field of 1 bit relates to UL communication, and a second value of the UL/DL flag field relates to DL communication.

For example, the version-independent bits of the U-SIG may include information related to a TXOP length and information related to a BSS color ID.

For example, when the EHT PPDU is divided into various types (e.g., various types such as an EHT PPDU related to an SU mode, an EHT PPDU related to an MU mode, an EHT PPDU related to a TB mode, an EHT PPDU related to extended range transmission, or the like), information related to the type of the EHT PPDU may be included in the version-dependent bits of the U-SIG.

For example, the U-SIG may include: 1) a bandwidth field including information related to a bandwidth; 2) a field including information related to an MCS scheme applied to EHT-SIG; 3) an indication field including information regarding whether a dual subcarrier modulation (DCM) scheme is applied to EHT-SIG; 4) a field including information related to the number of symbol used for EHT-SIG; 5) a field including information regarding whether the EHT-SIG is generated across a full band; 6) a field including information related to a type of EHT-LTF/STF; and 7) information related to a field indicating an EHT-LTF length and a CP length.

Preamble puncturing may be applied to the PPDU of FIG. 18. The preamble puncturing implies that puncturing is applied to part (e.g., a secondary 20 MHz band) of the full band. For example, when an 80 MHz PPDU is transmitted, an STA may apply puncturing to the secondary 20 MHz band out of the 80 MHz band, and may transmit a PPDU only through a primary 20 MHz band and a secondary 40 MHz band.

For example, a pattern of the preamble puncturing may be configured in advance. For example, when a first puncturing pattern is applied, puncturing may be applied only to the secondary 20 MHz band within the 80 MHz band. For example, when a second puncturing pattern is applied, puncturing may be applied to only any one of two secondary 20 MHz bands included in the secondary 40 MHz band within the 80 MHz band. For example, when a third puncturing pattern is applied, puncturing may be applied to only the secondary 20 MHz band included in the primary 80 MHz band within the 160 MHz band (or 80+80 MHz band). For example, when a fourth puncturing is applied, puncturing may be applied to at least one 20 MHz channel not belonging to a primary 40 MHz band in the presence of the primary 40 MHz band included in the 80 MHz band within the 160 MHz band (or 80+80 MHz band).

Information related to the preamble puncturing applied to the PPDU may be included in U-SIG and/or EHT-SIG. For example, a first field of the U-SIG may include information related to a contiguous bandwidth, and second field of the U-SIG may include information related to the preamble puncturing applied to the PPDU.

For example, the U-SIG and the EHT-SIG may include the information related to the preamble puncturing, based on the following method. When a bandwidth of the PPDU exceeds 80 MHz, the U-SIG may be configured individually in unit of 80 MHz. For example, when the bandwidth of the PPDU is 160 MHz, the PPDU may include a first U-SIG for a first 80 MHz band and a second U-SIG for a second 80 MHz band. In this case, a first field of the first U-SIG may include information related to a 160 MHz bandwidth, and a second field of the first U-SIG may include information related to a preamble puncturing (i.e., information related to a preamble puncturing pattern) applied to the first 80 MHz band. In addition, a first field of the second U-SIG may include information related to a 160 MHz bandwidth, and a second field of the second U-SIG may include information related to a preamble puncturing (i.e., information related to a preamble puncturing pattern) applied to the second 80 MHz band. Meanwhile, an EHT-SIG contiguous to the first U-SIG may include information related to a preamble puncturing applied to the second 80 MHz band (i.e., information related to a preamble puncturing pattern), and an EHT-SIG contiguous to the second U-SIG may include information related to a preamble puncturing (i.e., information related to a preamble puncturing pattern) applied to the first 80 MHz band.

Additionally or alternatively, the U-SIG and the EHT-SIG may include the information related to the preamble puncturing, based on the following method. The U-SIG may include information related to a preamble puncturing (i.e., information related to a preamble puncturing pattern) for all bands. That is, the EHT-SIG may not include the information related to the preamble puncturing, and only the U-SIG may include the information related to the preamble puncturing (i.e., the information related to the preamble puncturing pattern).

The U-SIG may be configured in unit of 20 MHz. For example, when an 80 MHz PPDU is configured, the U-SIG may be duplicated. That is, four identical U-SIGs may be included in the 80 MHz PPDU. PPDUs exceeding an 80 MHz bandwidth may include different U-SIGs.

The U-SIG may be configured in unit of 20 MHz. For example, when an 80 MHz PPDU is configured, the U-SIG may be duplicated. That is, four identical U-SIGs may be included in the 80 MHz PPDU. PPDUs exceeding an 80 MHz bandwidth may include different U-SIGs.

The EHT-SIG of FIG. 18 may include control information for the receiving STA. The EHT-SIG may be transmitted through at least one symbol, and one symbol may have a length of 4 μs. Information related to the number of symbols used for the EHT-SIG may be included in the U-SIG.

The EHT-SIG may include a technical feature of the HE-SIG-B described with reference to FIG. 8 and FIG. 9. For example, the EHT-SIG may include a common field and a user-specific field as in the example of FIG. 8. The common field of the EHT-SIG may be omitted, and the number of user-specific fields may be determined based on the number of users.

As in the example of FIG. 8, the common field of the EHT-SIG and the user-specific field of the EHT-SIG may be individually coded. One user block field included in the user-specific field may include information for two users, but a last user block field included in the user-specific field may include information for one user. That is, one user block field of the EHT-SIG may include up to two user fields. As in the example of FIG. 9, each user field may be related to MU-MIMO allocation, or may be related to non-MU-MIMO allocation.

As in the example of FIG. 8, the common field of the EHT-SIG may include a CRC bit and a tail bit. A length of the CRC bit may be determined as 4 bits. A length of the tail bit may be determined as 6 bits, and may be set to '000000'.

As in the example of FIG. 8, the common field of the EHT-SIG may include RU allocation information. The RU allocation information may imply information related to a location of an RU to which a plurality of users (i.e., a plurality of receiving STAs) are allocated. The RU allocation information may be configured in unit of 8 bits (or N bits), as in Table 1.

The example of Table 5 to Table 7 is an example of 8-bit (or N-bit) information for various RU allocations. An index shown in each table may be modified, and some entries in Table 5 to Table 7 may be omitted, and entries (not shown) may be added.

The example of Table 5 to Table 7 relates to information related to a location of an RU allocated to a 20 MHz band.

For example, 'an index 0' of Table 5 may be used in a situation where nine 26-RUs are individually allocated (e.g., in a situation where nine 26-RUs shown in FIG. 5 are individually allocated).

Meanwhile, a plurality or RUs may be allocated to one STA in the EHT system. For example, regarding 'an index 60' of Table 6, one 26-RU may be allocated for one user (i.e., receiving STA) to the leftmost side of the 20 MHz band, one 26-RU and one 52-RU may be allocated to the right side thereof, and five 26-RUs may be individually allocated to the right side thereof.

TABLE 5

| Indices | #1 | #2 | #3 | #4 | #5 | #6 | #7 | #8 | #9 | Number of entries |
|---|---|---|---|---|---|---|---|---|---|---|
| 0 | 26 | 26 | 26 | 26 | 26 | 26 | 26 | 26 | 26 | 1 |
| 1 | 26 | 26 | 26 | 26 | 26 | 26 | 26 |   | 52 | 1 |
| 2 | 26 | 26 | 26 | 26 | 26 |   | 52 | 26 | 26 | 1 |
| 3 | 26 | 26 | 26 | 26 | 26 |   | 52 |   | 52 | 1 |
| 4 | 26 | 26 |   | 52 | 26 | 26 | 26 | 26 | 26 | 1 |
| 5 | 26 | 26 |   | 52 | 26 | 26 | 26 |   | 52 | 1 |
| 6 | 26 | 26 |   | 52 | 26 |   | 52 | 26 | 26 | 1 |
| 7 | 26 | 26 |   | 52 | 26 |   | 52 |   | 52 | 1 |
| 8 |   | 52 | 26 | 26 | 26 | 26 | 26 | 26 | 26 | 1 |
| 9 |   | 52 | 26 | 26 | 26 | 26 | 26 |   | 52 | 1 |
| 10 |   | 52 | 26 | 26 | 26 |   | 52 | 26 | 26 | 1 |
| 11 |   | 52 | 26 | 26 | 26 |   | 52 |   | 52 | 1 |
| 12 |   | 52 |   | 52 | 26 | 26 | 26 | 26 | 26 | 1 |
| 13 |   | 52 |   | 52 | 26 | 26 | 26 |   | 52 | 1 |
| 14 |   | 52 |   | 52 | 26 |   | 52 | 26 | 26 | 1 |
| 15 |   | 52 |   | 52 | 26 |   | 52 |   | 52 | 1 |
| 16 | 26 | 26 | 26 | 26 | 26 |   | 106 |   |   | 1 |
| 17 | 26 | 26 |   | 52 | 26 |   | 106 |   |   | 1 |
| 18 |   | 52 | 26 | 26 | 26 |   | 106 |   |   | 1 |
| 19 |   | 52 |   | 52 | 26 |   | 106 |   |   | 1 |

TABLE 6

| Indices | #1 | #2 | #3 | #4 | #5 | #6 | #7 | #8 | #9 | Number of entries |
|---|---|---|---|---|---|---|---|---|---|---|
| 20 |   | 106 |   |   | 26 | 26 | 26 | 26 | 26 | 1 |
| 21 |   | 106 |   |   | 26 | 26 | 26 |   | 52 | 1 |
| 22 |   | 106 |   |   | 26 |   | 52 | 26 | 26 | 1 |
| 23 |   | 106 |   |   | 26 |   | 52 |   | 52 | 1 |
| 24 | 52 |   | 52 |   | — |   | 52 |   | 52 | 1 |
| 25 | 242-tone RU empty (with zero users) | | | | | | | | | 1 |
| 26 |   | 106 |   |   | 26 |   | 106 |   |   | 1 |
| 27-34 |   |   |   |   | 242 |   |   |   |   | 8 |
| 35-42 |   |   |   |   | 484 |   |   |   |   | 8 |
| 43-50 |   |   |   |   | 996 |   |   |   |   | 8 |
| 51-58 |   |   |   |   | 2*996 |   |   |   |   | 8 |
| 59 | 26 | 26 | 26 | 26 | 26 |   | 52 + 26 |   | 26 | 1 |
| 60 | 26 |   | 26 + 52 |   | 26 | 26 | 26 | 26 | 26 | 1 |
| 61 | 26 |   | 26 + 52 |   | 26 | 26 | 26 |   | 52 | 1 |
| 62 | 26 |   | 26 + 52 |   | 26 |   | 52 | 26 | 26 | 1 |
| 63 | 26 | 26 |   | 52 | 26 |   | 52 + 26 |   | 26 | 1 |
| 64 | 26 |   | 26 + 52 |   | 26 |   | 52 + 26 |   | 26 | 1 |
| 65 | 26 |   | 26 + 52 |   | 26 |   | 52 |   | 52 | 1 |

TABLE 7

| 66 | 52 |   | 26 | 26 | 26 |   | 52 + 26 |   | 26 | 1 |
|---|---|---|---|---|---|---|---|---|---|---|
| 67 | 52 |   |   | 52 |   | 26 | 52 + 26 |   | 26 | 1 |
| 68 | 5 | 2 |   | 52 + 26 |   |   | 52 |   | 52 | 1 |
| 69 | 26 | 26 |   | 26 | 26 |   | 26 + 106 |   |   | 1 |
| 70 | 26 |   | 26 + 52 |   |   | 26 | 106 |   |   | 1 |
| 71 | 26 | 26 |   | 52 |   |   | 26 + 106 |   |   | 1 |
| 72 | 26 |   | 26 + 52 |   |   |   | 26 + 106 |   |   | 1 |
| 73 |   | 52 |   | 26 | 26 |   | 26 + 106 |   |   | 1 |
| 74 |   | 52 |   | 5 | 2 |   | 26 + 106 |   |   | 1 |

TABLE 7-continued

| 75 | 106 + 26 |    | 26      | 26 | 26 | 26 | 1 |
| 76 | 106 + 26 |    | 26      | 26 |    | 52 | 1 |
| 77 | 106 + 26 |    |         | 52 | 26 | 26 | 1 |
| 78 | 106      | 26 | 52 + 26 |    |    | 26 | 1 |
| 79 | 106 + 26 |    | 52 + 26 |    |    | 26 | 1 |
| 80 | 106 + 26 |    | 52      |    |    | 52 | 1 |
| 81 | 106 + 26 |    |         | 106 |   |    | 1 |
| 82 | 106      |    | 26 + 106 |   |   |    | 1 |

A mode in which the common field of the EHT-SIG is omitted may be supported. The mode in the common field of the EHT-SIG is omitted may be called a compressed mode. When the compressed mode is used, a plurality of users (i.e., a plurality of receiving STAs) may decode the PPDU (e.g., the data field of the PPDU), based on non-OFDMA. That is, the plurality of users of the EHT PPDU may decode the PPDU (e.g., the data field of the PPDU) received through the same frequency band. Meanwhile, when a non-compressed mode is used, the plurality of users of the EHT PPDU may decode the PPDU (e.g., the data field of the PPDU), based on OFDMA. That is, the plurality of users of the EHT PPDU may receive the PPDU (e.g., the data field of the PPDU) through different frequency bands.

The EHT-SIG may be configured based on various MCS schemes. As described above, information related to an MCS scheme applied to the EHT-SIG may be included in U-SIG. The EHT-SIG may be configured based on a DCM scheme. For example, among N data tones (e.g., 52 data tones) allocated for the EHT-SIG, a first modulation scheme may be applied to half of consecutive tones, and a second modulation scheme may be applied to the remaining half of the consecutive tones. That is, a transmitting STA may use the first modulation scheme to modulate specific control information through a first symbol and allocate it to half of the consecutive tones, and may use the second modulation scheme to modulate the same control information by using a second symbol and allocate it to the remaining half of the consecutive tones. As described above, information (e.g., a 1-bit field) regarding whether the DCM scheme is applied to the EHT-SIG may be included in the U-SIG. An HE-STF of FIG. 18 may be used for improving automatic gain control estimation in a multiple input multiple output (MIMO) environment or an OFDMA environment. An HE-LTF of FIG. 18 may be used for estimating a channel in the MIMO environment or the OFDMA environment.

The EHT-STF of FIG. 18 may be set in various types. For example, a first type of STF (e.g., 1×STF) may be generated based on a first type STF sequence in which a non-zero coefficient is arranged with an interval of 16 subcarriers. An STF signal generated based on the first type STF sequence may have a period of 0.8 μs, and a periodicity signal of 0.8 μs may be repeated 5 times to become a first type STF having a length of 4 μs. For example, a second type of STF (e.g., 2×STF) may be generated based on a second type STF sequence in which a non-zero coefficient is arranged with an interval of 8 subcarriers. An STF signal generated based on the second type STF sequence may have a period of 1.6 μs, and a periodicity signal of 1.6 μs may be repeated 5 times to become a second type STF having a length of 8 μs. Hereinafter, an example of a sequence for configuring an EHT-STF (i.e., an EHT-STF sequence) is proposed. The following sequence may be modified in various ways.

The EHT-STF may be configured based on the following sequence M.

$$M=\{-1,-1,-1,1,1,1,-1,1,1,1,-1,1,1,-1,1\} \quad <\text{Equation 1}>$$

The EHT-STF for the 20 MHz PPDU may be configured based on the following equation. The following example may be a first type (i.e., 1×STF) sequence. For example, the first type sequence may be included in not a trigger-based (TB) PPDU but an EHT-PPDU. In the following equation, (a:b:c) may imply a duration defined as b tone intervals (i.e., a subcarrier interval) from a tone index (i.e., subcarrier index) 'a' to a tone index 'c'. For example, the equation 2 below may represent a sequence defined as 16 tone intervals from a tone index −112 to a tone index 112. Since a subcarrier spacing of 78.125 kHz is applied to the EHT-STR, the 16 tone intervals may imply that an EHT-STF coefficient (or element) is arranged with an interval of 78.125*16=1250 kHz. In addition, * implies multiplication, and sqrt( ) implies a square root. In addition, j implies an imaginary number.

$$\text{EHT-STF}(-112{:}16{:}112)=\{M\}*(1+j)/\text{sqrt}(2) \quad <\text{Equation 2}>$$

EHT-STF(0)=0

The EHT-STF for the 40 MHz PPDU may be configured based on the following equation. The following example may be the first type (i.e., 1×STF) sequence.

$$\text{EHT-STF}(-240{:}16{:}240)=\{M,0,-M\}*(1+j)/\text{sqrt}(2) \quad <\text{Equation 3}>$$

The EHT-STF for the 80 MHz PPDU may be configured based on the following equation. The following example may be the first type (i.e., 1×STF) sequence.

$$\text{EHT-STF}(-496{:}16{:}496)=\{M,1,-M,0,-M,1,-M\}*(1+j)/\text{sqrt}(2) \quad <\text{Equation 4}>$$

The EHT-STF for the 160 MHz PPDU may be configured based on the following equation. The following example may be the first type (i.e., 1×STF) sequence.

$$\text{EHT-STF}(-1008{:}16{:}1008)=\{M,1,-M,0,-M,1,-M,0,-M,-1,M,0,-M,1,-M\}*(1+j)/\text{sqrt}(2) \quad <\text{Equation 5}>$$

In the EHT-STF for the 80+80 MHz PPDU, a sequence for lower 80 MHz may be identical to Equation 4. In the EHT-STF for the 80+80 MHz PPDU, a sequence for upper 80 MHz may be configured based on the following equation.

$$\text{EHT-STF}(-496{:}16{:}496)=\{-M,-1,M,0,-M,1,-M\}*(1+j)/\text{sqrt}(2) \quad <\text{Equation 6}>$$

Equation 7 to Equation 11 below relate to an example of a second type (i.e., 2×STF) sequence.

$$\text{EHT-STF}(-120{:}8{:}120)=\{M,0,-M\}*(1+j)/\text{sqrt}(2) \quad <\text{Equation 7}>$$

The EHT-STF for the 40 MHz PPDU may be configured based on the following equation.

$$\text{EHT-STF}(-248{:}8{:}248)=\{M,-1,-M,0,M,-1,M\}*(1+j)/\text{sqrt}(2) \quad <\text{Equation 8}>$$

EHT-STF(−248)=0
EHT-STF(248)=0

The EHT-STF for the 80 MHz PPDU may be configured based on the following equation.

$$\text{EHT-STF}(-504{:}8{:}504)=\{M,-1,M,-1,-M,-1,M,0,-M,1,M,1,-M,1,-M\}*(1+j)/\text{sqrt}(2) \quad <\text{Equation 9}>$$

The EHT-STF for the 160 MHz PPDU may be configured based on the following equation.

$$\text{EHT-STF}(-1016{:}16{:}1016)=\{M,-1,M,-1,-M,-1,M,0,-M,1,M,1,-M,0,-M,1,-M,1,M,1,-M,0,-M,1,M,1,-M,1,-M\}*(1+j)/\text{sqrt}(2) \quad <\text{Equation 10}>$$

EHT-STF(−8)=0, EHT-STF(8)=0,
EHT-STF(−1016)=0, EHT-STF(1016)=0

In the EHT-STF for the 80+80 MHz PPDU, a sequence for lower 80 MHz may be identical to Equation 9. In the EHT-STF for the 80+80 MHz PPDU, a sequence for upper 80 MHz may be configured based on the following equation.

$$EHT\text{-}STF(-504{:}8{:}504)=\{-M,1,-M,1,M,1,-M,0,-M,1,\\M,1,-M,1,-M\}*(1+j)/\text{sqrt}(2) \qquad \text{<Equation 11>}$$

EHT-STF(−504)=0,
EHT-STF(504)=0

The EHT-LTF may have first, second, and third types (i.e., 1×, 2×, 4×LTF). For example, the first/second/third type LTF may be generated based on an LTF sequence in which a non-zero coefficient is arranged with an interval of 4/2/1 subcarriers. The first/second/third type LTF may have a time length of 3.2/6.4/12.8 μs. In addition, a GI (e.g., 0.8/1/6/3.2 μs) having various lengths may be applied to the first/second/third type LTF.

Information related to a type of STF and/or LTF (information related to a GI applied to LTF is also included) may be included in a SIG-A field and/or SIG-B field or the like of FIG. 18.

A PPDU (e.g., EHT-PPDU) of FIG. 18 may be configured based on the example of FIG. 5 and FIG. 6.

For example, an EHT PPDU transmitted on a 20 MHz band, i.e., a 20 MHz EHT PPDU, may be configured based on the RU of FIG. 5. That is, a location of an RU of EHT-STF, EHT-LTF, and data fields included in the EHT PPDU may be determined as shown in FIG. 5.

An EHT PPDU transmitted on a 40 MHz band, i.e., a 40 MHz EHT PPDU, may be configured based on the RU of FIG. 6. That is, a location of an RU of EHT-STF, EHT-LTF, and data fields included in the EHT PPDU may be determined as shown in FIG. 6.

Since the RU location of FIG. 6 corresponds to 40 MHz, a tone-plan for 80 MHz may be determined when the pattern of FIG. 6 is repeated twice. That is, an 80 MHz EHT PPDU may be transmitted based on a new tone-plan in which not the RU of FIG. 7 but the RU of FIG. 6 is repeated twice.

When the pattern of FIG. 6 is repeated twice, 23 tones (i.e., 11 guard tones+12 guard tones) may be configured in a DC region. That is, a tone-plan for an 80 MHz EHT PPDU allocated based on OFDMA may have 23 DC tones. Unlike this, an 80 MHz EHT PPDU allocated based on non-OFDMA (i.e., a non-OFDMA full bandwidth 80 MHz PPDU) may be configured based on a 996-RU, and may include 5 DC tones, 12 left guard tones, and 11 right guard tones.

A tone-plan for 160/240/320 MHz may be configured in such a manner that the pattern of FIG. 6 is repeated several times.

The PPDU of FIG. 18 may be determined (or identified) as an EHT PPDU based on the following method.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "modulo 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 18. In other words, the receiving STA may determine the RX PPDU as the EHT PPDU, based on: 1) a first symbol after an L-LTF signal, which is a BPSK symbol; 2) RL-SIG contiguous to the L-SIG field and identical to L-SIG; 3) L-SIG including a length field in which a result of applying "modulo 3" is set to "0"; and 4) a 3-bit PHY version identifier of the aforementioned U-SIG (e.g., a PHY version identifier having a first value).

For example, the receiving STA may determine the type of the RX PPDU as the EHT PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "modulo 3" to a value of a length field of the L-SIG is detected as "1" or "2".

For example, the receiving STA may determine the type of the RX PPDU as a non-HT, HT, and VHT PPDU, based on the following aspect. For example, the RX PPDU may be determined as the non-HT, HT, and VHT PPDU: 1) when a first symbol after an L-LTF signal is a BP SK symbol; and 2) when RL-SIG in which L-SIG is repeated is not detected. In addition, even if the receiving STA detects that the RL-SIG is repeated, when a result of applying "modulo 3" to the length value of the L-SIG is detected as "0", the RX PPDU may be determined as the non-HT, HT, and VHT PPDU.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 18. The PPDU of FIG. 18 may be used to transmit/receive frames of various types. For example, the PPDU of FIG. 18 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 18 may be used for a management frame. An example of the management frame may include a beacon frame, a (re-)association request frame, a (re-)association response frame, a probe request frame, and a probe response frame. For example, the PPDU of FIG. 18 may be used for a data frame. For example, the PPDU of FIG. 18 may be used to simultaneously transmit at least two or more of the control frames, the management frame, and the data frame.

Figure 19:
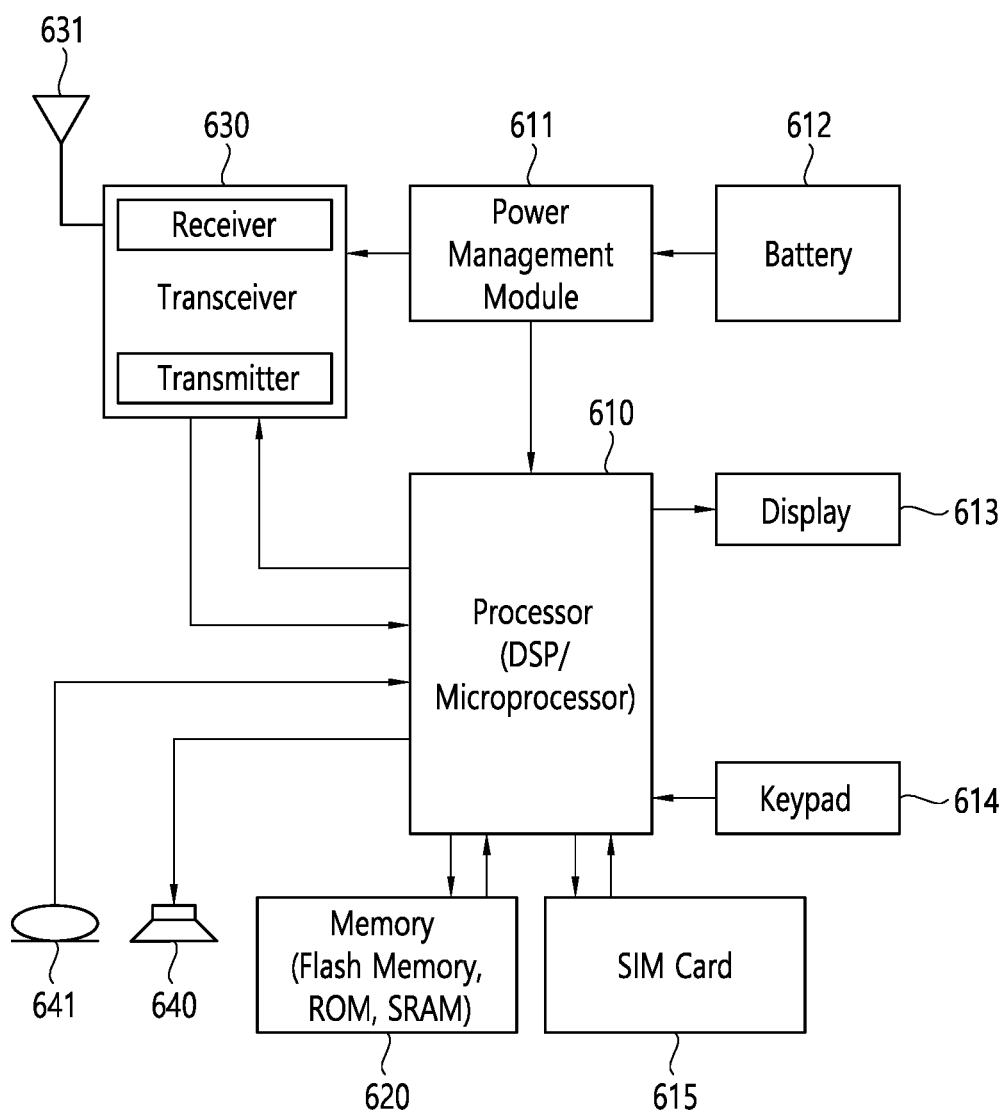
FIG. 19 illustrates an example of a modified transmission device and/or receiving apparatus/device of the present specification.

FIG. 19 illustrates an example of a modified transmission device and/or receiving device of the present specification.

Each device/STA of the sub-figure (a)/(b) of FIG. 1 may be modified as shown in FIG. 19. A transceiver 630 of FIG. 19 may be identical to the transceivers 113 and 123 of FIG. 1. The transceiver 630 of FIG. 19 may include a receiver and a transmitter.

A processor 610 of FIG. 19 may be identical to the processors 111 and 121 of FIG. 1. Alternatively, the processor 610 of FIG. 19 may be identical to the processing chips 114 and 124 of FIG. 1.

A memory 620 of FIG. 19 may be identical to the memories 112 and 122 of FIG. 1. Alternatively, the memory 620 of FIG. 19 may be a separate external memory different from the memories 112 and 122 of FIG. 1.

Referring to FIG. 19, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 19, a speaker 640 may output a result related to a sound processed by the processor 610. A microphone 641 may receive an input related to a sound to be used by the processor 610.

1. Tone Plan in 802.11Ax WLAN System

In the present specification, a tone plan relates to a rule for determining a size of a resource unit (RU) and/or a location of the RU. Hereinafter, a PPDU based on the IEEE 802.11ax standard, that is, a tone plan applied to an HE PPDU, will be described. In other words, hereinafter, the RU size and RU location applied to the HE PPDU are described, and control information related to the RU applied to the HE PPDU is described.

In the present specification, control information related to an RU (or control information related to a tone plan) may include a size and location of the RU, information of a user STA allocated to a specific RU, a frequency bandwidth for a PPDU in which the RU is included, and/or control information on a modulation scheme applied to the specific RU. The control information related to the RU may be included in a SIG field. For example, in the IEEE 802.11ax standard, the control information related to the RU is included in an HE-SIG-B field. That is, in a process of generating a TX PPDU, a transmitting STA may allow the control information on the RU included in the PPDU to be included in the HE-SIG-B field. In addition, a receiving STA may receive an HE-SIG-B included in an RX PPDU and obtain control information included in the HE-SIG-B, so as to determine whether there is an RU allocated to the receiving STA and decode the allocated RU, based on the HE-SIG-B.

In the IEEE 802.11ax standard, HE-STF, HE-LTF, and data fields may be configured in unit of RUs. That is, when a first RU for a first receiving STA is configured, STF/LTF/ data fields for the first receiving STA may be transmitted/received through the first RU.

In the IEEE 802.11ax standard, a PPDU (i.e., SU PPDU) for one receiving STA and a PPDU (i.e., MU PPDU) for a plurality of receiving STAs are separately defined, and respective tone plans are separately defined. Specific details will be described below.

The RU defined in 11ax may include a plurality of subcarriers. For example, when the RU includes N subcarriers, it may be expressed by an N-tone RU or N RUs. A location of a specific RU may be expressed by a subcarrier index. The subcarrier index may be defined in unit of a subcarrier frequency spacing. In the 11ax standard, the subcarrier frequency spacing is 312.5 kHz or 78.125 kHz, and the subcarrier frequency spacing for the RU is 78.125 kHz. That is, a subcarrier index +1 for the RU may mean a location which is more increased by 78.125 kHz than a DC tone, and a subcarrier index −1 for the RU may mean a location which is more decreased by 78.125 kHz than the DC tone. For example, when the location of the specific RU is expressed by [−121:−96], the RU may be located in a region from a subcarrier index −121 to a subcarrier index −96. As a result, the RU may include 26 subcarriers.

The N-tone RU may include a pre-set pilot tone.

2. Null Subcarrier and Pilot Subcarrier

A subcarrier and resource allocation in the 802.11ax system will be described.

An OFDM symbol consists of subcarriers, and the number of subcarriers may function as a bandwidth of a PPDU. In the WLAN 802.11 system, a data subcarrier used for data transmission, a pilot subcarrier used for phase information and parameter tacking, and an unused subcarrier not used for data transmission and pilot transmission are defined.

An HE MU PPDU which uses OFDMA transmission may be transmitted by mixing a 26-tone RU, a 52-tone RU, a 106-tone RU, a 242-tone RU, a 484-tone RU, and a 996-tone RU.

Herein, the 26-tone RU consists of 24 data subcarriers and 2 pilot subcarriers. The 52-tone RU consists of 48 data subcarriers and 4 pilot subcarriers. The 106-tone RU consists of 102 data subcarriers and 4 pilot subcarriers. The 242-tone RU consists of 234 data subcarriers and 8 pilot subcarriers. The 484-tone RU consists of 468 data subcarriers and 16 pilot subcarriers. The 996-tone RU consists of 980 data subcarriers and 16 pilot subcarriers.

1) Null Subcarrier

As shown in FIG. 5 to FIG. 7, a null subcarrier exists between 26-tone RU, 52-tone RU, and 106-tone RU locations. The null subcarrier is located near a DC or edge tone to protect against transmit center frequency leakage, receiver DC offset, and interference from an adjacent RU. The null subcarrier has zero energy. An index of the null subcarrier is listed as follows.

| Channel Width | RU Size | Null Subcarrier Indices |
|---|---|---|
| 20 MHz | 26, 52 | ±69, ±122 |
| | 106 | none |
| | 242 | none |
| 40 MHz | 26, 52 | ±3, ±56, ±57, ±110, ±137, ±190, ±191, ±244 |
| | 106 | ±3, ±110, ±137, ±244 |
| | 242, 484 | none |
| 80 MHz | 26, 52 | ±17, ±70, ±71, ±124, ±151, ±204, ±205, ±258, ±259, ±312, ±313, ±366, ±393, ±446, ±447, ±500 |
| | 106 | ±17, ±124, ±151, ±258, ±259, ±366, ±393, ±500 |
| | 242, 484 | none |
| | 996 | none |
| 160 MHz | 26, 52, 106 | {null subcarrier indices in 80 MHz − 512, null subcarrier indices in 80 MHz + 512} |
| | 242, 484, 996, 2 × 996 | none |

A null subcarrier location for each 80 MHz frequency segment of the 80+80 MHz HE PPDU shall follow the location of the 80 MHz HE PPDU.

2) Pilot Subcarrier

If a pilot subcarrier exists in an HE-LTF field of HE SU PPDU, HE MU PPDU, HE ER SU PPDU, or HE TB PPDU, a location of a pilot sequence in an HE-LTF field and data field may be the same as a location of 4×HE-LTF. In 1×HE-LTF, the location of the pilot sequence in HE-LTF is configured based on pilot subcarriers for a data field multiplied 4 times. If the pilot subcarrier exists in 2×HE-LTF, the location of the pilot subcarrier shall be the same as a location of a pilot in a 4×data symbol. All pilot subcarriers are located at even-numbered indices listed below.

| Channel Width | RU Size | Pilot Subcarrier Indices |
|---|---|---|
| 20 MHz | 26, 52 | ±10, ±22, ±36, ±48, ±62, ±76, ±90, ±102, ±116 |
| | 106, 242 | ±22, ±48, ±90, ±116 |
| 40 MHz | 26, 52 | ±10, ±24, ±36, ±50, ±64, ±78, ±90, ±104, ±116, ±130, ±144, ±158, ±170, ±184, ±198, ±212, ±224, ±238 |

-continued

| Channel Width | RU Size | Pilot Subcarrier Indices |
|---|---|---|
| | 106, 242, 484 | ±10, ±36, ±78, ±104, ±144, ±170, ±212, ±238 |
| 80 MHz | 26, 52 | ±10, ±24, ±38, ±50, ±64, ±78, ±92, ±104, ±118, ±130, ±144, ±158, ±172, ±184, ±198, ±212, ±226, ±238, ±252, ±266, ±280, ±292, ±306, ±320, ±334, ±346, ±360, ±372, ±386, ±400, ±414, ±426, ±440, ±454, ±468, ±480, ±494 |
| | 106, 242, 484 | ±24, ±60, ±92, ±118, ±158, ±184, ±226, ±252, ±266, ±292, ±334, ±360, ±400, ±426, ±468, ±494 |
| | 996 | ±24, ±92, ±158, ±226, ±266, ±334, ±400, ±468 |
| 160 MHz | 26, 52, 106, 242, 484 | {pilot subcarrier indices in 80 MHz − 512, pilot subcarrier indices in 80 MHz + 512} |
| | 996 | {for the lower 80 MHz, pilot subcarrier indices in 80 MHz − 512, for the upper 80 MHz, pilot subcarrier indices in 80 MHz + 512} |

At 160 MHz or 80+80 MHz, the location of the pilot subcarrier shall use the same 80 MHz location for 80 MHz of both sides.

3. HE Transmit Procedure and Phase Rotation

Figure 21:
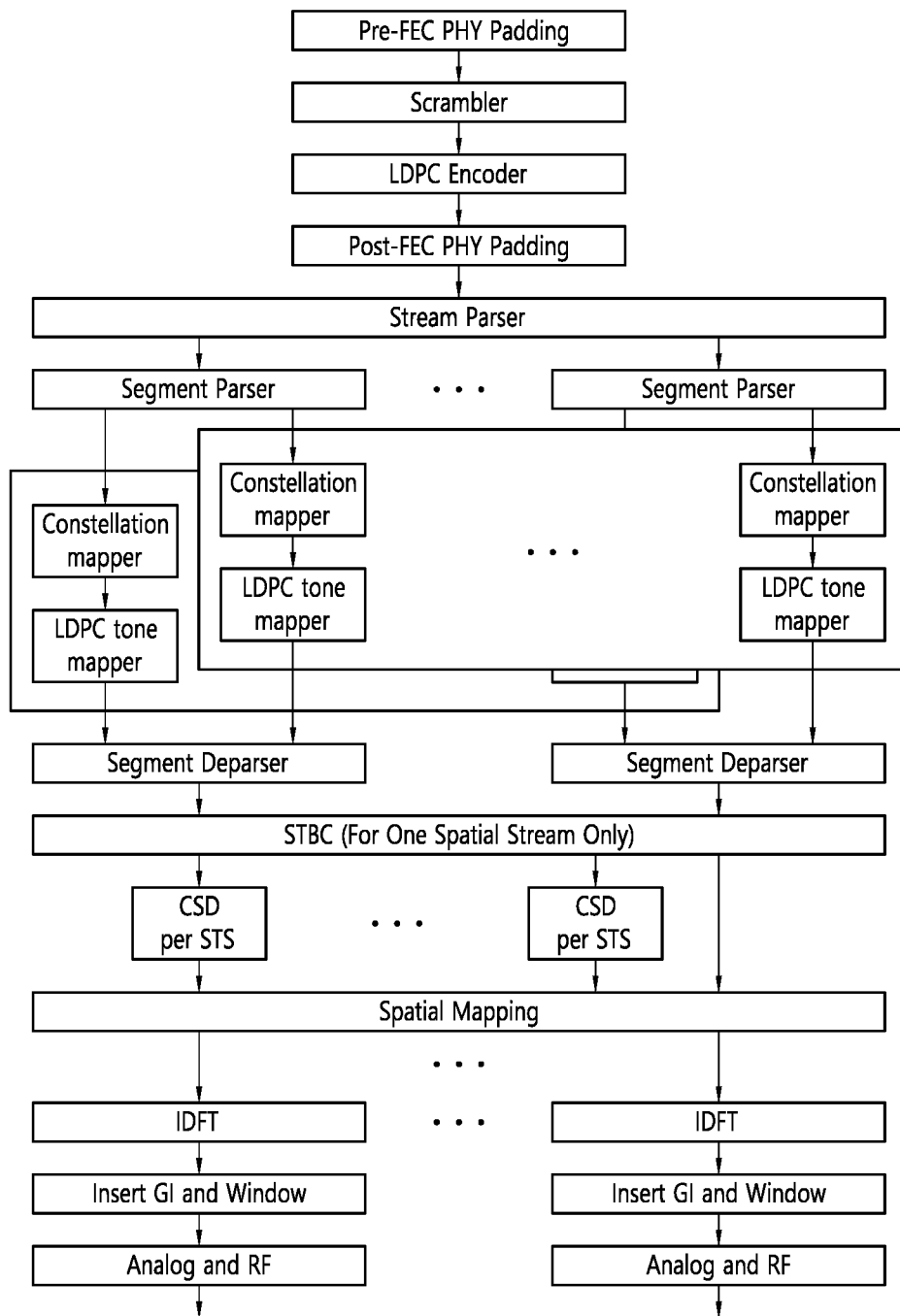
FIG. 21 shows an example of a block diagram of a transmitting device for generating each field of an HE PPDU.

In an 802.11ax wireless local area network (WLAN) system, transmission procedures (or transmit procedures) in a physical layer (PHY) include a procedure for an HE Single User (SU) PPDU, a transmission procedure for an HE extended range (ER) SU PPDU, a transmission procedure for an HE Multi User (MU) PPDU, and a transmission procedure for an HE trigger-based (TB) PPDU. A FORMAT field of a PHY-TXSTART.request(TXVECTOR) may be the same as HE_SU, HE_MU, HE_ER_SU or HE_TB. The transmission procedures do not describe operations of optional features, such as Dual Carrier Modulation (DCM). Among the diverse transmission procedures, FIG. 21 shows only the PHY transmission procedure for the HE SU PPDU.

Figure 20:
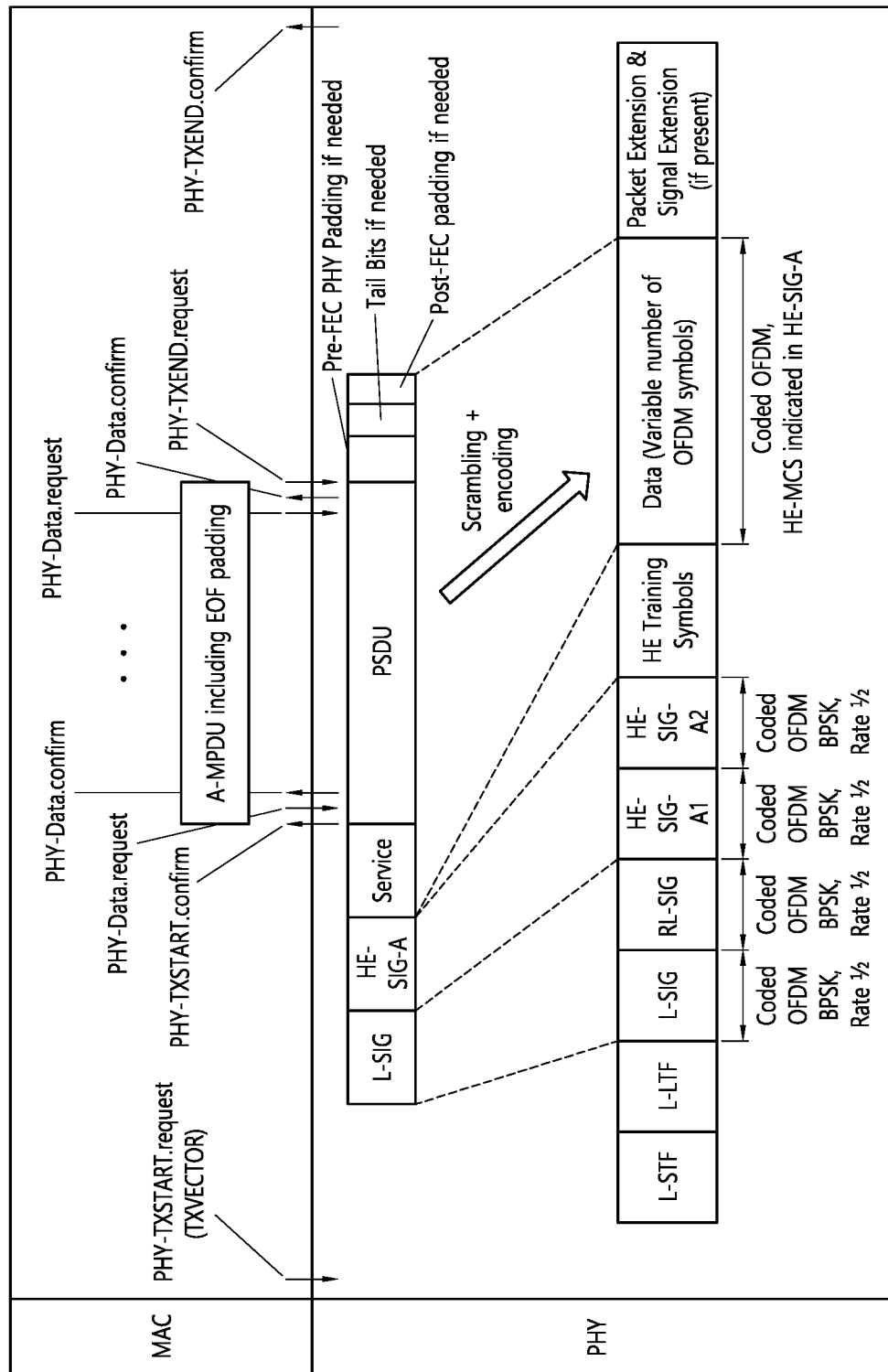
FIG. 20 shows an example of a PHY transmission procedure for HE SU PPDU.

FIG. 20 shows an example of a PHY transmission procedure for HE SU PPDU.

In order to transmit data, the MAC generates a PHY-TXSTART.request primitive, which causes a PHY entity to enter a transmit state. Additionally, the PHY is configured to operate in an appropriate frequency via station management through PLME. Other transmission parameters, such as HE-MCS, coding type, and transmission power are configured through a PHY-SAP by using a PHY-TXSTART.request (TXVECTOR) primitive. After transmitting a PPDU that transfers (or communicates) a trigger frame, a MAC sublayer may issue a PHY-TRIGGER.request together with a TRIGVECTOR parameter, which provides information needed for demodulating an HE TB PPDU response that is expected of the PHY entity.

The PHY indicates statuses of a primary channel and another channel via PHY-CCA.indication. The transmission of a PPDU should be started by the PHY after receiving the PHY-TXSTART.request(TXVECTOR) primitive.

After a PHY preamble transmission is started, the PHY entity immediately initiates data scrambling and data encoding. An encoding method for the data field is based on FEC_CODING, CH_BANDWIDTH, NUM_STS, STBC, MCS, and NUM_USERS parameters of the TXVECTOR.

A SERVICE field and a PSDU are encoded in a transmitter (or transmitting device) block diagram, which will be described later on. Data should be exchanged between the MAC and the PHY through a PHY-DATA.request(DATA) primitive that is issued by the MAC and PHY-DATA.confirm primitives that are issued by the PHY. A PHY padding bit is applied to the PSDU in order to set a number of bits of the coded PSDU to be an integer multiple of a number of coded bits per OFDM symbol.

The transmission is swiftly (or quickly) ended by the MAC through a PHY-TXEND.request primitive. The PSDU transmission is ended upon receiving a PHY-TXEND.request primitive. Each PHY-TXEND.request primitive mat notify its reception together with a PHY-TXEND.confirm primitive from the PHY.

A packet extension and/or a signal extension may exist in a PPDU. A PHY-TXEND.confirm primitive is generated at an actual end time of a most recent PPDU, an end time of a packet extension, and an end time of a signal extension.

In the PHY, a Guard Interval (GI) that is indicated together with a GI duration in a GI TYPE parameter of the TXVECTOR is inserted in all data OFDM symbols as a solution for a delay spread.

If the PPDU transmission is completed, the PHY entity enters a receive state.

FIG. 21 shows an example of a block diagram of a transmitting device for generating each field of an HE PPDU.

In order to generate each field of the HE PPDU, the following block diagrams are used.
 a) pre-FEC PHY padding
 b) Scrambler
 c) FEC (BCC or LDPC) encoders
 d) post-FEC PHY padding
 e) Stream parser
 f) Segment parser (for contiguous 160 MHz and non-contiguous 80+80 MHz transmission)
 g) BCC interleaver
 h) Constellation mapper
 i) DCM tone mapper
 j) Pilot insertion
 k) Replication over multiple 20 MHz (for BW>20 MHz)
 l) Multiplication by 1st column of PHE-LTF
 m) LDPC tone mapper
 n) Segment deparser
 o) Space time block code (STBC) encoder for one spatial stream
 p) Cyclic shift diversity (CSD) per STS insertion
 q) Spatial mapper
 r) Frequency mapping
 s) Inverse discrete Fourier transform (IDFT)
 f) Cyclic shift diversity (CSD) per chain insertion
 u) Guard interval (GI) insertion
 v) Windowing FIG. 21 shows a block diagram of a transmitting device (or transmitter block diagram) that is used for generating a data field of an HE Single User (SU) PPDU having LDPC encoding applied thereto and being transmitted at a 160 MHz. If the transmitter block diagram is used for generating a data field of an HE SU PPDU that is transmitted in an 80+80 MHz band, a segment deparser is not used as shown in FIG. 21. That is, the block diagram of the transmitter (or transmitting device) is used per 80 MHz band in a situation where the band is divided into an 80 MHz band and another 80 MHz band by using a segment parser.

Referring to FIG. 21, an LDPC encoder may encode a data field (or data bitstream). The data bitstream input to the LDPC encoder may be scrambled by a scrambler.

A stream parser divides the data bitstream encoded by the LDPC encoder into a plurality of spatial streams. At this time, an encoded data bitstream divided into each spatial stream may be referred to as a spatial block. The number of spatial blocks may be determined by the number of spatial streams used to transmit a PPDU and may be set to be equal to the number of spatial streams.

The stream parser divides each spatial block into at least one or more data segments. As shown in FIG. 21 when the data field is transmitted in a 160 MHz band, the 160 MHz band is divided into two 80 MHz bands, and the data field is divided into a first data segment and a second data segment for the respective 80 MHz bands. Afterward, the first and second data segments may be constellation mapped to the respective 80 MHz bands and may be LDPC mapped.

In HE MU transmission, except that cyclic shift diversity (CSD) is performed based on the information on a space-time stream start index for the corresponding user, a PPDU encoding processor is run independently in a Resource Unit (RU) for each user even for an input to a space mapping block. All the user data of the RU are mapped by being coupled to a transmission chain of the space mapping block.

In the 802.11ax, phase rotation may be applied to the field from the legacy preamble to the field just before the HE-STF, and a phase rotation value may be defined in units of 20 MHz bands. In other words, phase rotation may be applied to L-STF, L-LTF, L-SIG, RL-SIG, HE-SIG-A, and HE-SIG-B among fields of the HE PPDU defined in the 802.11ax. The L-STF field of the HE PPDU may be constructed as follows.
 a) Determine, the channel bandwidth from the TXVECTOR parameter CH_BANDWIDTH.
 b) Sequence generation: Generate the sequence over the channel bandwidth as described in 27.3.11.3 (L-STF). Apply a 3 dB power boost if transmitting an HE ER SU PPDU as described in 27.3.11.3 (L-STF).
 c) Phase rotation: Apply appropriate phase rotation for each 20 MHz subchannel as described in 27.3.10 (Mathematical description of signals) and 21.3.7.5 (Definition of tone rotation).
 d) CSD per STS: If the TXVECTOR parameter BEAM_CHANGE is 0, apply CSD per STS for each space-time stream and frequency segment as described in 27.3.11.2.2 (Cyclic shift for HE modulated fields).
 e) Spatial mapping: If the TXVECTOR parameter BEAM_CHANGE is 0, apply the A matrix and the Q matrix as described in 27.3.11.3 (L-STF).
 f) Compute the inverse discrete Fourier transform.
 g) CSD per chain: If the TXVECTOR parameter BEAM_CHANGE is 1 or not present, apply CSD per chain for each transmit chain and frequency segment as described in 273.11.2.1 (Cyclic shift for pre-HE modulated fields),
 h) Insert GI and apply windowing: Prepaid a GI ($T_{GI,Pre-HE}$) and apply windowing as described in 27.3.10 (Mathematical description of signals).
 i) Analog and RF. Upconvert the resulting complex baseband waveform associated with each transmit chain to an RF signal according to the center frequency of the desired channel and transmit. Refer to 27.3.10 (Mathematical description of signals) and 27.3.11 (HE preamble) for details.

The L-LTF field of the HE PPDU may be constructed as follows.
 a) Determine We channel bandwidth from the TXVECTOR parameter CH_BANDWIDTH,
 b) Sequence generation: Generate the L-LTF sequence over the channel bandwidth as described in 27.3.11.4 (L-LTH), Apply a 3 dB power boost if transmitting an HE ER SU PPDU as described in 27.3.11.4 (L-LTF).
 c) Phase rotation: Apply appropriate phase rotation for each 20 MHz subchannel as described in 27.3.10 (Mathematical description of signals) and 21.3.7.5 (Definition of tone rotation).
 d) CSD pet STS: If the TXVECTOR parameter BEAM_CHANGE is 0, apply CSD per STS for each space-time stream and frequency segment as described in 27.3.11.2.2 (Cyclic shift for HE modulated fields) before spatial mapping.
 e) Spatial mapping: If the TXVECTOR parameter BEAM_CHANGE is 0, apply the A matrix and the Q matrix as described in 27.3.11.4 (L-LTF).
 f) IDFT: Compute the inverse discrete Fourier transform.
 g) CSD per chain: If the TXVECTOR parameter BEAM_CHANGE is 1 or not present, apply CSD per chain for each transmit chain and frequency segment as described in 27.3.11.2.1 (Cyclic shift for pre-HE modulated fields).
 h) Insert GI and apply windowing: Prepaid a GI ($T_{GI,L-LTF}$) and apply windowing as described in 27.3.10 (Mathematical description of signals).
 i) Analog and RF: Upconvert the resulting complex baseband waveform associated with each transmit chain to an RF signal according to the carrier frequency of the desired channel and transmit. Refer to 27.3.10 (Mathematical description of signals) and 27.3.11 (HE preamble) for details.

The L-SIG field of the HE PPDU may be constructed as follows.
 a) Set the RATE subfield in the SIGNAL field to 6 Mb/s. Set the LENGTH, Parity, and Tail fields in the SIGNAL field as described in 27.3.11.5 (L-SIG).
 b) BCC encoder: Encode the SIGNAL field by a convolutional encoder at the rate of R=1/2 as described in 27.3.12.5.1 (BCC coding and puncturing).
 c) BCC interleaver: interleave as described in 17.3.5.7 (BCC interleavers).
 d) Constellation Mapper: BPSK modulate as described in 27.3.12.9 (Constellation mapping).
 e) Pilot insertion: Insert pilots as described in 27.3.11.5 (L-SIG).
 f) Extra subcarrier insertion: Four extra subcarriers are inserted at k∈{−23, −27, 27, 28} for channel estimation purpose and the values on these tour extra subcarriers are {−1, −1, −1, 1}, respectively.
 Apply a 3 dB power boost to the four extra subcarriers if transmitting an HE ER SU PPDU as described in 27.3.11.5 (L-SIG).
 g) Duplication and phase rotation: Duplicate the L-SIG field over each occupied 20 MHz subchannel of the channel bandwidth. Apply appropriate phase rotation for each occupied 20 MHz subchannel tis described in 27.3.10 (Mathematical description of signals) and 21.3.7.5 (Definition of tone rotation).
 h) CSD per STS: If the TXVECTOR parameter BEAM_CHANGE is 0, apply CSD per STS for each space-time stream and frequency segment as described in 27.3.11.12 (Cyclic shift for HE modulated fields) before spatial mapping.
 i) Spatial mapping: If the TXVECTOR parameter BEAM_ CHANGE is 0, apply the A matrix and Q matrix as described in 27.3.11.5 (L-SIG).
 j) IDFT: Compute the inverse discrete Fourier transform.
 k) CSD per chain: If the TXVECTOR parameter BEAM_CHANGE is 1 or not present, apply CSD per chain for each transmit chain and frequency segment as described in 27.3.11.2.1 (Cyclic shift for pre-HE modulated fields).

l) Insert GI and apply windowing: Prepend a GI ($T_{GI,Pre-HE}$) and apply windowing as described in 27.3.10 (Mathematical description of signals).

m) Analog and RF: Upconvert the resulting complex baseband waveform associated with each transmit chain. Refer to 27.3.10 (Mathematical description of signals) and 27.3.11 (HE preamble) for details.

The RL-SIG field of the HE PPDU may be constructed as follows.

a) Set the RATE subfield in the repeat SIGNAL field to 6 Mb/s. Set the LENGTH Parity, and Tail fields in the repeat SIGNAL field as described in 27.3.11.6 (RL-SIG).

b) BCC encoder: Encode the repeat SIGNAL field by a convolutional encoder at the rate R=1/2 as described in 27.3.12.5.1 (BCC coding and puncturing).

c) BCC interleaver: Interleave as described in 17.3.5.7 (BCC interleavers).

d) Constellation Mapper: BPSK modulate as described in 27.3.12.9 (Constellation mapping).

e) Pilot insertion: Insert pilots as described in 27.3.11.6 (RL-SIG).

f) Extra subcarrier insertion: Four extra subcarriers are inserted at k∈{−28, −27, 27, 28} for channel estimation purpose and the values on these four extra subcarriers are {−1, −1, −1, 1}, respectively. Apply a 3 dB power boost to the four extra subcarriers if transmitting on HE ER SC PPDU as described in 27.3.11.6 (RL-SIG).

g) Duplication, and phase rotation: Duplicate the RL-SIG field over each occupied 20 MHz subchannel of the channel bandwidth. Apply appropriate phase rotation for each occupied 20 MHz subchannel as described in 27.3.10 (Mathematical description of signals) and 21.3.7.5 (Definition of tone rotation).

h) CSD per STS: If the TX VECTOR parameter BEAM_CHANGE is 0, apply CSD per STS for each space-time stream and frequency segment as described in 27.3.11.2.2 (Cyclic shift for HE modulated fields) before spatial mapping.

i) Spatial mapping: If the TXVECTOR parameter BEAM_CHANGE is 0, apply the A matrix and the Q matrix as described in 27.3.11.6 (RL-SIG).

f) IDFT: Compute the inverse discrete Fourier transform.

k) CSD per chain: If the TXVECTOR parameter BEAM_CHANGE is 1 or not present, apply CSD per chain for each transmit chain and frequency segment as described in 27.3.11.2.1 (Cyclic shift for pre-HE modulated fields).

l) Insert GI and apply windowing: Prepend a GI ($T_{GI,Pre-HE}$) and apply windowing as described in 27.3.10 (Mathematical description of signals).

m) Analog and RF: Upconvert the resulting complex baseband waveform associated with each transmit chain. Refer to 27.3.10 (Mathematical description of signals) and 27.3.11 (HE preamble) for details.

4. Embodiment Applicable to the Present Disclosure

In the wireless LAN 802.11 system, to increase peak throughput, it is considered to use a wider band than the existing flax or to transmit an increased stream by using more antennas. In addition, the present specification also considers a method of aggregating multiple links or aggregating multiple RUs and allocating them to one STA for transmission.

In this specification, a method of allocating and transmitting multiple RUs to one STA is considered, and in this case, a method of aggregating RUs in various bandwidths is proposed. In particular, the present specification focuses on and proposes a method of aggregating large-RU in non-OFDMA transmission.

In the existing 802.11ax, preamble puncturing was not considered during non-OFDMA transmission. Therefore, non-OFDMA transmission was only possible using the entire bandwidth of 20/40/80/160/160+160 MHz, and the RU used at this time was It is as below.

242/484/996/2×996 RU

The above RUs will be called large RUs.

In 802.11be, preamble puncturing was introduced in non-OFDMA transmission to improve efficiency. This may be 20 MHz-based puncturing like preamble puncturing in OFDMA of 802.11ax. In this situation, non-OFDMA transmission can be performed by combining multiple large RUs. In this specification, various large RU combinations in non-OFDMA transmission will be proposed in each bandwidth situation as follows. However, consider the situation where the preamble puncturing portion does not exceed 50% of the total bandwidth.

In addition, in order to minimize interference during preamble puncturing in each subchannel of various bandwidths, the tone plan of an adjacent 20 MHz channel may be replaced with a 20 MHz tone plan, or a tone plan in which only the 20 MHz portion of the tone plan is partially shifted may be used. Of course, without changing the tone plan of the adjacent 20 MHz channel by using hardware/filter that can effectively control interference, the original 80 MHz tone plan can be used as it is, and data can be transmitted using the remaining channels except for the preamble-punctured 20 MHz.

Alternatively, the tone plan is used as it is, but when an adjacent channel of a preamble punctured 20 MHz channel uses a 242-tone RU, the 242-tone RU method of 802.11ax is applied as it is for encoding. Instead, during transmission, some tones adjacent to the punctured channel among 242-tone RUs may be transmitted by forcibly puncturing or reducing power. Here, the adjacent 20 MHz channel means 20 MHz channels other than the preamble punctured channels in each 40 MHz subchannel when each 80 MHz subchannel is divided into lower 40 MHz and higher 40 MHz.

In addition, in lower 40 MHz or higher 40 MHz where preamble puncturing is not performed, 484-tone RU (484-tone RU in the corresponding 40 MHz in the 80 MHz tone plan) can be used for data transmission. 242-tone RUs (242-tone RUs in the 20 MHz in the 80 MHz tone plan or 242-tone RUs in the 20 MHz in the changed tone plan to reduce interference) can be used for data transmission in the 20 MHz adjacent 20 MHz preamble punctured. This method can be directly applied to all of the following preamble puncturing situations.

4.1. 80 MHz

FIG. 22 shows a channel structure of 80 MHz.

Although it is assumed in FIG. 22 that P20 is located at the lowest frequency, the location may be different and the location of another 20 MHz channel may be different. Transmission using 996RU in which the entire 80 MHz is used can be considered, and this will be called PC80.

Figure 23:
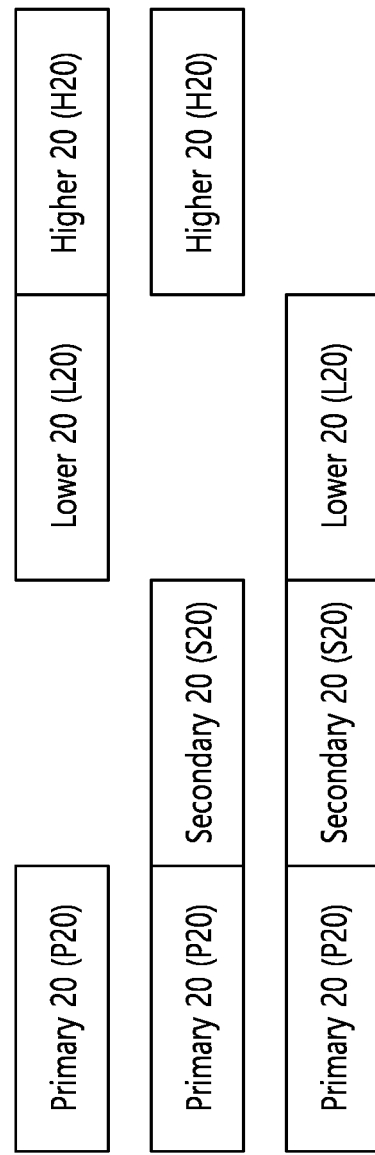
FIG. 23 shows an example of preamble puncturing in non-OFDMA 80 MHz transmission.

FIG. 23 shows an example of preamble puncturing in non-OFDMA 80 MHz transmission.

In non-OFDMA transmission of 80 MHz, preamble puncturing applied to 80 MHz transmission of existing 11ax OFDMA may be applied as it is, as shown in FIG. 23.

FIG. 23, non-OFDMA transmission is possible through a combination of 484+242RU. This combination will be called PC60.

Figure 24:
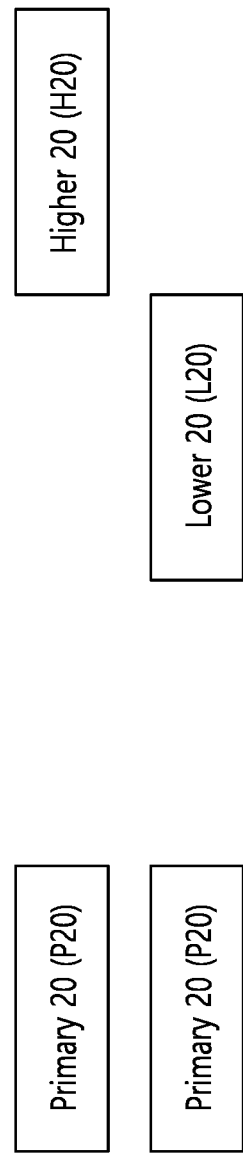
FIG. 24 shows an example of additionally preamble puncturing in non-OFDMA 80 MHz transmission.

FIG. 24 shows an example of additionally preamble puncturing in non-OFDMA 80 MHz transmission.

Additionally, the preamble puncturing of FIG. 24 may be considered.

Referring to FIG. 24, non-OFDMA transmission is possible through a combination of 242+242RU. This combination will be called PC40.

The various RU combinations are summarized below, and the order and position of the RUs in each combination may be changed. The meaning of parentheses means the RU combination of each 80 MHz. That is, the order and position of the RUs may be changed within parentheses (i.e., within each 80 MHz), and the order and position of the parentheses may also be changed (i.e., the position and sequence diagram of each 80 MHz). Since it is 80 MHz, there is only one parenthesis for each combination.

(242+242), (484+242), (996)

4.2. 160/80+80 MHz

Figure 25:
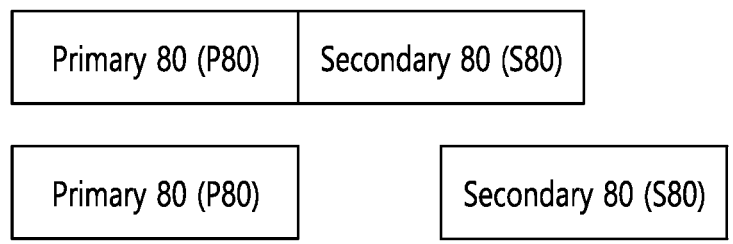
FIG. 25 shows an example of a 160/80+80 MHz channel configuration.

FIG. 25 shows an example of a 160/80+80 MHz channel configuration.

FIG. 25 shows a channel structure of 160/80+80 MHz. For the 160/80+80 MHz tone plan, the 80 MHz tone plan is repeated twice.

1) In P80, two combinations of PC60 and PC40 proposed in 4.1. 80 MHz transmission can be considered. In addition, the case of transmitting only the Primary 40 (P40) among P80s can be considered, and transmission using 484RU (this will be referred to as PC40 with a combination of 242+242RU) is possible. In addition, transmission using 242RU in which only P20 is used may be considered, and this will be referred to as PC20. In addition, transmission using 996RU in which the entire P80 is used may be considered, and this will be referred to as PC80.

2) When preamble puncturing in the existing 802.11ax is taken into consideration, at least one 20 MHz puncturing need not be performed in S80. In this case, S80 may consider various combinations of RUs as follows.

242 RU: this will be referred to as SC20.

484 RU, 242+242 RU: this will be referred to as SC40.

484+242 RU: this will be referred to as SC60.

996 RU: this will be referred to as SC80.

The RU combination of P80 includes PC20, PC40, PC60, and PC80, and the RU combination of S80 includes SC20, SC40, SC60, and SC80.

In this situation, considering the preamble puncturing of 160/80+80 MHz, various combinations can be proposed as follows, which is a case where 50% or more of channels that are not always punctured are.

PC40+SC40, PC40+SC60, PC40+SC80, PC60+SC20, PC60+SC40, PC60+SC60, PC60+SC80

PC20+SC60, PC20+SC80, PC80+SC20, PC80+SC40, PC80+SC60, PC80+SC80 (996+996 RU or 2×996 RU)

The meaning of the underline above is to indicate only representative combinations, excluding duplicates, among all combinations. If PC40+SC60 is expressed as RU, it can be expressed as (484RU)+(484+242RU) or (242+242RU)+(484+242RU). If PC60+SC40 is expressed as RU, it can be expressed as (484+242RU)+(484RU) or (484+242RU)+(242+242RU). The meaning of parentheses means a combination within an channel. Therefore, the combination of PC40+SC60 and PC60+SC40 is the same, and one can be excluded. All combinations of underscores below have the same meaning.

The various RU combinations are summarized below, and the order and position of the RUs in each combination may be changed. The meaning of parentheses means the RU combination of each 80 MHz. That is, the order and position of the RUs may be changed within parentheses (i.e., within each 80 MHz), and the order and position of the parentheses may also be changed (i.e., the position and sequence diagram of each 80 MHz).

(242)+(484+242), (242)+(996), (242+242)+(242+242), (242+242)+(484), (484)+(484), (242+242)+(484+242), (484)+(484+242), (242+242)+(996), (484)+(996), (484+242)+(484+242), (484+242)+(996), (996)+(996)/2×996

In particular, only one 20 MHz punctured (484+242)+(996) and one continuous punctured (484)+(996) can be considered. In addition, we can consider (242)+(996) and (484)+(484+242) where only one continuous 60 MHz is punctured (in case of continuous puncturing at the boundary between two 80 MHz) and (484+242)+(484+242) where only one continuous 40 MHz is punctured (in case of continuous 40 MHz puncturing at the boundary of two 80 MHz) can be considered. In addition, (242+242)+(996) in which only one continuous 40 MHz is punctured (in the case of continuous 40 MHz from the center of a specific MHz, that is, when the two central 20 MHz are punctured) can be additionally considered. In addition, (484)+(484), (242)+(484+242) in which only one continuous 80 MHz is punctured (in case of continuous 80 MHz puncturing at the boundary of two 80 MHz) may be additionally considered.

A combination in which only one continuous 20 or 40 MHz is punctured in each primary and secondary 80 may be considered. For example, it may have a combination of (484+242)+(484+242), (484)+(484), (484)+(242+242), and (242+242)+(242+242). As another example, it may have a combination of (484+242)+(484) and (484+242)+(242+242).

4.3. 240/160+80 MHz

Figure 26:
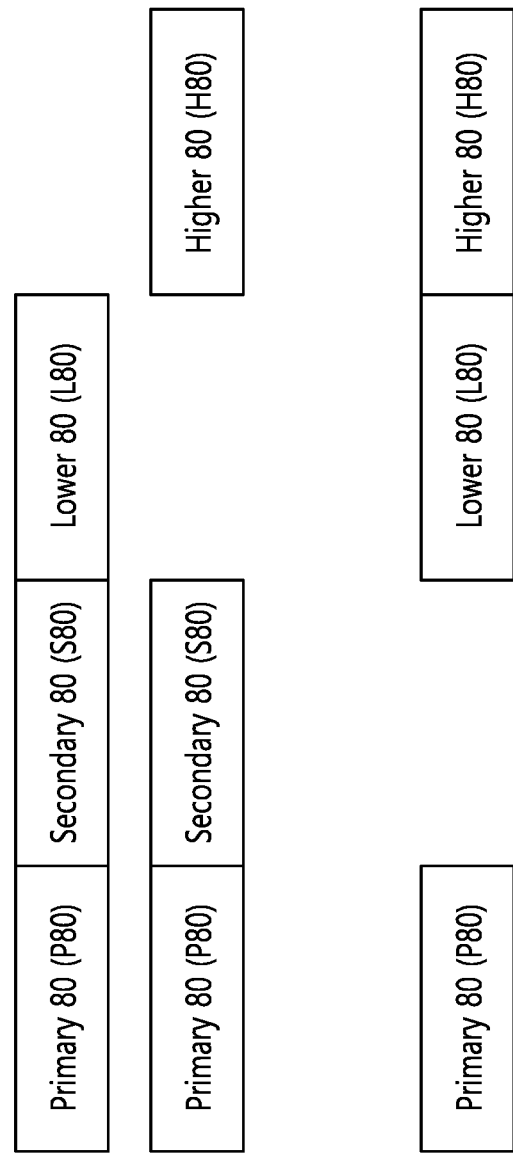
FIG. 26 is an example of 240/160+80 MHz derived from contiguous 320 MHz.

FIG. 26 is an example of 240/160+80 MHz derived from contiguous 320 MHz.

It is assumed that the 240/160+80 MHz channel is fixed to three specific 80 MHz channels. In this case, the 240/160+80 MHz channel configuration can consider the following three cases. For the 240/160+80 MHz tone plan, the 80 MHz tone plan is repeated three times.

Case 1: Primary 80 (P80)+Secondary 80 (S80)+Lower 80 (L80)

Case 2: Primary 80 (P80)+Secondary 80 (S80)+Higher 80 (H80)

Case 3: Primary 80 (P80)+Lower 80 (L80)+Higher 80 (H80)

P80 and S80 consist of Primary 160 (P160), and L80 and H80 consist of Secondary 160 (S160).

FIG. 27 is an example of contiguous 240 MHz derived from contiguous 320 MHz.

For 240/160+80 MHz derived from contiguous 320 MHz, only contiguous 240 MHz can be considered, which is shown in FIG. 27.

FIG. 28 is an example of non-contiguous 160+80 MHz derived from non-contiguous 160+160 MHz.

For 240/160+80 MHz derived from non-contiguous 160+160 MHz, only non-contiguous 160+80 MHz can be considered, which is shown in FIG. 28.

1) In the three cases, the RU combination in P80 can be used as it is suggested in 4.1. and 4.2.

2) In Case 1, at least one 20 MHz in L80 should not be punctured, and therefore, the RU combination in S80 suggested in 4.2. can be used as it is. In Case 1, if at least one 20 MHz is not punctured in S80, the RU combination in S80 proposed in 4.2. can be used as it is. Various RU combinations in the total bandwidth in Case 1 can be proposed as follows. This assumes that the number of channels that are not always punctured is 50% or more.

If all S80s are punctured
PC40+SC80, PC60+SC60, PC60+SC80
PC80+SC40, PC80+SC60, PC80+SC80 (996+996 RU or 2×996 RU)

If at least one 20 MHz is not punctured in S80
PC40+SC20+SC60, PC40+SC20+SC80, PC40+SC40+SC40, PC40+SC40+SC60, PC40+SC40+SC80, PC40+SC60+SC20, PC40+SC60+SC40, PC40+SC60+SC60, PC40+SC60+SC80, PC40+SC80+SC20, PC40+SC80+SC40, PC40+SC80+SC60, PC40+SC80+SC80, PC60+SC20+SC40, PC60+SC20+SC60, PC60+SC20+SC80, PC60+SC40+SC20, PC60+SC40+SC40, PC60+SC40+SC60, PC60+SC40+SC80, PC60+SC60+SC20, PC60+SC60+SC40, PC60+SC60+SC60, PC60+SC60+SC80, PC60+SC80+SC20, PC60+SC80+SC40, PC60+SC80+SC60, PC60+SC80+SC80
PC20+SC20+SC80, PC20+SC40+SC60, PC20+SC40+SC80, PC20+SC60+SC40, PC20+SC60+SC60, PC20+SC60+SC80, PC20+SC80+SC20, PC20+SC80+SC40, PC20+SC80+SC60, PC20+SC80+SC80, PC80+SC20+SC20, PC80+SC20+SC40, PC80+SC20+SC60, PC80+SC20+SC80, PC80+SC40+SC20, PC80+SC40+SC40, PC80+SC40+SC60, PC80+SC40+SC80, PC80+SC60+SC20, PC80+SC60+SC40, PC80+SC60+SC60, PC80+SC60+SC80, PC80+SC80+SC20, PC80+SC80+SC40, PC80+SC80+SC60, PC80+SC80+SC80 (or 996+996+996 RU or 996+2×996 RU or 3×996 RU)

2) In Case 2, at least one 20 MHz in H80 should not be punctured, so the RU combination in S80 suggested in 4.2. can be used as it is. In Case 2, if at least one 20 MHz is not punctured in S80, the RU combination in S80 proposed in 4.2. can be used as it is. Therefore, in Case 2, various RU combinations in the total bandwidth are the same as in Case 1.

3) In Case 3, at least one 20 MHz should not be punctured in S160, and The case that one 20 MHz is not necessarily punctured in 80 MHz of either L80 or H80, and all other 80 MHz may be punctured or not can also be considered. Therefore, in case 3, various RU combinations in the total bandwidth are the same as in case 1.

The various RU combinations are summarized below, and the order and position of the RUs in each combination may be changed. The meaning of parentheses means the RU combination of each 80 MHz. That is, the order and position of the RUs may be changed within parentheses (i.e., within each 80 MHz), and the order and position of the parentheses may also be changed (i.e., the position and sequence diagram of each 80 MHz).

(242+242)+(996), (484)+(996), (484+242)+(484+242), (484+242)+(996), (996)+(996)/2×996

(242)+(242)+(996), (242)+(242+242)+(484+242), (242)+(484)+(484+242), (242)+(242+242)+(996), (242)+(484)+(996), (242)+(484+242)+(484+242), (242)+(484+242)+(996), (242)+(996)+(996), (242+242)+(242+242)+(242+242), (242+242)+(242+242)+(484), (242+242)+(484)+(484), (484)+(484)+(484), (242+242)+(242+242)+(484+242), (242+242)+(484)+(484+242), (484)+(484)+(484+242), (242+242)+(242+242)+(996), (242+242)+(484)+(996), (484)+(484)+(996), (242+242)+(484+242)+(484+242), (484)+(484+242)+(484+242), (242+242)+(484+242)+(996), (484)+(484+242)+(996), (242+242)+(996)+(996), (484)+(996)+(996), (484+242)+(484+242)+(484+242), (484+242)+(484+242)+(996), (996)+(996)+(996)/2×996+996/3×996

In particular, only (484)+(996)+(996) in which only one continuous 40 MHz is punctured and (996)+(996) in which only one continuous 80 MHz is punctured can be considered. In addition, (484+242)+(484+242)+(996) where only one continuous 40 MHz is punctured (in case of continuous 40 MHz puncturing at the boundary between two specific and (242)+(996)+(996), (484)+(484+242)+(996) where only one continuous 60 MHz is punctured (in case of continuous 60 MHz puncturing at the boundary between two specific and (484+242)+(996), (484)+(484)+(996) and (242)+(484+242)+(996) where only one continuous 80 MHz is punctured (in case of continuous 80 MHz puncturing at the boundary between two specific 80 MHz) can be considered. In addition, (242+242)+(996)+(996) in which only one continuous 40 MHz is punctured (in the case of continuous 40 MHz from the center of a specific 80 MHz, that is, when the two central 20 MHz are punctured) can be additionally considered.

A combination in which only one continuous 40 MHz or 60 MHz is punctured in each 160 MHz block may be considered. For example, There may be combinations of (484)+(484)+(996), (484)+(242+242)+(996), (484)+(484+242)+(484+242), (242+242)+(484)+(996), (242+242)+(242+242)+(996), (242+242)+(484+242)+(484+242), (242)+(242)+(996), (242)+(484)+(484+242).

As another example, There may be combinations of (484)+(242)+(996), (484)+(484)+(484+242), (242+242)+(242)+(996), (242+242)+(484)+(484+242), (242)+(484)+(996), (242)+(242+242)+(996), (242)+(484+242)+(484+242).

4.4. 320/160+160 MHz

Figure 29:
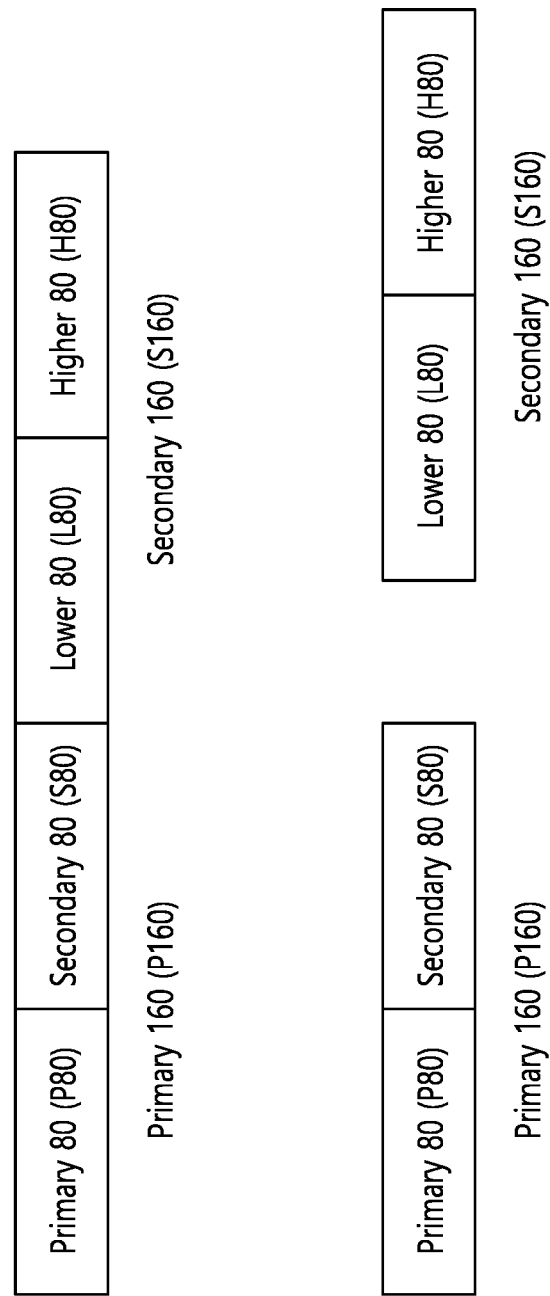
FIG. 29 shows a channel structure of 320/160+160 MHz.

FIG. 29 shows a channel structure of 320/160+160 MHz. For the 320/160+160 MHz tone plan, the 80 MHz tone plan is repeated four times.

In 320/160+160 MHz, the preamble puncturing pattern may vary depending on the channel configuration of 240/160+80 MHz, and a RU combination is proposed in consideration of the channel configuration case of 240/160+80 MHz as shown below. In the three cases, the RU combination in P80 can be used as it is suggested in 4.1. and 4.2.

4.4.1. 240/160+80 MHz channel configuration case 1

At least one of the 20 MHz channels of H80 must not be punctured, and therefore, the RU combination in S80 proposed in 4.2. can be used as it is. If at least one 20 MHz is not punctured in S80 or L80, the RU combination in S80 proposed in 4.2. can be used as it is. Various RU combinations in the entire bandwidth can be proposed as follows. This is a case where the number of channels that are not always punctured is 50% or more.

If both S80 and L80 are punctured
PC20+SC80, PC40+SC80, PC60+SC60, PC60+SC80, PC80+SC80

Except for PC80+SC80, the above case is not considered because non-puncturing channels are not more than 50%.

If at least one 20 MHz is not punctured within 80 MHz of either S80 or L80
PC40+SC40+SC80, PC40+SC60+SC60, PC40+SC60+SC80, PC40+SC80+SC40, PC40+SC80+SC60, PC40+SC80+SC80, PC60+SC20+SC80, PC60+SC40+SC60, PC60+SC40+SC80, PC60+SC60+SC40, PC60+SC60+SC60, PC60+SC60+SC80, PC60+SC80+SC20, PC60+SC80+SC40, PC60+SC80+SC60, PC60+SC80+SC80

PC20+SC60+SC80, PC20+SC80+SC60, <u>PC20+SC80+SC80</u>, PC80+SC20+SC60, PC80+SC20+SC80, PC80+SC40+SC40, PC80+SC40+SC60, PC80+SC40+SC80, PC80+SC60+SC20, PC80+SC60+SC40, PC80+SC60+SC60, PC80+SC60+SC80, PC80+SC80+SC20, PC80+SC80+SC40, PC80+SC80+SC60, <u>PC80+SC80+SC80</u> (or 996+996+996 RU or 996+2×996 RU or 3×996 RU)

If at least one 20 MHz is not punctured within 80 MHz of both S80 and L80

PC40+SC20+SC20+SC80, PC40+SC20+SC40+SC60,
<u>PC40+SC20+SC40+SC80</u>, PC40+SC20+SC60+SC40,
<u>PC40+SC20+SC60+SC60</u>, <u>PC40+SC20+SC60+SC80</u>,
PC40+SC20+SC80+SC20, PC40+SC20+SC80+SC40,
PC40+SC20+SC80+SC60, <u>PC40+SC20+SC80+SC80</u>,
PC40+SC40+SC20+SC60, PC40+SC40+SC20+SC80,
<u>PC40+SC40+SC40+SC40</u>, <u>PC40+SC40+SC40+SC60</u>,
<u>PC40+SC40+SC40+SC80</u>, PC40+SC40+SC60+SC20,
PC40+SC40+SC60+SC40, <u>PC40+SC40+SC60+SC60</u>,
<u>PC40+SC40+SC60+SC80</u>, PC40+SC40+SC80+SC20,
PC40+SC40+SC80+SC40, PC40+SC40+SC80+SC60,
<u>PC40+SC40+SC80+SC80</u>, PC40+SC60+SC20+SC40,
PC40+SC60+SC20+SC60, PC40+SC60+SC20+SC80,
PC40+SC60+SC40+SC20, PC40+SC60+SC40+SC40,
PC40+SC60+SC40+SC60, PC40+SC60+SC40+SC80,
PC40+SC60+SC60+SC20, PC40+SC60+SC60+SC40,
<u>PC40+SC60+SC60+SC60</u>, <u>PC40+SC60+SC60+SC80</u>,
PC40+SC60+SC80+SC20, PC40+SC60+SC80+SC40,
PC40+SC60+SC80+SC60, <u>PC40+SC60+SC80+SC80</u>,
PC40+SC80+SC20+SC20, PC40+SC80+SC20+SC40,
PC40+SC80+SC20+SC60, PC40+SC80+SC20+SC80,
PC40+SC80+SC40+SC20, PC40+SC80+SC40+SC40,
PC40+SC80+SC40+SC60, PC40+SC80+SC40+SC80,
PC40+SC80+SC60+SC20, PC40+SC80+SC60+SC40,
PC40+SC80+SC60+SC60, PC40+SC80+SC60+SC80,
PC40+SC80+SC80+SC20, PC40+SC80+SC80+SC40,
PC40+SC80+SC80+SC60, <u>PC40+SC80+SC80+SC80</u>

<u>PC60+SC20+SC20+SC60</u>, PC60+SC20+SC20+SC80,
PC60+SC20+SC40+SC40, PC60+SC20+SC40+SC60,
PC60+SC20+SC40+SC80, PC60+SC20+SC60+SC20,
PC60+SC20+SC60+SC40, <u>PC60+SC20+SC60+SC60</u>,
<u>PC60+SC20+SC60+SC80</u>, PC60+SC20+SC80+SC20,
PC60+SC20+SC80+SC40, PC60+SC20+SC80+SC60,
<u>PC60+SC20+SC80+SC80</u>, PC60+SC40+SC20+SC40,
PC60+SC40+SC20+SC60, PC60+SC40+SC20+SC80,
PC60+SC40+SC40+SC20, PC60+SC40+SC40+SC40,
PC60+SC40+SC40+SC60, PC60+SC40+SC40+SC80,
PC60+SC40+SC60+SC20, PC60+SC40+SC60+SC40,
PC60+SC40+SC60+SC60, PC60+SC40+SC60+SC80,
PC60+SC40+SC80+SC20, PC60+SC40+SC80+SC40,
PC60+SC40+SC80+SC60, PC60+SC40+SC80+SC80,
PC60+SC60+SC20+SC20, PC60+SC60+SC20+SC40,
PC60+SC60+SC20+SC60, PC60+SC60+SC20+SC80,
PC60+SC60+SC40+SC20, PC60+SC60+SC40+SC40,
PC60+SC60+SC40+SC60, PC60+SC60+SC40+SC80,
PC60+SC60+SC60+SC20, PC60+SC60+SC60+SC40,
<u>PC60+SC60+SC60+SC60</u>, <u>PC60+SC60+SC60+SC80</u>,
PC60+SC60+SC80+SC20, PC60+SC60+SC80+SC40,
PC60+SC60+SC80+SC60, <u>PC60+SC60+SC80+SC80</u>,
PC60+SC80+SC20+SC20, PC60+SC80+SC20+SC40,
PC60+SC80+SC20+SC60, PC60+SC80+SC20+SC80,
PC60+SC80+SC40+SC20, PC60+SC80+SC40+SC40,
PC60+SC80+SC40+SC60, PC60+SC80+SC40+SC80,
PC60+SC80+SC60+SC20, PC60+SC80+SC60+SC40,
PC60+SC80+SC60+SC60, PC60+SC80+SC60+SC80,
PC60+SC80+SC80+SC20, PC60+SC80+SC80+SC40,
PC60+SC80+SC80+SC60, <u>PC60+SC80+SC80+SC80</u>

PC20+SC20+SC40+SC80, PC20+SC20+SC60+SC60,
PC20+SC20+SC60+SC80, PC20+SC20+SC80+SC40,
PC20+SC20+SC80+SC60, <u>PC20+SC20+SC80+SC80</u>,
PC20+SC40+SC20+SC80, <u>PC20+SC40+SC40+SC60</u>,
PC20+SC40+SC40+SC80, PC20+SC40+SC60+SC40,
PC20+SC40+SC60+SC60, PC20+SC40+SC60+SC80,
PC20+SC40+SC80+SC20, PC20+SC40+SC80+SC40,
PC20+SC40+SC80+SC60, PC20+SC40+SC80+SC80,
PC20+SC60+SC20+SC60, PC20+SC60+SC20+SC80,
PC20+SC60+SC40+SC40, PC20+SC60+SC40+SC60,
PC20+SC60+SC40+SC80, PC20+SC60+SC60+SC20,
PC20+SC60+SC60+SC40, PC20+SC60+SC60+SC60,
PC20+SC60+SC60+SC80, PC20+SC60+SC80+SC20,
PC20+SC60+SC80+SC40, PC20+SC60+SC80+SC60,
PC20+SC60+SC80+SC80, PC20+SC80+SC20+SC40,
PC20+SC80+SC20+SC60, PC20+SC80+SC20+SC80,
PC20+SC80+SC40+SC20, PC20+SC80+SC40+SC40,
PC20+SC80+SC40+SC60, PC20+SC80+SC40+SC80,
PC20+SC80+SC60+SC20, PC20+SC80+SC60+SC40,
PC20+SC80+SC60+SC60, PC20+SC80+SC60+SC80,
PC20+SC80+SC80+SC20, PC20+SC80+SC80+SC40,
PC20+SC80+SC80+SC60, <u>PC20+SC80+SC80+SC80</u>

PC80+SC20+SC20+SC40, PC80+SC20+SC20+SC60,
PC80+SC20+SC20+SC80, PC80+SC20+SC40+SC20,
PC80+SC20+SC40+SC40, PC80+SC20+SC40+SC60,
PC80+SC20+SC40+SC80, PC80+SC20+SC60+SC20,
PC80+SC20+SC60+SC40, PC80+SC20+SC60+SC60,
PC80+SC20+SC60+SC80, PC80+SC20+SC80+SC20,
PC80+SC20+SC80+SC40, PC80+SC20+SC80+SC60,
PC80+SC20+SC80+SC80, PC80+SC40+SC20+SC20,
PC80+SC40+SC20+SC40, PC80+SC40+SC20+SC60,
PC80+SC40+SC20+SC80, PC80+SC40+SC40+SC20,
PC80+SC40+SC40+SC40, PC80+SC40+SC40+SC60,
PC80+SC40+SC40+SC80, PC80+SC40+SC60+SC20,
PC80+SC40+SC60+SC40, PC80+SC40+SC60+SC60,
PC80+SC40+SC60+SC80, PC80+SC40+SC80+SC20,
PC80+SC40+SC80+SC40, PC80+SC40+SC80+SC60,
PC80+SC40+SC80+SC80, PC80+SC60+SC20+SC20,
PC80+SC60+SC20+SC40, PC80+SC60+SC20+SC60,
PC80+SC60+SC20+SC80, PC80+SC60+SC40+SC20,
PC80+SC60+SC40+SC40, PC80+SC60+SC40+SC60,
PC80+SC60+SC40+SC80, PC80+SC60+SC60+SC20,
PC80+SC60+SC60+SC40, PC80+SC60+SC60+SC60,
PC80+SC60+SC60+SC80, PC80+SC60+SC80+SC20,
PC80+SC60+SC80+SC40, PC80+SC60+SC80+SC60,
PC80+SC60+SC80+SC80, PC80+SC80+SC20+SC20,
PC80+SC80+SC20+SC40, PC80+SC80+SC20+SC60,
PC80+SC80+SC20+SC80, PC80+SC80+SC40+SC20,
PC80+SC80+SC40+SC40, PC80+SC80+SC40+SC60,
PC80+SC80+SC40+SC80, PC80+SC80+SC60+SC20,
PC80+SC80+SC60+SC40, PC80+SC80+SC60+SC60,
PC80+SC80+SC60+SC80, PC80+SC80+SC80+SC20,
PC80+SC80+SC80+SC40, PC80+SC80+SC80+SC60,
<u>PC80+SC80+SC80+SC80</u> (or 2×996+2×996 RU or 996+996+2×996 RU or 996+3×996 RU or 996+996+996+996 RU)

4.4.2. 240/160+80 MHz Channel Configuration Case 2

At least one of the 20 MHz channels of L80 must not be punctured, and therefore, the RU combination in S80 proposed in 4.2. can be used as it is. If at least one 20 MHz is not punctured in S80 or H80, the RU combination in S80 proposed in 4.2. may be used as it is. Therefore, the combination of various RUs in the entire bandwidth is the same as the combination proposed in 4.4.1.

4.4.3. 240/160+80 MHz Channel Configuration Case 3

At least one of the 20 MHz channels of S80 should not be punctured, and therefore, the RU combination in S80 proposed in 4.2. can be used as it is. In addition, at least one 20 MHz must not be punctured in S160, which means that one 20 MHz is not necessarily punctured in of either L80 or H80, and the other 80 MHz may or may not be punctured. Therefore, various RU combinations in the entire bandwidth are the same as the proposed combination suggested in among the RU combinations proposed in 4.4.1, when at least one 20 MHz is not punctured within 80 MHz of either S80 or L80, and in both S80 and L80, if at least one 20 MHz is not punctured within 80 MHz.

The various RU combinations are summarized below, and the order and position of the RUs in each combination may be changed. The meaning of parentheses means the RU combination of each 80 MHz. That is, the order and position of the RUs may be changed within parentheses (i.e., within each 80 MHz), and the order and position of the parentheses may also be changed (i.e., the position and sequence diagram of each 80 MHz).

(996)+(996)/2×996

(242)+(484+242)+(996), (242)+(996)+(996), (242+242)+(242+242)+(996), (242+242)+(448)+(996), (448)+(448)+(996), (242+242)+(484+242)+(484+242), (484)+(484+242)+(484+242), (242+242)+(484+242)+(996), (484)+(484+242)+(996), (242+242)+(996)+(996), (484)+(996)+(996), (484+242)+(484+242)+(484+242), (484+242)+(484+242)+(996), (484+242)+(996)+(996), (996)+(996)+(996)/2×996+996/3×996

(242)+(242)+(242+242)+(996), (242)+(242)+(484+996), (242)+(242)+(484+242)+(484+242), (242)+(242)+(484+242)+(996), (242)+(242)+(996)+(996), (242)+(242+242)+(242+242)+(484+242), (242)+(242+242)+(484+484+242), (242)+(484)+(484)+(484+242), (242)+(242+242)+(242+242)+(996), (242)+(242+242)+(484)+(996), (242)+(484)+(484)+(996), (242)+(242+242)+(484+242)+(484+242), (242)+(484)+(484+242)+(484+242), (242)+(242+242)+(484+242)+(996), (242)+(484)+(484+242)+(996), (242)+(242+242)+(996)+(996), (242)+(484)+(996)+(996), (242)+(484+242)+(484+242)+(484+242), (242)+(484+242)+(484+242)+(996), (242)+(484+242)+(996)+(996), (242)+(996)+(996)+(996), (242+242)+(242+242)+(242+242)+(242+242), (242+242)+(242+242)+(242+242)+(484), (242+242)+(242+242)+(484)+(484), (242+242)+(484)+(484)+(484), (484)+(484)+(484)+(484), (242+242)+(242+242)+(242+242)+(484+242), (242+242)+(242+242)+(484+242), (484)+(484+242), (242+242)+(484)+(484)+(484+242), (484)+(484)+(484)+(484+242), (242+242)+(242+242)+(996), (242+242)+(242+242)+(484)+(996), (242+242)+(484)+(484)+(996), (484)+(484)+(484)+(996), (242+242)+(242+242)+(484+242)+(484+242), (242+242)+(484)+(484+242)+(484+242), (484)+(484)+(484+242)+(484+242), (484)+(484)+(484+242)+(484+242), (484+242), (242+242)+(242+242)+(484+242)+(996), (242+242)+(484)+(484+242)+(996), (484)+(484)+(484+242)+(996), (242+242)+(242+242)+(996)+(996), (242+242)+(484)+(996)+(996), (484)+(484)+(996)+(996), (242+242)+(484+242)+(484+242)+(484+242), (484)+(484+242)+(484+242)+(484+242), (242+242)+(484+242)+(484+242)+(996), (484)+(484+242)+(484+242)+(996), (996)+(996), (484+242)+(996)+(996)+(996), (996)+(996)+(996)+(996)/996+996+2×996/2×996+2×996/996+3×996/4×996

In particular, only (484)+(996)+(996)+(996) in which only one continuous 40 MHz is punctured and (996)+(996)+(996)+(996) in which only one continuous 80 MHz is punctured can be considered. Additionally, only (484+242)+(484+242)+(996)+(996) in which only one continuous 40 MHz is punctured (in case of continuous 40 MHz puncturing at the boundary between two specific 80 MHz), (242)+(996)+(996)+(996), (484)+(484+242)+(996)+(996), (484)+(484)+(996)+(996) in which only one continuous 60 MHz is punctured (in case of continuous 60 MHz puncturing at the boundary between two specific 80 MHz), and (484)+(484)+(996)+(996) and (242)+(484+242)+(996)+(996) in which only one continuous is punctured (In case of continuous 80 MHz puncturing at the boundary between two specific 80 MHz) can be considered. In addition, (242+242)+(996)+(996)+(996) in which only one continuous 40 MHz is punctured (in the case of continuous 40 MHz from the center of a specific 80 MHz, that is, when the two central 20 MHz are punctured) can be additionally considered.

A combination in which only one continuous 40, 60, or 80 MHz is punctured in each primary and secondary 160 may be considered. For example, There may be a combination of (484)+(996)+(484)+(996), (484)+(996)+(484+242)+(484+242), (484)+(996)+(242+242)+(996), (484+242)+(484+242)+(484+242)+(484+242), (484+242)+(484+242)+(242+242)+(996), (242+242)+(996)+(242+242)+(996), (242)+(996)+(242)+(996), (242)+(996)+(484)+(484+242), (484)+(484+242)+(484)+(484+242), (996)+(996), (996)+(484)+(484), (996)+(242)+(484+242), (484)+(484)+(484)+(484), (484)+(484)+(242)+(484+242), (242)+(484+242)+(242)+(484+242).

As another example, There may be a combination of (484)+(996)+(242)+(996), (484)+(996)+(484)+(484+242), (484+242)+(484+242)+(242)+(996), (484+242)+(484+242)+(484)+(484+242), (242+242)+(996)+(242)+(996), (242+242)+(996)+(484)+(484+242).

There may be a combination of (484)+(996)+(996), (484)+(996)+(484)+(484), (484)+(996)+(242)+(484+242), (484+242)+(484+242)+(996), (484+242)+(484+242)+(484)+(484), (484+242)+(484+242)+(242)+(484+242), (242+242)+(996)+(996), (242+242)+(996)+(484)+(484), (242+242)+(996)+(242)+(484+242).

There may be a combination of (242)+(996)+(996), (242)+(996)+(484)+(484), (242)+(996)+(242)+(484+242), (484)+(484+242)+(996), (484)+(484+242)+(484)+(484), (484)+(484+242)+(242)+(484+242).

Below, a method of indicating or scheduling the above puncturing pattern and RU aggregation is proposed.

4.5. Signaling Method

FIG. 30 shows an example of an EHT PPDU format.

FIG. 31 shows an example of a U-SIG format.

The above-described indicator regarding RU aggregation may be transmitted within the EHT-SIG of the EHT PPDU of FIG. 30 or the U-SIG of FIG. 31.

The Version independent field of FIG. 31 may include a 3-bit version identifier indicating a Wi-Fi version after 802.11be and 802.11be, a 1-bit DL/UL field, a BSS color, and a TXOP duration, and the like, the version dependent field of FIG. 31 may include information such as PPDU type and Bandwidth.

In U-SIG, two symbols are jointly encoded and each 20 MHz consists of 52 data tones and 4 pilot tones. Also, U-SIG is modulated in the same way as HE-SIG-A. That is, the U-SIG is modulated with a BPSK 1/2 code rate.

The EHT-SIG can be divided into a common field and a user specific field, can be encoded with a variable MCS, and can indicate information about an accurate puncturing pattern and RU aggregation used for transmission in the common field. Additionally, in order to when preamble puncturing is applied, it indicates whether to apply a shifted tone plan in an adjacent 20 MHz channel or change to a 20 MHz tone plan, or whether to use the tone plan as it is but puncture some tones or transmit some tones with low power, one bit of information may be transmitted in the version dependent field of the U-SIG or the common field of the EHT-SIG.

Figure 32:
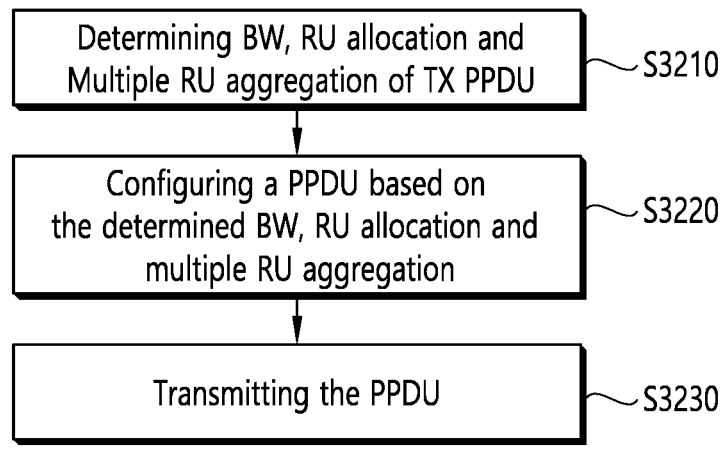
FIG. 32 is a flowchart illustrating the operation of the transmitting apparatus according to the present embodiment.

FIG. 32 is a procedure flowchart illustrating an operation of a transmission apparatus according to the present embodiment.

The example of FIG. 32 may be performed by a transmitting device (AP and/or non-AP STA). For example, the example of FIG. 32 may be performed by an AP transmitting an EHT SU PPDU, an EHT ER SU PPDU, or an EHT MU PPDU. The example of FIG. 32 may be performed by a non-AP that transmits an EHT SU PPDU, an EHT ER SU PPDU, and an EHT MU PPDU.

Some of each step (or detailed sub-step to be described later) of the example of FIG. 32 may be omitted or changed.

In step S3210, the transmitting device (i.e., transmitting STA) configures Bandwidth (BW) and RU allocation, and allocates multiple RUs to a specific user or STA by the Multiple RU aggregation combination of paragraph 4.2 of the above specification. Also, the transmitting device may perform a channel access operation.

In step S3220, the transmitting STA may configure a PPDU. For example, the PPDU may be an EHT SU PPDU, an EHT ER SU PPDU, or an EHT MU PPDU. The PPDU may include an EHT-SIG as shown in FIG. 18.

The transmitting STA may perform step S3220 based on the BW, RU allocation, and multiple RU aggregation determined in step S3210.

That is, as described above, specific (RU allocation) n-bit (e.g., 8-bit) information may be included in the common field of the EHT-SIG, and information on multiple RU aggregation may be included in the user specific field.

In step S3230, the transmitting device may transmit the PPDU configured in step S3220 to the receiving device based on step S3230.

While performing step S3230, the transmitting device may perform at least one of CSD, spatial mapping, IDFT/IFFT operation, GI insertion, and the like.

A signal/field/sequence constructed according to this specification may be transmitted in the form of FIG. 18.

For example, the above-described EHT-SIG may be transmitted based on several OFDM symbols. For example, one OFDM symbol may include 26-bit information. The 26-bit information may include the above-described 4-bit BW information. Any m-bit information may be used instead of 26-bit information.

For 26-bit information, BCC encoding with 1/2 inefficiency may be applied. Interbiring by an interleaver may be applied to the BCC coded bits (ie, 52 bits). Constellation mapping by a constellation mapper may be performed on the interleaved 52 bits. Specifically, the BPSK module may be applied to generate 52 BPSK symbols. The 52 BPSK symbols may be matched to the remaining frequency domains (−28 to +28) except for DC tones and pilot tones (−21, −7, +7, +21) tones. Thereafter, it may be transmitted to the receiving STA through phase rotation, CSD, spatial mapping, IDFT/IFFT operation, and the like.

The above-described PPDU may be transmitted based on the apparatus of FIG. 1.

The example of FIG. 1 relates to an example of a transmitting apparatus (AP and/or non-AP STA).

As shown in FIG. 1, the transmitting apparatus (or transmitter) may include a memory 112, a processor 111, and a transceiver 113.

The memory 112 may store information on a plurality of Tone-Plan/RU that are described in the present specification.

The processor 111 may generate various RUs based on information stored in the memory 112 and configure a PPDU. An example of the PPDU generated by the processor 111 may be as shown in FIG. 18.

The processor 111 may perform all/part of the operations illustrated in FIG. 32.

The illustrated transceiver 113 includes an antenna and may perform analog signal processing. Specifically, the processor 111 may control the transceiver 113 to transmit the PPDU generated by the processor 111.

Alternatively, the processor 111 may generate a transmission PPDU and store information about the transmission PPDU in the memory 112.

Figure 33:
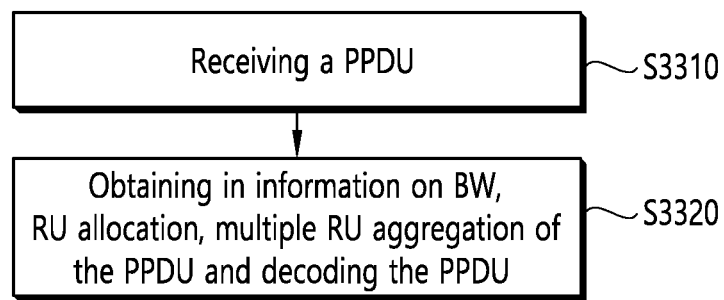
FIG. 33 is a flowchart illustrating the operation of the receiving apparatus according to the present embodiment.

FIG. 33 is a procedure flowchart illustrating an operation of a reception apparatus according to the present embodiment.

An example of FIG. 33 may be performed in the reception apparatus (AP and/or non-AP STA).

The example of FIG. 33 may be performed by a reception apparatus (AP and/or non-AP STA). For example, the example of FIG. 33 may be performed by a non-AP receiving an EHT SU PPDU, an EHT ER SU PPDU, or an EHT MU PPDU. The example of FIG. 33 may be performed by an AP that transmits an EHT SU PPDU, an EHT ER SU PPDU.

Some of each step (or detailed sub-step to be described later) of the example of FIG. 33 may be omitted.

In step S3310, the receiving device (receiving STA) may receive all or part of the PPDU through step S3310. The received signal may be in the form of FIG. 18. The sub-step of step S3310 may be determined based on step S3230 of FIG. 32. That is, in step S3310, an operation for restoring the results of the CSD, spatial mapping, IDFT/IFFT operation, and GI insert operation applied in step S3230 may be performed.

In step S3320, the receiving STA may obtain information on the BW, RU allocation, and multiple RU aggregation of the EHT PPDU by decoding information included in the U-SIG or EHT-SIG.

Through this, the receiving STA can complete decoding of other fields/symbols of the received PPDU.

As a result, the receiving STA may decode the data field included in the PPDU through step S3320. Thereafter, the receiving STA may perform a processing operation of transferring data decoded from the data field to a higher layer (eg, MAC layer). In addition, when generation of a signal is instructed from the upper layer to the PHY layer in response to data transferred to the upper layer, a subsequent operation may be performed.

The above-described PPDU may be transmitted based on the apparatus of FIG. 1.

As shown in FIG. 1, the reception apparatus may include a memory 112, a processor 111, and a transceiver 113.

The transceiver 123 may receive the PPDU based on the control of the processor 121. For example, the transceiver 123 may include a plurality of sub-units (not shown). For example, the transceiver 123 may include at least one receiving antenna and a filter for the corresponding receiving antenna.

The PPDU received through the transceiver 123 may be stored in the memory 122. The processor 121 may process decoding of the received PPDU through the memory 122. The processor 121 may obtain control information (e.g., EHT-SIG) regarding the Tone-Plan/RU included in the PPDU, and store the obtained control information in the memory 122.

The processor 121 may perform decoding on the received PPDU. Specifically, an operation for restoring the result of CSD, Spatial Mapping, IDFT/IFFT operation, and GI insert applied to the PPDU may be performed. CSD, Spatial Mapping, IDFT/IFFT operation, and operation of restoring the result of GI insert may be performed through a plurality of processing units (not shown) individually implemented in the processor 121.

In addition, the processor 121 may decode the data field of the PPDU received through the transceiver 123.

In addition, the processor 121 may process the decoded data. For example, the processor 121 may perform a processing operation of transferring information about the decoded data field to an upper layer (e.g., a MAC layer). In addition, when generation of a signal is instructed from the upper layer to the PHY layer in response to data transferred to the upper layer, a subsequent operation may be performed.

Hereinafter, the aforementioned embodiment is described with reference to FIGS. 1 to 33.

Figure 34:
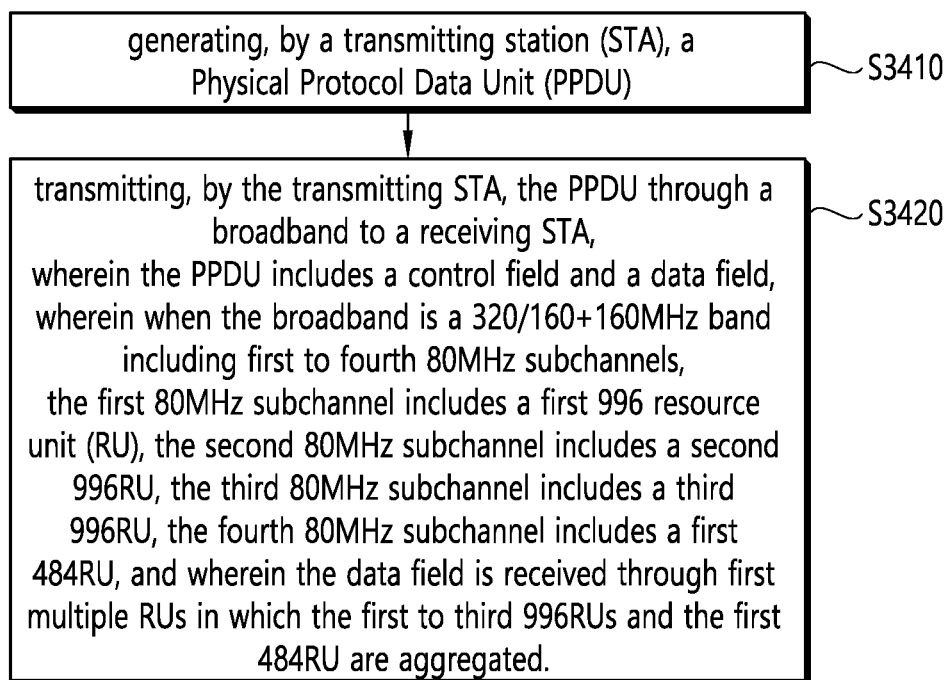
FIG. 34 is a flowchart illustrating a procedure in which a transmitting STA transmits a PPDU according to the present embodiment.

FIG. 34 is a flowchart illustrating a procedure in which a transmitting STA transmits a PPDU according to the present embodiment.

An example of FIG. 34 may be performed in a network environment in which a next-generation wireless LAN system (e.g., IEEE 802.11be or EHT wireless LAN system) is supported. The next-generation wireless LAN system is a wireless LAN system improved from the 802.11ax system, and may satisfy backward compatibility with the 802.11ax system.

The example of FIG. 34 is performed by a transmitting STA, and the transmitting STA may correspond to an access point (AP). The receiving STA of FIG. 34 may correspond to an STA supporting an Extremely High Throughput (EHT) WLAN system.

This embodiment proposes a method and apparatus for transmitting and receiving PPDU based on multiple RUs configured by a combination between large-RUs. In this case, the large-RU means a resource unit having more than 242 tones. In particular, this embodiment proposes a method of configuring multiple RUs used to transmit a PPDU in a non-OFDMA scheme.

In step S3410, the transmitting station (STA) generates a Physical Protocol Data Unit (PPDU).

In step S3420, the transmitting STA transmits the PPDU to the receiving STA through a broadband.

The PPDU includes a control field and a data field.

When the broadband is a 320/160+160 MHz band including first to fourth 80 MHz subchannels, the first 80 MHz subchannel includes a first 996 resource unit (RU), and the second 80 MHz subchannel includes a second 996 RU, the third 80 MHz subchannel includes a third 996 RU, and the fourth 80 MHz subchannel includes a first 484 RU.

The data field is received through first multiple RUs in which the first to third 996RUs and the first 484RU are aggregated. That is, the data field may be received through multiple RUs in which three 996 RUs and one 484 RU are aggregated. As described above, the broadband may include four 80 MHz subchannels. The three 996 RUs and the one 484 RU may be allocated to each of the four 80 MHz subchannels, respectively. In this case, the first to third 996RUs may be RUs consisting of 996 tones, and the first 484 RU may be an RU consisting of 484 tones.

The PPDU may be transmitted based on a non-Orthogonal Frequency Division Multiple Access (OFDMA) scheme.

The first multiple RUs may be obtained by puncturing 484RU in the fourth 80 MHz subchannel. In this case, since only the first 484RU are used in the fourth 80 MHz subchannel, it can be seen that the remaining 484RUs (or one continuous 40 MHz band) are punctured.

The control field may include allocation information on the first multiple RUs. The receiving STA decodes the allocation information on the first multiple RUs, it can be confirmed that the first multiple RUs are RUs allocated to itself One of the first to fourth 80 MHz subchannels may be a primary 80 MHz channel, and the remaining three subchannels except for the primary 80 MHz channel may be secondary channels (specifically, the secondary 80 MHz channel, low 80 MHz channel of the secondary 160 MHz, high 80 MHz channel of the secondary 160 MHz). The primary 80 MHz channel and the secondary 80 MHz channel may be configured regardless of the size of the frequency. Here, the primary 80 MHz channel may include a primary 20 MHz channel, a secondary 20 MHz channel, and a secondary 40 MHz channel. The primary 20 MHz channel is not (always) punctured.

As another example, when the broadband is a 320/160+160 MHz band including fifth to eighth 80 MHz subchannels, the fifth 80 MHz subchannel may include a fourth 996 RU, the sixth 80 MHz subchannel may include a fifth 996 RU, the seventh 80 MHz subchannel may include a sixth 996 RU.

The data field may be received through second multiple RUs in which the fourth to sixth 996RUs are aggregated. That is, the data field may be received through multiple RUs in which three 996RUs are aggregated. As described above, the broadband may include four 80 MHz subchannels. The three 996RUs may be allocated to each of the remaining three 80 MHz subchannels except for one punctured 80 MHz subchannel. In this case, the fourth to sixth 996RUs may be RUs consisting of 996 tones.

The second multiple RUs are obtained by puncturing the eighth 80 MHz subchannel. This indicates that the eighth 80 MHz subchannel is punctured because the eighth 80 MHz subchannel is not used when the data field is transmitted.

The control field may include allocation information on the second multiple RUs. The receiving STA may decode the allocation information on the second multiple RUs and confirm that the second multiple RUs are RUs allocated to itself One of the fifth to eighth 80 MHz subchannels may be a primary 80 MHz channel, and the remaining three subchannels except for the primary 80 MHz channel may be secondary channels (specifically, a secondary 80 MHz channel, a low 80 MHz channel of a secondary 160 MHz, and a high 80 MHz channel of a secondary 160 MHz). The primary 80 MHz channel and the secondary 80 MHz channel may be configured regardless of the size of the frequency. Here, the primary 80 MHz channel is not (always) punctured.

As another example, when the broadband is a 320/160+160 MHz band including fifth to eighth 80 MHz subchannels, the fifth 80 MHz subchannel may include a fourth 996 RU, the sixth 80 MHz subchannel may include a fifth 996 RU, the seventh 80 MHz subchannel may include a second 484 RU.

The data field may be received through third multiple RUs in which the fourth to fifth 996RUs and the second 484RUs are aggregated. That is, the data field may be received through multiple RUs in which two 996 RUs and one 484

RU are aggregated. As described above, the broadband may include the four 80 MHz subchannels. The two 996 RUs and the one 484 RU may be allocated to each of the other three 80 MHz subchannels except for one punctured subchannel respectively. In this case, the fourth to fifth 996RUs may be RUs consisting of 996 tones, and the second 484 RUs may be RUs consisting of 484 tones.

The third multiple RUs may be obtained by puncturing 484RU in the seventh 80 MHz subchannel and puncturing the eighth 80 MHz subchannel. This is because the eighth 80 MHz subchannel is not used when transmitting the data field, so it can be seen that the eighth 80 MHz subchannel is punctured, and only the second 484 RU is used in the seventh 80 MHz subchannel, It can be seen that the remaining 484 RUs (or one continuous 40 MHz band) are punctured.

The control field may include allocation information on the third multiple RUs. The receiving STA may decode the allocation information on the third multiple RUs and confirm that the second multiple RUs are RUs allocated to itself One of the fifth to eighth 80 MHz subchannels may be a primary 80 MHz channel, and the remaining three subchannels except for the primary 80 MHz channel may be secondary channels (specifically, a secondary 80 MHz channel, a low 80 MHz channel of a secondary 160 MHz, and a high 80 MHz channel of a secondary 160 MHz). The primary 80 MHz channel and the secondary 80 MHz channel may be configured regardless of the size of the frequency. Here, the primary 80 MHz channel may include a primary 40 MHz channel and a secondary 40 MHz channel. The primary 40 MHz channel or the primary 80 MHz channel is not punctured.

This embodiment proposes a method of configuring multiple RUs (large-RU combination) used to transmit a PPDU in a non-OFDMA scheme in the 320/160+160 MHz band.

In addition, this embodiment may propose a method of configuring multiple RUs (large-RU combination) used to transmit a PPDU in a non-OFDMA scheme in an 80 MHz band. In this case, the 80 MHz band may include first to second 20 MHz sub-channels and a first 40 MHz sub-channel. One of the first and second 20 MHz subchannels may include 242 RUs, and the first 40 MHz subchannel may include 484 RU. The data field may be received through multiple RUs in which the 242RU and the 484RU are aggregated. The multi-RU may be obtained by puncturing one of the first and second 20 MHz subchannels.

In addition, this embodiment may propose a method of configuring multiple RUs (large-RU combination) used to transmit a PPDU in a non-OFDMA scheme in a 160/80+80 MHz band.

First, the 160/80+80 MHz band may include first to second 40 MHz subchannels and a first 80 MHz subchannel. One of the first and second 40 MHz subchannels may include 484 RU, and the first 80 MHz subchannel may include 996 RU. The data field may be received through multiple RUs in which the 484 RU and the 996 RU are aggregated. The multi-RU may be obtained by puncturing one of the first and second 40 MHz subchannels.

In addition, the 160/80+80 MHz band may include first and second 20 MHz subchannels, a first 40 MHz subchannel, and a first 80 MHz sub-channel. One of the first and second 20 MHz subchannels may include 242 RU, the first 40 MHz subchannel may include 484 RU, and the first 80 MHz subchannel may include 996 RU. The data field may be received through multiple RUs in which the 242 RU, the 484 RU, and the 996 RU are aggregated. The multiple RUs may be obtained by puncturing one of the first and second 20 MHz subchannels.

The control field includes a first control field supporting a legacy wireless LAN system and a second control field supporting an 802.11be wireless LAN system. The second control field may include a universal-signal (U-SIG) or an extremely high throughput-signal (EHT-SIG). The second control field may include allocation information on an RU to which the data field is to be transmitted. This embodiment describes a case where the RU to which the data field is transmitted is a multi-RU in which a plurality of RUs are aggregated with each other. The RU means a resource unit in which the data field is transmitted.

The EHT-SIG may include EHT-SIG-A and EHT-SIG-B (or EHT-SIG-C field). The EHT-SIG-B may include resource unit (RU) information. The transmitting STA may inform information on the tone plan of the wideband through the EHT-SIG-B. In addition, EHT-STF, EHT-LTF, and the data field included in the second control field may be transmitted/received by multiple RUs included in tone plan of the broadband.

Figure 35:
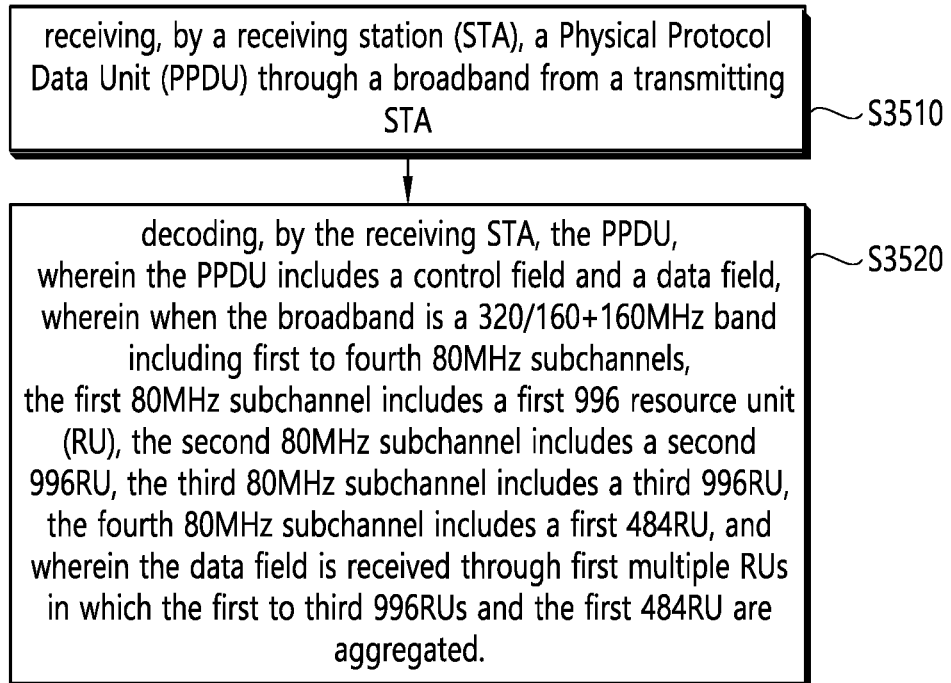
FIG. 35 is a flowchart illustrating a procedure for a receiving STA to receive a PPDU according to the present embodiment.

FIG. 35 is a flowchart illustrating a procedure for a receiving STA to receive a PPDU according to the present embodiment.

An example of FIG. 35 may be performed in a network environment in which a next-generation wireless LAN system (e.g., IEEE 802.11be or EHT wireless LAN system) is supported. The next-generation wireless LAN system is a wireless LAN system improved from the 802.11ax system, and may satisfy backward compatibility with the 802.11ax system.

The example of FIG. 35 is performed by a transmitting STA, and the transmitting STA may correspond to an access point (AP). The receiving STA of FIG. 35 may correspond to an STA supporting an Extremely High Throughput (EHT) WLAN system.

This embodiment proposes a method and apparatus for transmitting and receiving PPDU based on multiple RUs configured by a combination between large-RUs. In this case, the large-RU means a resource unit having more than 242 tones. In particular, this embodiment proposes a method of configuring multiple RUs used to transmit a PPDU in a non-OFDMA scheme.

In step S3510, the receiving station (STA) receives a Physical Protocol Data Unit (PPDU) through a broadband from a transmitting STA.

In step S3520, the receiving STA decode the PPDU.

The PPDU includes a control field and a data field.

When the broadband is a 320/160+160 MHz band including first to fourth 80 MHz subchannels, the first 80 MHz subchannel includes a first 996 resource unit (RU), and the second 80 MHz subchannel includes a second 996 RU, the third 80 MHz subchannel includes a third 996 RU, and the fourth 80 MHz subchannel includes a first 484 RU.

The data field is received through first multiple RUs in which the first to third 996RUs and the first 484RU are aggregated. That is, the data field may be received through multiple RUs in which three 996 RUs and one 484 RU are aggregated. As described above, the broadband may include four 80 MHz subchannels. The three 996 RUs and the one 484 RU may be allocated to each of the four 80 MHz subchannels, respectively. In this case, the first to third 996RUs may be RUs consisting of 996 tones, and the first 484 RU may be an RU consisting of 484 tones.

The PPDU may be transmitted based on a non-Orthogonal Frequency Division Multiple Access (OFDMA) scheme.

The first multiple RUs may be obtained by puncturing 484RU in the fourth 80 MHz subchannel. In this case, since only the first 484RU are used in the fourth 80 MHz subchannel, it can be seen that the remaining 484RUs (or one continuous 40 MHz band) are punctured.

The control field may include allocation information on the first multiple RUs. The receiving STA decodes the allocation information on the first multiple RUs, it can be confirmed that the first multiple RUs are RUs allocated to itself One of the first to fourth 80 MHz subchannels may be a primary 80 MHz channel, and the remaining three subchannels except for the primary 80 MHz channel may be secondary channels (specifically, the secondary 80 MHz channel, low 80 MHz channel of the secondary 160 MHz, high 80 MHz channel of the secondary 160 MHz). The primary 80 MHz channel and the secondary 80 MHz channel may be configured regardless of the size of the frequency. Here, the primary 80 MHz channel may include a primary 20 MHz channel, a secondary 20 MHz channel, and a secondary 40 MHz channel. The primary 20 MHz channel is not (always) punctured.

As another example, when the broadband is a 320/160+160 MHz band including fifth to eighth 80 MHz subchannels, the fifth 80 MHz subchannel may include a fourth 996 RU, the sixth 80 MHz subchannel may include a fifth 996 RU, the seventh 80 MHz subchannel may include a sixth 996 RU.

The data field may be received through second multiple RUs in which the fourth to sixth 996RUs are aggregated. That is, the data field may be received through multiple RUs in which three 996RUs are aggregated. As described above, the broadband may include four 80 MHz subchannels. The three 996RUs may be allocated to each of the remaining three 80 MHz subchannels except for one punctured 80 MHz subchannel. In this case, the fourth to sixth 996RUs may be RUs consisting of 996 tones.

The second multiple RUs are obtained by puncturing the eighth 80 MHz subchannel. This indicates that the eighth 80 MHz subchannel is punctured because the eighth 80 MHz subchannel is not used when the data field is transmitted.

The control field may include allocation information on the second multiple RUs. The receiving STA may decode the allocation information on the second multiple RUs and confirm that the second multiple RUs are RUs allocated to itself One of the fifth to eighth 80 MHz subchannels may be a primary 80 MHz channel, and the remaining three subchannels except for the primary 80 MHz channel may be secondary channels (specifically, a secondary 80 MHz channel, a low 80 MHz channel of a secondary 160 MHz, and a high 80 MHz channel of a secondary 160 MHz). The primary 80 MHz channel and the secondary 80 MHz channel may be configured regardless of the size of the frequency. Here, the primary 80 MHz channel is not (always) punctured.

As another example, when the broadband is a 320/160+160 MHz band including fifth to eighth 80 MHz subchannels, the fifth 80 MHz subchannel may include a fourth 996 RU, the sixth 80 MHz subchannel may include a fifth 996 RU, the seventh 80 MHz subchannel may include a second 484 RU.

The data field may be received through third multiple RUs in which the fourth to fifth 996RUs and the second 484RUs are aggregated. That is, the data field may be received through multiple RUs in which two 996 RUs and one 484 RU are aggregated. As described above, the broadband may include the four 80 MHz subchannels. The two 996 RUs and the one 484 RU may be allocated to each of the other three 80 MHz subchannels except for one punctured subchannel respectively. In this case, the fourth to fifth 996RUs may be RUs consisting of 996 tones, and the second 484 RUs may be RUs consisting of 484 tones.

The third multiple RUs may be obtained by puncturing 484RU in the seventh 80 MHz subchannel and puncturing the eighth 80 MHz subchannel. This is because the eighth 80 MHz subchannel is not used when transmitting the data field, so it can be seen that the eighth 80 MHz subchannel is punctured, and only the second 484 RU is used in the seventh 80 MHz subchannel, It can be seen that the remaining 484 RUs (or one continuous 40 MHz band) are punctured.

The control field may include allocation information on the third multiple RUs. The receiving STA may decode the allocation information on the third multiple RUs and confirm that the second multiple RUs are RUs allocated to itself One of the fifth to eighth 80 MHz subchannels may be a primary 80 MHz channel, and the remaining three subchannels except for the primary 80 MHz channel may be secondary channels (specifically, a secondary 80 MHz channel, a low 80 MHz channel of a secondary 160 MHz, and a high 80 MHz channel of a secondary 160 MHz). The primary 80 MHz channel and the secondary 80 MHz channel may be configured regardless of the size of the frequency. Here, the primary 80 MHz channel may include a primary 40 MHz channel and a secondary 40 MHz channel. The primary 40 MHz channel or the primary 80 MHz channel is not punctured.

This embodiment proposes a method of configuring multiple RUs (large-RU combination) used to transmit a PPDU in a non-OFDMA scheme in the 320/160+160 MHz band.

In addition, this embodiment may propose a method of configuring multiple RUs (large-RU combination) used to transmit a PPDU in a non-OFDMA scheme in an 80 MHz band. In this case, the 80 MHz band may include first to second 20 MHz sub-channels and a first 40 MHz sub-channel. One of the first and second 20 MHz subchannels may include 242 RUs, and the first 40 MHz subchannel may include 484 RU. The data field may be received through multiple RUs in which the 242RU and the 484RU are aggregated. The multi-RU may be obtained by puncturing one of the first and second 20 MHz subchannels.

In addition, this embodiment may propose a method of configuring multiple RUs (large-RU combination) used to transmit a PPDU in a non-OFDMA scheme in a 160/80+80 MHz band.

First, the 160/80+80 MHz band may include first to second 40 MHz subchannels and a first 80 MHz subchannel. One of the first and second 40 MHz subchannels may include 484 RU, and the first 80 MHz subchannel may include 996 RU. The data field may be received through multiple RUs in which the 484 RU and the 996 RU are aggregated. The multi-RU may be obtained by puncturing one of the first and second 40 MHz subchannels.

In addition, the 160/80+80 MHz band may include first and second 20 MHz subchannels, a first 40 MHz sub-channel, and a first 80 MHz sub-channel. One of the first and second 20 MHz subchannels may include 242 RU, the first 40 MHz subchannel may include 484 RU, and the first 80 MHz subchannel may include 996 RU. The data field may be received through multiple RUs in which the 242 RU, the 484 RU, and the 996 RU are aggregated. The multiple RUs may be obtained by puncturing one of the first and second 20 MHz subchannels.

The control field includes a first control field supporting a legacy wireless LAN system and a second control field supporting an 802.11be wireless LAN system. The second control field may include a universal-signal (U-SIG) or an extremely high throughput-signal (EHT-SIG). The second control field may include allocation information on an RU to which the data field is to be transmitted. This embodiment describes a case where the RU to which the data field is transmitted is a multi-RU in which a plurality of RUs are aggregated with each other. The RU means a resource unit in which the data field is transmitted.

The EHT-SIG may include EHT-SIG-A and EHT-SIG-B (or EHT-SIG-C field). The EHT-SIG-B may include resource unit (RU) information. The transmitting STA may inform information on the tone plan of the wideband through the EHT-SIG-B. In addition, EHT-STF, EHT-LTF, and the data field included in the second control field may be transmitted/received by multiple RUs included in tone plan of the broadband.

5. Apparatus/Device Configuration

The technical features of the present specification described above may be applied to various devices and methods. For example, the above-described technical features of the present specification may be performed/supported through the apparatus of FIGS. 1 and/or 19. For example, the technical features of the present specification described above may be applied only to a part of FIGS. 1 and/or 19. For example, the technical features of the present specification described above are implemented based on the processing chip(s) 114 and 124 of FIG. 1, or implemented based on the processor(s) 111 and 121 and the memory(s) 112 and 122 of FIG. 1, or may be implemented based on the processor 610 and the memory 620 of FIG. 19. For example, the apparatus of the present specification may receive a Physical Protocol Data Unit (PPDU) through a broadband from a transmitting STA; and decodes the PPDU.

The technical features of the present specification may be implemented based on a computer readable medium (CRM). For example, the CRM proposed by the present specification is at least one computer readable medium including at least one computer readable medium including instructions based on being executed by at least one processor.

The CRM may store instructions perform operations comprising: receiving a Physical Protocol Data Unit (PPDU) through a broadband from a transmitting STA; and decoding the PPDU. The instructions stored in the CRM of the present specification may be executed by at least one processor. At least one processor related to CRM in the present specification may be the processor(s) 111 and 121 or the processing chip(s) 114 and 124 of FIG. 1, or the processor 610 of FIG. 19. Meanwhile, the CRM of the present specification may be the memory(s) 112 and 122 of FIG. 1, the memory 620 of FIG. 19, or a separate external memory/storage medium/disk.

The foregoing technical features of this specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method in a wireless Local Area Network (LAN) system, the method comprising:
   receiving, by a receiving station (STA), a Physical Protocol Data Unit (PPDU) from a transmitting STA; and
   decoding, by the receiving STA, the PPDU,
   wherein the PPDU includes a data field,
   wherein based on a bandwidth of the PPDU being 320 MHz, the data field is received through a 3×996+484-tone multiple resource unit (MRU),
   wherein the 3×996+484-tone MRU is allowed when a 40 MHz subchannel is punctured in the bandwidth of the PPDU,
   wherein the 3×996+484-tone MRU is obtained by combining three 996-tone RUs and a 484-tone RU,
   wherein the bandwidth of the PPDU includes a primary 80 MHz channel, a secondary 80 MHz channel and a secondary 160 MHz channel, and
   wherein the primary 80 MHz channel includes a primary 20 MHz channel that is not punctured.

2. The method of claim 1, wherein the PPDU is received based on a non-Orthogonal Frequency Division Multiple Access (non-OFDMA) scheme,
   wherein the PPDU further includes a control field,
   wherein the control field includes allocation information on the 3×996+484-tone MRU,
   wherein the 996-tone RU is an RU consisting of 996 tones,
   wherein the 484-tone RU is an RU consisting of 484 tones.

3. The method of claim 1, wherein the control field further includes allocation information on a 3×996-tone MRU in addition to the 3×996+484-tone MRU,
   wherein the 3×996-tone MRU is allowed when an 80 MHz subchannel is punctured in the bandwidth of the PPDU, and
   wherein the 3×996-tone MRU is obtained by combining three 996-tone RUs.

4. The method of claim 3,
   wherein the primary 80 MHz channel is not punctured.

5. The method of claim 1, wherein the control field further includes allocation information on a 2×996+484-tone MRU in addition to the 3×996+484-tone MRU,
   wherein the 2×996+484-tone MRU is allowed when a 40 MHz subchannel and an 80 MHz subchannel are punctured in the bandwidth of the PPDU, and
   wherein the 2×996+484-tone MRU is obtained by combining two 996-tone RUs and a 484-tone RU.

6. The method of claim 5,
   wherein the primary 80 MHz channel includes a primary 40 MHz channel and a secondary 40 MHz channel,
   wherein the primary 40 MHz channel or the primary 80 MHz channel is not punctured.

7. A receiving station (STA) in a wireless Local Area Network (LAN), the receiving STA comprising:
   a memory;
   a transceiver; and
   a processor operatively coupled to the memory and the transceiver,
   wherein the processor is configured to:
   receive a Physical Protocol Data Unit (PPDU) from a transmitting STA; and
   decode the PPDU,
   wherein the PPDU includes a data field,
   wherein based on a bandwidth of the PPDU being 320 MHz, the data field is received through a 3×996+484-tone multiple resource unit (MRU),
   wherein the 3×996+484-tone MRU is allowed when a 40 MHz subchannel is punctured in the bandwidth of the PPDU,
   wherein the 3×996+484-tone MRU is obtained by combining three 996-tone RUs and a 484-tone RU,
   wherein the bandwidth of the PPDU includes a primary 80 MHz channel, a secondary channel and a secondary 160 MHz channel, and
   wherein the primary 80 MHz channel includes a primary 20 MHz channel that is not punctured.

8. A method in a wireless Local Area Network (LAN), the method comprising:
   configuring, by a transmitting station (STA), a Physical Protocol Data Unit (PPDU); and
   transmitting, by the transmitting STA, the PPDU to a receiving STA,
   wherein the PPDU includes a data field,
   wherein based on a bandwidth of the PPDU being 320 MHz, the data field is transmitted through a 3×996+484-tone multiple resource unit (MRU),
   wherein the 3×996+484-tone MRU is allowed when a 40 MHz subchannel is punctured in the bandwidth of the PPDU,
   wherein the 3×996+484-tone MRU combines three 996-tone RUs and a 484-tone RU,
   wherein the bandwidth of the PPDU includes a primary 80 MHz channel, a secondary channel and a secondary 160 MHz channel, and
   wherein the primary 80 MHz channel includes a primary 20 MHz channel that is not punctured.

9. The method of claim 8, wherein the PPDU is transmitted based on a non-Orthogonal Frequency Division Multiple Access (non-OFDMA) scheme,
   wherein the PPDU further includes a control field,
   wherein the control field includes allocation information on the 3×996+484-tone MRU,
   wherein the 996-tone RU is an RU consisting of 996 tones,
   wherein the 484-tone RU is an RU consisting of 484 tones.

10. The method of claim 8, wherein the control field further includes allocation information on a 3×996-tone MRU in addition to the 3×996+484-tone MRU,
- wherein the 3×996-tone MRU is allowed when an 80 MHz subchannel is punctured in the bandwidth of the PPDU, and
- wherein the 3×996-tone MRU is obtained by combining three 996-tone RUs.

11. A transmitting station (STA) in a wireless Local Area Network (LAN), the transmitting STA comprising:
- a memory;
- a transceiver; and
- a processor operatively coupled to the memory and the transceiver,
- wherein the processor is configured to:
- configure a Physical Protocol Data Unit (PPDU); and
- transmit the PPDU to a receiving STA,
- wherein the PPDU includes a data field,
- wherein based on a bandwidth of the PPDU being 320 MHz, the data field is transmitted through a 3×996+484-tone multiple resource unit (MRU),
- wherein the 3×996+484-tone MRU is allowed when a 40 MHz subchannel is punctured in the bandwidth of the PPDU,
- wherein the 3×996+484-tone MRU combines three 996-tone RUs and a 484-tone RU,
- wherein the bandwidth of the PPDU includes a primary 80 MHz channel, a secondary 80 MHz channel and a secondary 160 MHz channel, and
- wherein the primary 80 MHz channel includes a primary 20 MHz channel that is not punctured.

* * * * *